US012544920B2

(12) United States Patent
Kulkarni et al.

(10) Patent No.: US 12,544,920 B2
(45) Date of Patent: Feb. 10, 2026

(54) DETECTION OF HEAVY OBJECTS IN ROBOTIC INDUCTION

(71) Applicant: Dexterity, Inc., Redwood City, CA (US)

(72) Inventors: Rohun Kulkarni, Palo Alto, CA (US); Harshit Shah, Menlo Park, CA (US); Toby Leonard Baker, Redwood City, CA (US); David Leo Tondreau, III, San Francisco, CA (US); Harry Zhe Su, Union City, CA (US); Talbot Morris-Downing, Redwood City, CA (US); Darshan Hegde, Foster City, CA (US); Timothy Ryan, San Francisco, CA (US)

(73) Assignee: Dexterity, Inc., Redwood City, CA (US)

( * ) Notice: Subject to any disclaimer, the term of this patent is extended or adjusted under 35 U.S.C. 154(b) by 201 days.

(21) Appl. No.: 18/126,306

(22) Filed: Mar. 24, 2023

(65) Prior Publication Data

US 2023/0321825 A1 Oct. 12, 2023

Related U.S. Application Data

(60) Provisional application No. 63/323,818, filed on Mar. 25, 2022.

(51) Int. Cl.
*B25J 9/00* (2006.01)
*B25J 9/16* (2006.01)
*B25J 19/02* (2006.01)

(52) U.S. Cl.
CPC ........... *B25J 9/1653* (2013.01); *B25J 9/0093* (2013.01); *B25J 9/161* (2013.01); *B25J 9/163* (2013.01); *B25J 9/1633* (2013.01); *B25J 19/023* (2013.01)

(58) Field of Classification Search
CPC ........ B25J 9/1653; B25J 9/0093; B25J 9/161; B25J 9/163; B25J 9/1633; B25J 19/023; B25J 9/1697; G05B 19/4182; G05B 2219/39102; G05B 2219/39106
USPC ......................................................... 700/260
See application file for complete search history.

(56) References Cited

U.S. PATENT DOCUMENTS

| 4,692,876 A * | 9/1987 | Tenma | G06Q 10/08 901/7 |
| 5,452,567 A | 9/1995 | Lieder | |
| 5,501,571 A * | 3/1996 | Van Durrett | B65G 61/00 414/21 |
| 6,220,422 B1 | 4/2001 | Lee | |

(Continued)

FOREIGN PATENT DOCUMENTS

| CN | 209697521 | 11/2019 |
| CN | 110976317 | 4/2020 |

*Primary Examiner* — B M M Hannan
(74) *Attorney, Agent, or Firm* — Van Pelt, Yi & James LLP

(57) ABSTRACT

The present application discloses a system, a method, and a computer system for moving items deemed to be too heavy to be picked up by a robotic arm. The method includes (i) receiving sensor data from one or more sensors associated with a source conveyor configured to convey items to a pick location, (ii) determining, based at least in part on the sensor data, that an item that is too heavy to be lifted by a robotic arm controlled by the one or more processors has entered the source conveyor, and (iii) providing an output indicating that the item too heavy to be lifted by the robotic arm has been detected.

25 Claims, 46 Drawing Sheets

(56) References Cited

U.S. PATENT DOCUMENTS

| | | | |
|---|---|---|---|
| 6,253,904 B1 | 7/2001 | Soldavini | |
| 6,401,936 B1 | 6/2002 | Isaacs | |
| 8,931,240 B2 | 1/2015 | Lindee | |
| 9,381,645 B1* | 7/2016 | Yarlagadda | B65G 1/1378 |
| 9,630,321 B2* | 4/2017 | Bradski | B25J 9/1612 |
| 9,731,420 B1* | 8/2017 | Yarlagadda | G05B 19/42 |
| 10,099,381 B1* | 10/2018 | Yarlagadda | G05B 19/42 |
| 10,549,928 B1* | 2/2020 | Chavez | B65G 47/905 |
| 10,906,188 B1 | 2/2021 | Sun | |
| 10,954,081 B1 | 3/2021 | Sun | |
| 11,020,854 B2* | 6/2021 | Kanunikov | B25J 9/1671 |
| 11,205,059 B2 | 12/2021 | Wagner | |
| 11,912,513 B1* | 2/2024 | Polido | B25J 9/1697 |
| 12,219,899 B2* | 2/2025 | Lapalme | B65B 35/16 |
| 2002/0060060 A1 | 5/2002 | Hunter | |
| 2006/0045945 A1* | 3/2006 | Pack | A21C 9/066 426/283 |
| 2008/0257798 A1 | 10/2008 | Fethke | |
| 2012/0308343 A1 | 12/2012 | Habisreitinger | |
| 2013/0174960 A1* | 7/2013 | Goetz | B65C 9/26 156/64 |
| 2015/0001137 A1 | 1/2015 | Layne | |
| 2016/0136808 A1* | 5/2016 | Konolige | B25J 9/1612 700/214 |
| 2016/0221187 A1* | 8/2016 | Bradski | B65G 47/50 |
| 2019/0071261 A1 | 3/2019 | Wertenberger | |
| 2019/0099879 A1 | 4/2019 | Haddadin | |
| 2020/0095001 A1 | 3/2020 | Menon | |
| 2020/0151408 A1* | 5/2020 | Wagner | B65G 1/1378 |
| 2020/0151410 A1 | 5/2020 | Wagner | |
| 2021/0031373 A1 | 2/2021 | Drumwright | B25J 9/1664 |
| 2021/0122586 A1 | 4/2021 | Sun | |
| 2021/0229281 A1 | 7/2021 | Natarajan | |
| 2022/0072587 A1 | 3/2022 | Gealy | |
| 2022/0305678 A1* | 9/2022 | Talebi | G01G 19/14 |
| 2023/0150777 A1 | 5/2023 | Skyum | |
| 2023/0271791 A1 | 8/2023 | Graston | |
| 2023/0399136 A1* | 12/2023 | Budu | B25J 9/0084 |
| 2024/0002084 A1* | 1/2024 | Fowler | B65B 57/14 |
| 2024/0359927 A1* | 10/2024 | Li | B65G 61/00 |

* cited by examiner

420a

2800

3300

DETECTION OF HEAVY OBJECTS IN ROBOTIC INDUCTION

CROSS REFERENCE TO OTHER APPLICATIONS

This application claims priority to U.S. Provisional Patent Application No. 63/323,818 entitled DETECTION OF HEAVY OBJECTS IN ROBOTIC INDUCTION filed Mar. 25, 2022 which is incorporated herein by reference for all purposes.

BACKGROUND OF THE INVENTION

Parcel and other distribution centers may receive an arbitrary mix of items of various sizes, dimensions, shape, weight, rigidity, and/or other attributes, often in a cluttered arbitrary mix. Each item may have machine readable information, such as text and/or optically or otherwise encoded information, which can be machine read and used to route the item, e.g., via an automated sorting/routing system and/or processing. To read the information for a given item, in a typical approach the items are separated from one another via a process known as "singulation."

Typically, singulation has been performed manually by human workers. A mix of items arrives at a workstation, e.g., via a chute or other conveyance, and each of a set of one or more human workers manually separates items and places them in a defined space for a single item on a conveyor belt or the like. For each item, its destination (or at least next leg of transport) is determined by machine-reading information on the item, and the item is routed to a destination associated with the next leg, such as a bag, bin, container, or other receptacle and/or a delivery vehicle or staging area associated with the next leg.

Manual singulation processes are labor-intensive and can be inefficient. For example, a downstream human worker may have few locations on which to place singulated items, e.g., as a result of upstream workers filling many of the single item spots. Collective throughput may be suboptimal.

Use of robots to perform singulation is challenging due to the arrival of a cluttered mix of items at a workstation, the dynamic flow of items at each station and overall, and the result that it may be difficult to identify, grasp, separate (singulate) items using a robotic arm and end effector in an automated manner, and to adapt to changing states or conditions with respect to the workstation or the items therein.

BRIEF DESCRIPTION OF THE DRAWINGS

Various embodiments of the invention are disclosed in the following detailed description and the accompanying drawings.

DETAILED DESCRIPTION

Figure 1:
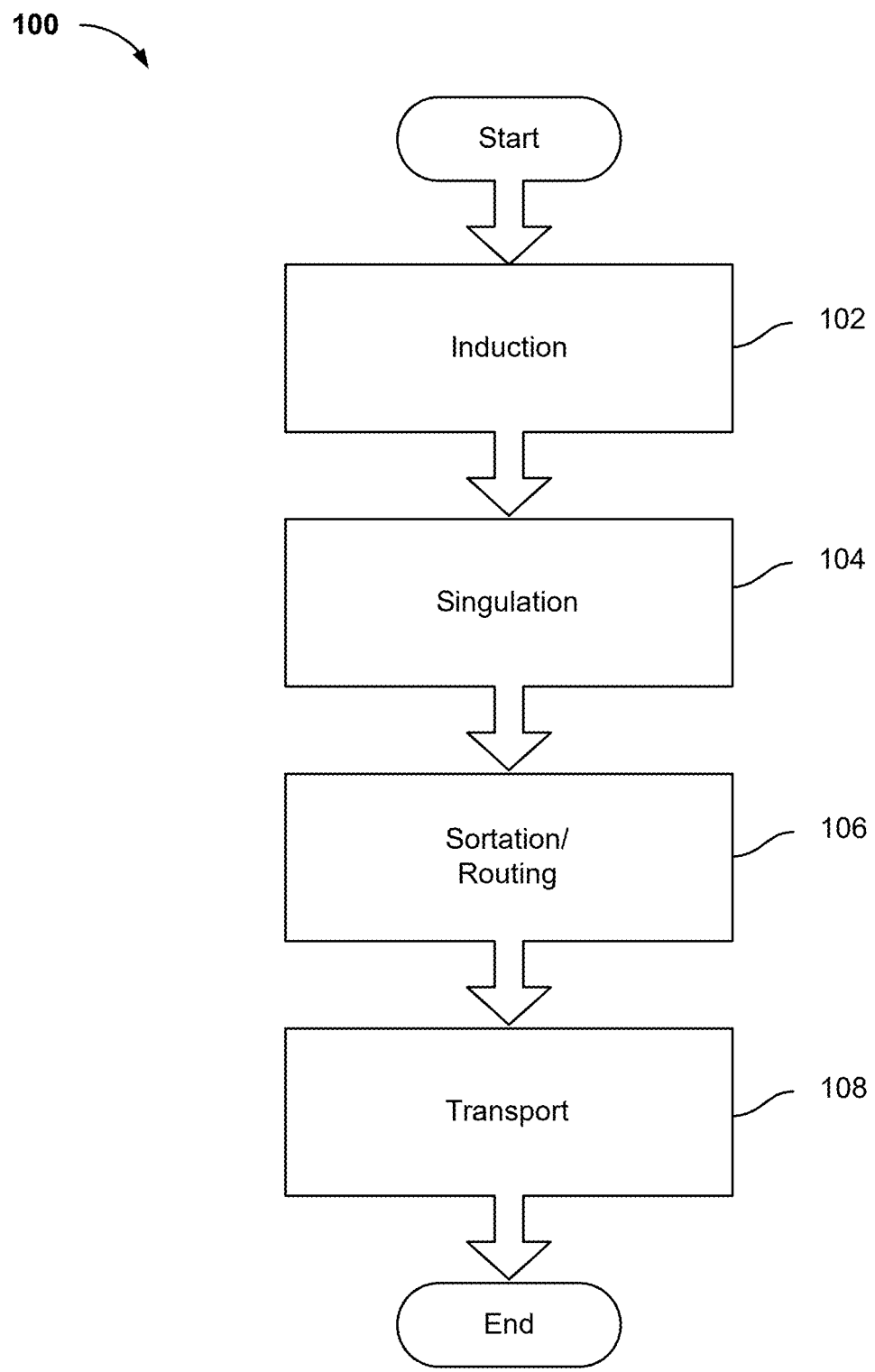
FIG. 1 is a flow diagram illustrating a process to receive, sort, and transport items for distribution and delivery.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor. An example of a singulation system and/or process for singulating a set of items is further described in U.S. patent application Ser. No. 17/246,356 and U.S. patent application Ser. No. 17/202,040, the entireties of which are hereby incorporated herein for all purposes.

As used herein, palletization of an item or a set of items includes picking an item from a source location, such as a conveyance structure, and placing the item on a pallet such as on a stack of items on the pallet.

As used herein, depalletization includes picking an item from a pallet, such as from a stack of items on the pallet, moving the item, and placing the item at a destination location such as a conveyance structure.

An example palletization/depalletization system and/or process for palletizing/de-palletizing a set of items is further described in U.S. patent application Ser. No. 17/343,609 and U.S. patent application Ser. No. 17/837,775, the entireties of which are hereby incorporated herein for all purposes.

As used herein, kitting includes the picking of one or more items/objects from corresponding locations and placing the one or more items in a predetermined location in a manner that a set of the one or more items corresponds to a kit. An example of a kitting system and/or process for kitting a set of items is further described in U.S. patent application Ser. No. 17/219,503, the entirety of which is hereby incorporated herein for all purposes.

As used herein, a vision system includes one or more sensors that obtain sensor data, for example, sensor data pertaining to a workspace. Sensors may include one or more of a camera, a high-definition camera, a 2D camera, a 3D (e.g., RGBD) camera, an infrared (IR) sensor, other sensors to generate a three-dimensional view of a workspace (or part of a workspace such as a pallet and stack of items on the pallet), any combination of the foregoing, and/or a sensor array comprising a plurality of sensors of the foregoing, etc.

Techniques are disclosed to programmatically use a vision system comprising one or more sensors (e.g., camera, infrared sensor, a light sensor, such as a bar-code scanner, etc.) to obtain routing data for items and/or to cause the items to be routed according to the routed data. One or more robotic systems may be controlled in connection with obtaining the routing data or routing the items. In some embodiments, the system captures an image of an item (e.g., a label on the item) and parses the image to determine the routing data. In response to determining that the system obtains only a subset of the routing data (e.g., a required element of the routing data has not been read/determined), the system captures another subset of the routing data based on information captured by another sensor in the workspace or based on a further processing of the image (e.g., the system performs an optical character recognition (OCR) with respect to alphanumeric characters represented in the image), and the system obtains the other subset of routing data based on such further processing.

Various embodiments include a system, method, and/or device for detecting items that are too heavy to be picked up by a robotic arm. The system includes a communication interface and one or more processors coupled to the communication interface. The communication interface may be configured to receive image data associated with a workspace. The workspace includes a source of items to be placed singly each in a respective corresponding location on a segmented conveyance structure adjacent to at least a portion of the source of items. The one or more processors are configured to: (i) receive an indication that a given first item in the source of items is too heavy to be picked up by a first robotic arm the one or more processors are configured to control, (ii) determine, based at least in part on the image data, a plan to use the first robotic arm to push the given item onto an associated corresponding location on the segmented conveyance structure as the associated corresponding location on the segmented conveyance structure moves past the source of items, and (iii) control the first robotic arm to implement the plan.

Various embodiments include a system, method, and/or device for determining whether an item is too heavy to be picked up by a robotic arm. The system includes a communication interface and one or more processors coupled to the communication interface. The communication interface may be configured to receive sensor data from one or more sensors associated with a source conveyor configured to convey items to a pick location. The one or more processors are configured to: (i) determine, based at least in part on the sensor data, that an item that is too heavy to be lifted by a robotic arm controlled by the one or more processors has entered the source conveyor, and (ii) provide an output indicating that the item too heavy to be lifted by the robotic arm has been detected.

Various embodiments include a system, method, and/or device for detecting items requiring special handling. The system includes a communication interface and one or more processors coupled to the communication interface. The communication interface may be configured to receive image data from one or more cameras associated with a source conveyor configured to convey items to a pick location. The one or more processors are configured to: (i) determine, based at least in part on the image data, that an item requiring special handling has entered the source conveyor, and (ii) provide an output indicating that the item requiring special handling has been detected.

Various embodiments include a system, method, and/or device for handling items that require special handling. The system includes a communication interface and one or more processors coupled to the communication interface. The one or more processors are configured to: (i) obtain an indication that a particular item in a source of items requires special handling, and (ii) actuate an item diversion structure comprising or otherwise associated with the source of items to divert the given item to a location associated with alternative item handling.

Singulation typically involves picking packages or other items from a source chute, bin, conveyor, or other source receptacle and placing them singly in a singulation/sortation destination (e.g., a destination location). Singulation may be performed in connection with a process of induction, such as a process by which packages received at a sorting/routing facility are received and placed singly on a segmented conveyor, tilt tray conveyor, or similar singulation structure which carries each package to a downstream location at which it is routed via automated processing to a further destination. For example, a package/item may be pushed (e.g., from a segmented conveyor) or dumped (e.g., by actuation of a tilt try) into a chute, bin, conveyor, or other downstream structure or conveyance associated with a downstream destination to which that package/item is to be delivered.

A robotic singulation system may use a robotic arm with an end effector, such as a suction-based end effector, to singly grasp items (e.g., from a pile or flow), and place each item in a corresponding destination location (e.g., a corresponding tilt tray or segment of a singulation/segmented conveyor) for downstream routing/sortation. A robot may encounter items that the robot that are unable to be safely inducted by grasping and placing into a moving tilt tray or conveyor segment. For example, the items may be large, bulky, and/or heavy items.

FIG. 1 is a flow diagram illustrating a process to receive, sort, and transport items for distribution and delivery. In the example shown, process 100 begins with an induction process 102 by which items are provided to one or more workstations for singulation via singulation process 104. In various embodiments, the singulation process 104 is at least partly automated by a robotic singulation system as disclosed herein. The singulation process 104 receives piles or flows of dissimilar items via induction process 102 and provides a stream of singulated items to a sortation/routing process 106. For example, the singulation process 104 may place items one by one on a segmented conveyor or other structure that feeds items one by one into a sortation/routing machine. In some embodiments, items are placed with an orientation such that a label or tag is able to be read by a downstream reader configured to read routing (e.g., destination address, service class, etc.) information and use the routing information to sort the item to a corresponding destination, such as a pile, bin, or other set of items destined for the same next intermediate and/or final destination. Once sorted, groups of items heading to a common next/final destination are processed by a transport process 108. For example, items may be placed in containers, loaded into delivery or transport trucks or other vehicles, etc., for delivery to the next/final destination.

A robotic system configured to determine a plan that takes into consideration an attribute of the item to be singulated and/or an attribute of another item within the workspace (e.g., an item on the conveyor) is disclosed. The related process 100 of FIG. 1 further fails to disclose that the attribute of the item to be singulated and/or the attribute of the item within the workspace is determined based at least in part on sensor data. In various embodiments, a plan for singulating an item is determined (and implemented) to avoid collisions between the item being singulated and another item in the workspace and/or an object in the workspace. The plan may be determined based on a determination of an expected collision, an active measure that is to be implemented to avoid the expected collision, a cost of moving the item according to the plan (e.g., according to a predefined cost function), an expectation (e.g., determined likelihood) that singulation of the item is to be successful, etc. Various embodiments determine a plan to facilitate improvement in the efficiency of paths or trajectories in connection with singulating an item and/or to improve the effectiveness of the singulation of items (e.g., the items may not be properly placed on the conveyor, a label may not be read by a sensor in the system in connection with singulating the item, etc.). The system may determine a plan to handle items for which a single robotic arm is unable to completely lift or for which the system deems to be subject to a special handling requirement. According to various embodiments, singulation of items from a source pile/flow is improved through the use of a dynamic singulation method or system that determines a path or trajectory for singulation of an item using one or more of an attribute of the item to be singulated and an attribute of another item within the workspace (e.g., an item on the conveyor). The dynamic singulation method or system can include an updating of the path or trajectory for singulation of an item in response to detecting one or more of an attribute of the item to be singulated and an attribute of another item within the workspace (e.g., an item on the conveyor).

Figure 2A:
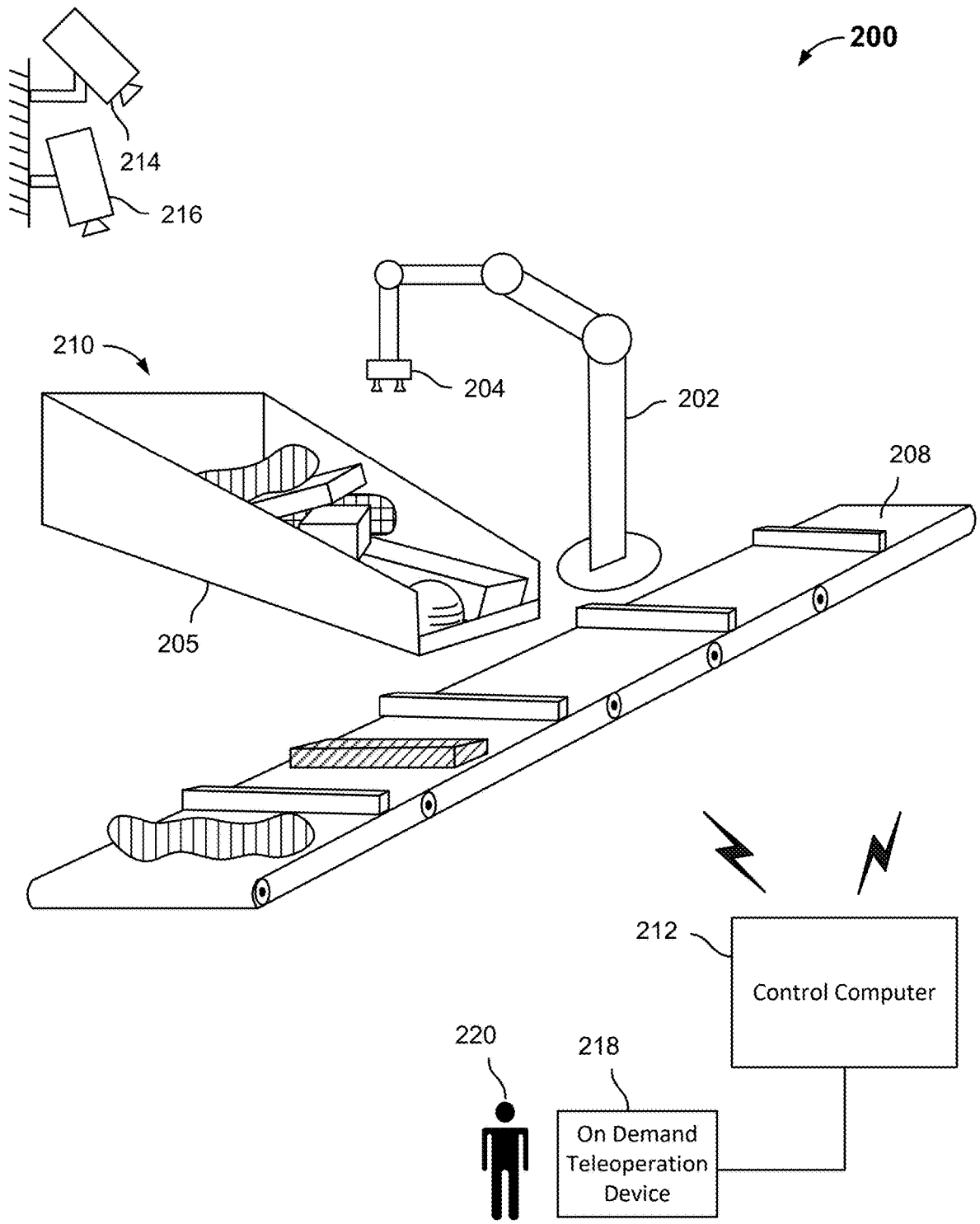
FIG. 2A is a diagram illustrating a robotic singulation system according to various embodiments.

FIG. 2A is a diagram illustrating a robotic singulation system according to various embodiments. In the example shown, system 200 includes a robotic arm 202 equipped with a suction-based end effector 204. While in the example shown the end effector 204 is a suction-based end effector, in various embodiments, one or more other types of end effectors may be used in a singulation system as disclosed herein, including without limitation a pinch-based end effector or other types of actuated grippers. In some embodiments, end effector 204 comprises one or more suction-based ends (e.g., one or more suction cups). As an example, end effector 204 is actuated by one or more of suction, air pressure, pneumatics, hydraulics, or another actuation. Robotic arm 202 and end effector 204 are configured to be used to retrieve items (e.g., parcels or other objects) that arrive via chute or bin and place each item in a corresponding location on segmented conveyor 208. In this example, items are fed into chute 205 from an intake end 210. For example, one or more human and/or robotic workers may feed items into intake end 210 of chute 205, either directly or via a conveyor or other electro-mechanical structure configured to feed items into source conveyor 206.

In the example shown, one or more of robotic arm 202, end effector 204, and conveyor 208 are operated in coordination by control computer 212. In some implementations, control computer 212 is configured to control (e.g., via control interface 213) a plurality of robotic arms operating at one or more workstations. In various embodiments, a robotic singulation as disclosed herein may include one or more sensors from which an environment of the workspace is modeled. In the example shown in FIG. 2A, system 200 includes a vision system that includes image sensors, including in this example 3D cameras 214 and 216. Various other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like.

In various embodiments, control computer 212 includes a workspace environment state system such as a vision system used to discern individual items, debris on the workspace, and each item's orientation based on sensor data such as image data provided by image sensors, including in this example 3D cameras 214 and 216. The workspace environment state system in some embodiments includes sensors in the robotic arm to detect a weight of an item (e.g., a grasped item) or to detect information from which an estimated weight is determined. In some embodiments, the system includes sensors disposed in other parts of the workspace environment. Examples of sensors include a sensor(s) disposed on or in proximity to a source conveyor, a sensor(s) that monitors the work (e.g. current utilization) of a motor driving a conveyor (e.g., a source conveyor), one or more sensor arrays (e.g., used in connection with determining heights or widths of objects based on the determination of a particular beam(s) that is blocked/disrupted), etc. For example, information pertaining to an amount of current, voltage, and/or power used by one or more motors driving movement of the robotic arm is used to determine the weight (or an estimated weight) of the item. As another example, the chute includes a weight sensor, and the weight of the item is determined based on a difference of the weight on the chute as measured by the weight sensor before the item is picked up and after the item is picked up. As another example, information pertaining to an output from one or more sensor arrays is used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). As another example, information pertaining to an output from one or more sensor arrays is used to determine a dimension or size of an item to be singulated and/or another item or object within the workspace. As another example, information pertaining to an output from one or more sensor arrays is used to determine routing data for the item, such as a destination, a service class, etc.

In some embodiments, the vision system comprises sensors that are disposed at different locations within the workspace. For example, the vision system comprises a camera at an induction location or chute to which items are input to the system and from which items are picked by robotic arm 202. As another example, the vision system comprises one or more sensors mounted to robotic arm 202, such as a sensor mounted to end effector 204. As another example, the vision system comprises one or more sensors disposed in proximity to conveyor 208 (e.g., the sensor may be configured to capture information pertaining to items being carried by conveyor 208, such as an image of an item or a label on the item).

The workspace environment state system produces output used by the robotic system to determine and implement a plan to autonomously operate a robotic structure to pick one or more items from the workspace and place each in a corresponding available defined location for machine identification and sorting, such as a partitioned section of segmented conveyor 208. In some embodiments, the workspace environment state system produces an output (e.g., sensor data or information otherwise characterizing the workspace and/or items within the workspace) used by the robotic system to detect a state, condition, and/or attribute associated with one or more items in the workspace, a state or condition associated with the robotic arm or other element of the workspace, and/or routing data for the item (e.g., a first element of routing data, such as a destination, and a second element of routing data, such as service class). According to various embodiments, in response to detecting (e.g., determining) the state, condition, and/or attribute or routing data associated with one or more items in the workspace, the robotic system implements one or more active measures in connection with singulating an item. As an example, the active measure includes updating the plan to autonomously operate a robotic structure to pick one or more items from the workspace and place each item singly in a corresponding location in a singulation conveyance structure. As another example, the active measure or the updating the plan includes operating the robotic structure to change or adapt to the detected state, condition, and/or attribute (e.g., implement a change or manner by which an item is singulated, change a path or trajectory along which the item is singulated, change a manner by which the item is grasped, change a location on the item at which the item is grasped, etc.). As another example, the active measure includes removing/moving a second item from a chute or source conveyor to create a path for moving a first item (e.g., a subsequent item or item behind the first item). As another example, the active measure includes pushing an item (e.g., an item deemed to be heavy) to a destination location (e.g., a segment/tray in the segmented conveyor). As another example, the active measure includes moving the item to an alternative location (e.g., by reversing a source conveyor, actuating a side wall of the source conveyor to enable the item to be pushed/moved to an alternative location, etc.). As another example, the active measure includes changing a speed of the conveyor(s) such as to facilitate a correct timing of the pushing/moving the item from the chute or source conveyor to a segment/tray in the segmented conveyor. As another example, the active measure includes changing a speed of a source conveyor. As another example, the active measure includes using one or more other robotic arms in coordination with a first robotic arm (e.g., robotic arm 202) to move the item to the applicable destination location.

In some embodiments, the active measure includes rescanning the item or otherwise moving or orienting the item in a manner that a sensor in the vision system captures the routing data for the item (e.g., capture an image of a label or other marking on the item). For example, in response to determining that the routing data was not captured by a sensor while the item was in source conveyor 206 or picked up (or otherwise being moved, such as via pushing) by robotic arm 202, system 200 (e.g., control computer 212) determines to rescan the item using the same sensor or another sensor in the workspace (e.g., a sensor mounted on robotic arm 202, or directed to capture information pertaining to conveyor 208, etc.). In connection with rescanning the item, control computer 212 controls the sensor to capture additional information (e.g., another image) and/or robotic arm 202 to move the item to be rescanned while in a different orientation. For example, robotic arm 202 may be controlled to move the item within proximity of the sensor (e.g., in the case of a barcode reader, to move the object over the range/area within which barcode reader is configured to read barcodes).

System 200 determines to rescan the item or further process the information initially captured by the vision system based at least in part on determining that the routing data was not successfully obtained or that all required information for the routing data has not been obtained. In some embodiments, the routing data includes destination information (e.g., a destination to which the item is to be delivered), service class information (e.g., an indication of a type of service according to which the item is to be delivered, such as ground, air, next day, etc.). As an example, if the routing data comprises two required pieces of information, such as destination information and service class information, and system 200 determines that one of the pieces of information is not successfully obtained (e.g., a first element of routing data is obtained but a second element of routing data is missing/not obtained), then system 200 determines to rescan the item or otherwise process the captured information (e.g., perform an OCR with respect to an image of the label).

In response to obtaining the required routing data (e.g., the first element of routing data and the second element of routing data), system 200 stores the routing data in association with the item. For example, the first element of routing data and the second element of routing data are correlated and stored in a data structure that is queried when determining how to route the item. In some embodiments, system 200 further associates the routing data for an item with a location within the workspace, such as a tray ID or an identifier associated with a particular segment of conveyor 208 on which the item was placed.

In various embodiments, a robotic system as disclosed herein includes and/or does one or more of the following, e.g., by operation of a control computer such as control computer 212:

Computer vision information is generated by merging data from multiple sensors, including one or more of 2D cameras, 3D (e.g., RGBD) cameras, infrared, and other sensors to generate a three-dimensional view of a workspace that includes one or more sorting stations. The robotic system determines characteristics of items and/or debris or other abnormalities in the three-dimensional view of the workspace.

Robotic system coordinates operation of multiple robots to avoid collisions, getting in each other's way, and contending to pick up the same item and/or place an item in the same destination location (e.g., segmented part of the conveyor) as another robot. The robotic system coordinates operation of a plurality of robots operating within a same workspace to singulate a plurality of items. For example, in various embodiments, the plurality of robots operate independently to pick and place items. If a risk of collision is detected, responsive action is taken to ensure the plurality of robots do not collide with one another during singulation.

Robotic system coordinates operation of multiple robots to ensure all items are placed and only one per slot/location/tray. For example, if robot A drops an item, the system tasks robot B to pick it up; item placed but with improper orientation is picked up and adjusted or moved to another location by the same or another robot; two or more items in a single destination slot result in the robot downstream station picking one of the two or more items off the conveyor and placing the item in a new location; etc.

Robotic system coordinates operation of multiple robots to push an item with one or more of the robots from a source conveyor or chute to a destination location (e.g., a tray/segment of the segmented conveyor, etc.). For example, the robotic system uses robot A to at least partially pick up the item, and uses robot B to assist with moving the item by pushing the item to the destination location. As another example, the robotic system uses robots A and B to cooperatively push (e.g., in coordination) the item from the source conveyor or chute to the destination location.

Robotic system controls the speed of the segmented conveyor (e.g., the conveyor comprising the destination location to which the item is to be moved) to coordinate timing of arrival of the destination location (e.g., the segment or tray) with the movement of the item using one or more robots. For example, in response to determining that the robot(s) are pushing/moving the item slower than expected, the robotic system controls the conveyor to slow (e.g., to delay the arrival of the destination location) or to stop the conveyor to enable the robot(s) to push/move the item to the destination location.

Robotic system actuates an actuation device comprised in the workspace to move the item in response to determining the item is subject to a special handling requirement. For example, the actuation device is configured to actuate a paddle or baffle that pushes the item in a desired direction and/or with a desired force. As another example, the actuation device is configured to move (e.g., raise or lower) a side wall to the source conveyor or chute and the robotic system controls the robot (e.g., a robotic arm) to push the item to an alternate location (e.g., a location that routes the item for special handling). As another example, the actuation device is configured to raise/lower a source conveyor to enable the source conveyor to be controlled to operate in reverse to move the item to the alternate location (e.g., the lowering the source conveyor provides sufficient clearance between the chute and the source conveyor). As another example, the actuation device is configured to raise/lower a chute to enable the source conveyor to be controlled to operate in reverse to move the item to the alternate location (e.g., the lowering the source conveyor provides sufficient clearance between the chute and the source conveyor).

Robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for singulation of items, the robotic system implements an active measure to ensure that the two or more robots avoid collision or otherwise reset independent operation of the two or more robots.

In response to a determination that two robots independently are tasked to acquire the same item, the system picks one at random to get that item and the other moves on to the next item (e.g., identify, select, determine grasp strategy, pick, move according to plan, and place).

The robotic system may manage the independent operation of a plurality of robots to ensure that the robots select items at different times to avoid the same item being selected for singulation by two different robots.

The robotic system may analyze all possible robotic arm-objects combinations and attempts to find a suitable pair. If no pair is found, then the best item for a particular robot (e.g., the primary robot) is selected as the item to be singulated by the particular robot. If there is no item for the particular robot (e.g., the particular robot) we default to an item for the secondary bot.

Conveyor movement and/or speed is controlled as needed to avoid empty locations and achieve a desired robot productivity (throughput)

In response to a determination that an item is misplaced or dropped, the system assigns a robot or, if needed, a human worker to pick it up and place it back in the retrieving robot's own source pile or, if available or more optimal, on a next open slot on the conveyor.

Upstream robots are controlled to intentionally leave some slots open for downstream robots to place items on the conveyor.

Downstream robots are controlled to correct errors from an upstream robot placing an item on the conveyor (e.g., to correct the placement of an item that rests in more than one slot/tray, to update a data structure with an association between an identifier for the item with the slot in which the upstream robot placed the item, etc.).

Failure that cannot be corrected by the same or another robot results in an alert to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

Move/remove the debris within the workspace, or reconfigure an item to be singulated (e.g., to improve the likelihood that the item is successfully picked from the source pile/flow and placed on the conveyance structure).

Control a chute conveyor to reconfigure items within the workspace (e.g., to bring an item selected for singulation closer to a front of the chute for quicker and easier access by the robotic arm, to reposition one or more items to improve the ability of a robotic arm to grasp an item, etc.).

Use sensor data from workspace environment state system (e.g., from one or more sensors within the workspace) to model chute flow (or model the workspace environment), detect a deviation from an expected chute flow (or from an expected workspace environment), use the sensor data to detect a clog or abnormality within the chute flow or workspace environment, and to implement an active measure to clear the clog.

Use sensor data from the workspace environment state system to detect one or more characteristics (e.g., attributes) of the item selected for singulation, determine that grasping or releasing of the item is expected to improve in response to implementation of an active measure, and implement the active measure to improve the grasping or releasing of the item.

Use sensor data to determine that the robotic arm has grasped a plurality of items in connection with singulation of one of the items, and determine a plan for releasing the plurality of items in order to place each item singly in a corresponding location in a singulation conveyance structure (e.g., selecting different locations in the singulation conveyance structure at which the corresponding items are to be placed, and/or determine a strategy for operating the end effector to release a first subset of the plurality of items at a different time from a second subset of the plurality of items).

Select a slot on the conveyance structure in which to place a selected item based on a size of the selected item and/or one or more characteristics of an item within a slot on the conveyance structure. For example, a slot is chosen to ensure that the selected item is not placed in a slot that is adjacent to a slot comprising a tall or large item.

Select a path for singulating an item on the conveyance structure based on an attribute of the item (e.g., a size of the selected item, a weight of the item, etc.) and/or one or more attributes (e.g., characteristics) of an item within a slot on the conveyance structure. For example, a path is determined to place the item in a slot that is adjacent to a slot comprising a tall or large item.

Determine a movement and speed of the robotic arm(s) that singulates an item based at least in part on a speed of a conveyor belt.

Determine a trajectory of the item to be singulated based at least in part on one or more of a characteristic of the item, a characteristic of the workspace environment, and/or a characteristic of the conveyance structure (e.g., a speed of the conveyor belt).

Determine a probability of successful singulation corresponding to one or more paths/trajectories of an item to be singulated, and select a path/trajectory along which the item is to be singulated based on the corresponding probability of success.

Determine a positioning of a robot arm and/or an end effector of the robot arm to obtain a successful grasp (e.g., as determined based on a probability of grasp success, a type of packaging of the item, a dimension of the item, an expected grip strength in relation to a threshold value, etc.). The positioning of the end effector can include controlling the robot arm or a wrist of the robot arm to move in order for the end effector to be orthogonal to a surface of the item.

Update the ability of the robotic system to detect an empty slot or tray. For example, the definition of an empty slot/tray used by the robotic system to identify an empty slot/tray is updated over time.

Determining whether to update a plan for singulating or moving an item. For example, the system determines to update the plan based at least in part on an expectation (e.g., expected likelihood) that the robot(s) will successfully move the item to the destination location. In response to determining that the expected likelihood is less than a likelihood threshold, the system determines to update the plan (e.g., to use a different manner to move the item, to use an additional robot(s) in coordination to move the item together, etc.).

Determine a manner by which the system captures routing data, such as rescanning an item or reprocessing information captured by a vision system (e.g., performing OCR with respect to an image of the item or label on the item).

Correlating elements of the routing data and storing the elements of routing data in association with the item, or a segment/slot/tray/location at which the item is placed.

In various embodiments, an arbitrary mix of items to be singulated may include items (e.g., parcels, packages, and/or letters) of a variety of shapes and sizes. Some items may be standard packages, one or more attributes of which may be known, others may be unknown. Sensor data such as image data is used, in various embodiments, to discern individual items (e.g., via image segmentation). The boundaries of partially occluded items may be estimated, e.g., by recognizing an item as a standard or known type and/or extending visible item boundaries to logical estimated extents (e.g., two edges extrapolated to meet at an occluded corner). In some embodiments, a degree of overlap (i.e., occlusion by other items) is estimated for each item, and the degree of overlap is taken into consideration in selecting a next item to attempt to grasp. For example, for each item a score is computed to estimate the probability of grasp success, and in some embodiments the score is determined at least in part by the degree of overlap/occlusion by other items. Less occluded items may be more likely to be selected, for example, other considerations being equal.

According to various embodiments, in some embodiments, system 200 selects and item and/or determines a strategy for grasping the item based on one or more item attributes.

If a source pile/flow has an arbitrary mix of items to be singulated, the source pile/flow generally includes items that have different types of packaging, such as a cardboard box packaging, a paper envelope packaging, a polybag packaging (e.g., polyethylene bags), etc. System 200 (e.g., control computer 212) determines the packaging of an item based on vision data obtained from the sensors, or based on a pressure attained between the end effector and the item when the robotic arm attempts to pick up the item. The sensor data can be used to discern a type of packaging corresponding to a particular item in the source pile/flow. In some embodiments, the robotic system determines a strategy for grasping the item based at least in part on the type of packaging corresponding to the item. For example, relatively heavier items packaged in a polybag will generally experience "tenting" between end effector suction cups. Tenting can cause sub-optimal suction from the end effector of the robotic arm, and thus the grasping of such an item is sub-optimal.

In response to determining that the item is relatively heavy (e.g., that the weight exceeds a predefined threshold) and that the item is packaged in a poly-bag, or in response to determining that tenting is being caused while grasping the item, the system 200 (e.g., robotic arm 202) performs an active measure to change or adapt to the "tenting" or to the determination of the type the packaging of the item. As an example, system 200 (e.g., robotic arm 202) performs an active measure to partially lift the package and drag the package from a source location (e.g., a chute, a funnel, a source conveyor comprising items fed by the chute or funnel, etc.) to the corresponding slot in the conveyance structure.

System 200 (e.g., control computer 212) determines a path or trajectory (or a trajectory of the robotic arm/end effector in approaching the item for grasp) based at least in part an item attribute for the item. For example, system 200 determines the path or trajectory based at least in part on a type of packaging of the item in order to avoid tenting or to otherwise improve a grasping of the item. As an example, the robotic arm (e.g., a wrist) and/or the end effector is controlled to be substantially orthogonal to a surface of the item from which the item is grasped. As another example, the path or trajectory of the robotic arm and/or end effector can be determined to knock an item over or otherwise reposition the item before grasping the item.

In various embodiments, multiple 3D and/or other cameras are used to generate image data. A 3D view of the scene may be generated, and/or in some embodiments a combination of cameras is used to look at the scene from different angles and the camera that is least occluded, e.g., with respect to a workspace and/or one or more specific items in the workspace, is selected and used in connection with the grasping and moving of the one or more items. The image data can be used to detect debris on the chute or within the workspace, a clog in the flow of items in the chute through the workspace, a number of items grasped by the robotic structure during singulation of a selected item, an attribute(s) of one or more items occupying slots on the conveyance structure or disposed in the chute or other pick up zone, etc. In some embodiments, the image data is used to determine a characteristic (e.g., an attribute) of one or more items in the workspace. As an example, the image data is used in connection with determining (e.g., estimating) a height or dimension of an item. As another example, the image data is used to obtain one or more elements of routing data, such as information pertaining to a destination, a service class, a sender, a recipient, an item/package identifier, etc.

The multiple cameras serve many purposes, in various embodiments. First such cameras provide a richer full 3D view into the scene. Next such cameras operate in cohesion to minimize the errors due to package shininess when light reflecting off a package and into a camera may disrupt its operation; in this case another camera at a different location provides a backup. In some embodiments, various cameras are selectively triggered by a predictive vision algorithm that determines which camera has the best viewing angle and/or lowest error rate for picking a particular package; as such each package has the optimal camera looking at it. In some embodiments, one or more cameras are mounted on an actuated base, of which the system can change the position and orientation to provide a more optimal perception (e.g., view) of a package. In some embodiments, one or more cameras are mounted on the robotic structure (e.g., on robotic arm 202 or on end effector 204 of robotic arm 202, etc.).

Another purpose served by cameras is, in various embodiments, to detect any sort of unforeseen error in robot operation or any disruption to the environment. Cameras placed on the robot (e.g., robotic arm 202) and on the environment have different error and accuracy profiles. Because cameras on the robot rigidly fixed to the robot, such cameras o can be more accurate but slower to use because use of such cameras requires the robot to slow down or stall. Cameras in the environment (e.g., the workspace of the robot) have a stable view and are effectively faster because the robot can multi-task and do something else while a camera is taking a photo. But if someone moves or shakes the camera stand, the cameras may become out of sync with the robot and cause errors. In various embodiments, images from robot and non-robot cameras are combined (e.g., occasionally or on a package miss) to detect if the robot is in sync with non-robot cameras. If the cameras are determined to be out of sync, the robot takes corrective action, such as performing a calibration or synchronization process, alerting a human operator, etc. In some embodiments, a camera may not be mounted rigidly on a robotic arm, and in some such embodiments gyros and/or accelerometers on the cameras may be used to filter or compensate for the motion of the mounting base.

According to various embodiments, system 200 may include one or more sensors other than or in addition to a plurality of cameras, such as one or more of an infrared sensor array, a laser array, a scale, a gyroscope, a current sensor, a voltage sensor, a power sensor, and the like. Information received from the various other sensors is used in determining one or more attributes of the item to be singulated and/or attributes of another item or object within the workspace, etc.

Referring to FIG. 2A, in various embodiments, robotic arm 202 is to be driven by one or more motors, e.g., one or more motors at each movable joint or mount location. In some embodiments, the work required to drive robotic arm 202 (e.g., to move the robotic arm as the robotic arm attempts to singulate an item) is indicative of one or more characteristics of the item to be singulated. For example, a weight of the item is computed (or estimated) based on the work required to drive the robotic arm 202 while the item is in its grasp. The work required to drive the robotic arm 202 may be measured using a current sensor, a voltage sensor, a power sensor, and/or the like, or some combination thereof. In response to determining the weight of the item during singulation, system 200 determines a path/trajectory of an item to be singulated based at least in part on the weight of the item. System 200 may perform an active measure to adapt to the weight of the item such as, for example, updating the path or trajectory in response to determining the weight of the item. As an example, in response to determining that the weight of the item is greater than a predefined threshold, system 200 adjusts the plan to singulate the item via partially picking up the item and dragging the item to the corresponding location on the conveyance structure (e.g., in contrast to wholly picking up the item and moving the arm to place the item on the conveyance structure). As another example, in response to determining the weight of the item, system 200 adjusts the speed at which the robotic arm (and the item) is moved. The larger the weight of the item, the greater the shear forces are between the item and end effector 204 as robotic arm 202 is moved. Further, the shear forces can increase as the speed at which robotic arm 202 is operated increases (e.g., the speed at which the robotic arm moves the item). Accordingly, system 200 can control the speed of robotic arm 202 based at least in part on the weight of the item to ensure that the item remains firmly grasped by robotic arm 202. Although the description hereof describes the weight being measured based on using a current sensor, a voltage sensor, a power sensor, and/or the like, the weight can also be measured using a force sensor configured in the robotic arm 202 or the end effector 204. However, force sensors are relatively expensive and thus low-level hardware information, such as motor torque or a measure of the work used by the motor is an effective manner by which to determine (e.g., estimate) the weight of the item.

In various embodiments, output from one or more sensor arrays is used to determine locations of objects/items within the workspace (e.g., packages, surfaces, conveyors, robotic arms, etc.) and one or more attributes for the objects/items. Information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays).

Information pertaining to an output from one or more sensor arrays can be used to determine an attribute of an item to be singulated and/or another item or object within the workspace. The attribute of an item may include routing data, dimensional data, weight data (or estimated weight data), packaging data, deformability data, fragility data, etc. As an example, information received from the one or more sensor arrays may be used in connection with determining a height of the item to be singulated and/or another item or other object within the workspace. In some embodiments, system 200 determines a path or trajectory (or updates the path or trajectory) based at least in part on height of the item to be singulated and/or another item or other object within the workspace. For example, the robotic system determines a location on the conveyor at which the item is to be placed based at least in part on a height (or other dimension) of one or more other items on the conveyor. Planning to place an item in a slot/tray adjacent to another slot/tray comprising a relatively large (e.g., tall, wide, etc.) item can increase the likelihood of a collision during singulation. In addition, a relatively large item on the conveyor can impede the ability of the robotic system to obtain information for adjacent items. The line of sight of the vision system may be blocked by a relatively large item and thus the sensor data may not include accurate information for adjacent items (or other items within close proximity to the large item). As another example, if the item includes an identifier or label on a side facing a relatively large item, or on a surface close to the large item, the vision system may be unable to locate or read the identifier or label.

Referring further to FIG. 2A, in the example shown, system 200 further includes an on-demand teleoperation device 218 usable by a human operator 220 to operate one or more of robotic arm 202, end effector 204, and conveyor 208 by teleoperation. In some embodiments, control computer 212 is configured to attempt to grasp and place items in a fully automated mode. However, if after attempting to operate in fully automated mode control computer 212 determines it has no (further) strategies available to grasp one or more items, in various embodiments, control computer 212 sends an alert to obtain assistance from a human operator via teleoperation, e.g., by human operator 220 using teleoperation device 218. For example, in some embodiments, in response to detecting a state or condition affecting item flow through a chute to source conveyor 206, control computer 212 may attempt to perform one or more actions to facilitate singulation. If fully automated attempts to respond to the detected state or condition are determined not to have resolved the state or condition, control computer 212 may prompt human operator 220 to address the state or condition, e.g., via teleoperation using on-demand teleoperation device 218. In various embodiments, control computer 212 may display a user interface or other interface that identifies the state or condition and/or presents human selectable options to control the robotic arm 202, end effector 204, and/or other elements and instrumentalities as disclosed herein (e.g., blowers, shakers, chute conveyors, etc.) to alter the state or condition.

In various embodiments, control computer 212 uses image data from cameras such as cameras 214 and 216 to provide a visual display of the scene to human operator 220 to facilitate teleoperation. For example, control computer 212 may display a view of the pile of items in source conveyor 206 or the chute or funnel feeding source conveyor 206. In some embodiments, segmentation processing is performed by control computer 212 on image data generated by cameras 214 and 216 to discern item/object boundaries. Masking techniques may be used to highlight individual items, e.g., using different colors. Human operator 220 may use the visual display of the scene to identify the item(s) to be grasped and use teleoperation device 218 to control the robotic arm 202 and end effector 204 to pick the item(s) from source conveyor 206 or chute or funnel feeding items to source conveyor 206, and place each in a corresponding location on conveyor 208. In various embodiments, once the item(s) for which human intervention was prompted have been placed on the conveyor, system 200 resumes fully automated operation. In various embodiments, in the event of human intervention, system 200 observes the human worker (e.g., manual task completion, task completion using a robotic arm and end effector via teleoperation) and attempts to learn a strategy to (better) complete the task in an autonomous mode in the future.

In some embodiments, system 200 invokes assistance from human operator 220 in response to determining that an abnormality in the operation of system 200 exists. An example of an abnormality is a lack of a threshold pressure being attained between end effector 204 and the item during singulation of the item. In response to detecting that the pressure attained between end effector 204 and the item is less than a threshold pressure value, robot system 200 can perform a diagnostics process in connection with assessing whether robot system 200 is performing normally. For example, system 200 can perform a diagnostic of the ability of end effector 204 to engage an item and attain a predetermined threshold pressure value. In response to determining that system 200 is not performing normally (e.g., that the end effector 204 is not able to engage an item and attain a predetermined threshold pressure value), system 200 invokes assistance from human operator 220. In some embodiments, control computer 212 sends an alert to human operator 220. The alert can indicate the basis of the problem (e.g., an indication that the end effector is unable to engage the item and attain a predetermined threshold pressure value). For example, the alert can provide a recommended or requested remedial action to human operator 220.

Figure 2B:
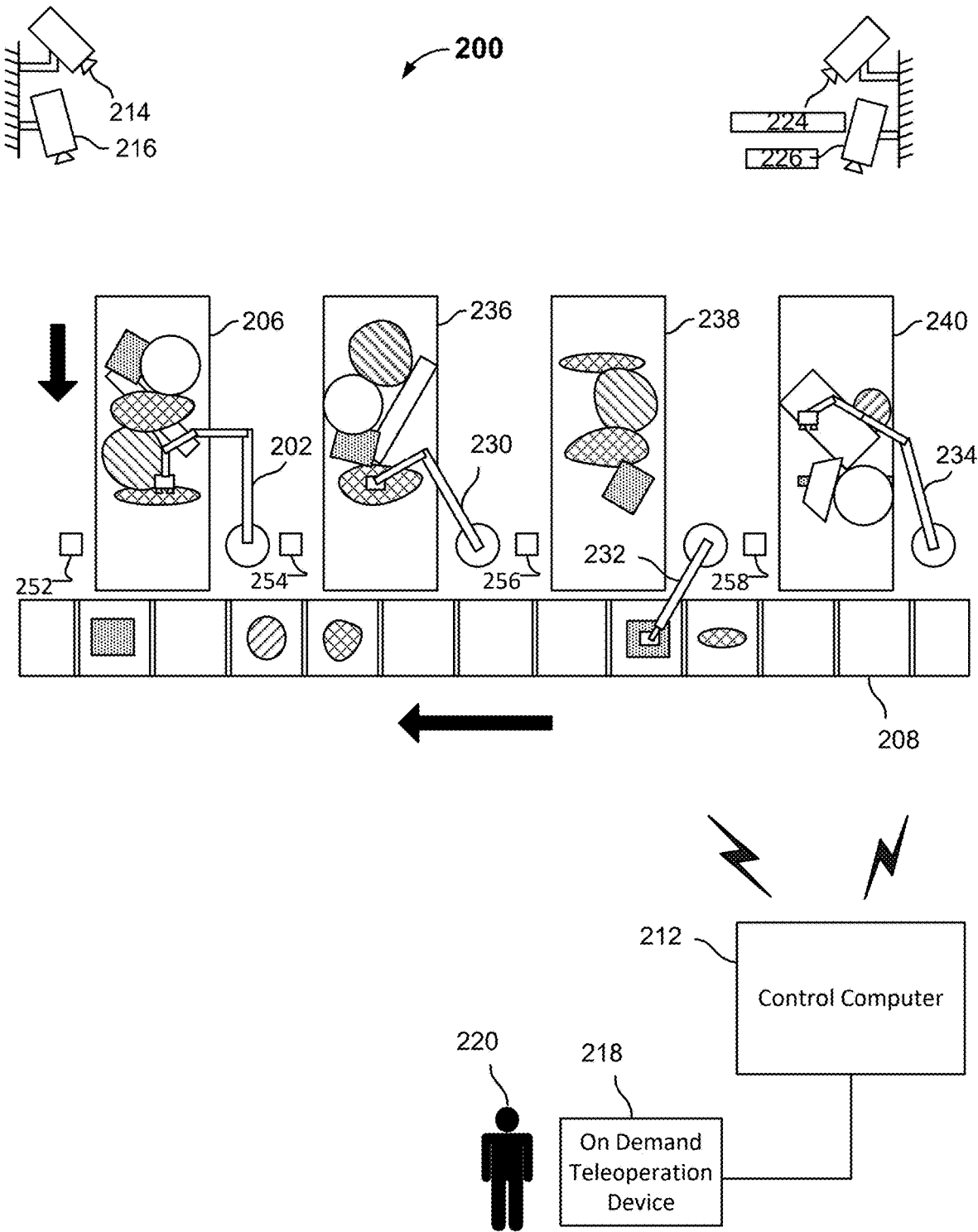
FIG. 2B is a diagram illustrating a robotic singulation system according to various embodiments.

FIG. 2B is a diagram illustrating a robotic singulation system according to various embodiments. In the example shown, the robotic singulation system of FIG. 2A has been expanded to include a plurality of singulation stations. Specifically, in addition to robotic arm 202 configured to pick items source conveyor 206 or chute or funnel feeding items to source conveyor 206, and place each item on a corresponding available and/or assigned location on segmented conveyor 208, the system shown in FIG. 2B includes three additional stations: robotic arms 230, 232, and 234 positioned and configured to pick/place items from source conveyors 236, 238, and 240, respectively. Additional cameras 224 and 226 are included, in addition to cameras 214 and 216, to provide a 3D view of the full scene, including each of the four stations/chutes or funnels to source conveyors 206, 236, 238, and 240, as well as conveyor 208 (e.g., a segmented conveyor, etc.).

In some embodiments, system 200 further comprises one or more additional sensors that are used to capture data pertaining to an item to be singulated. In the example shown, system 200 comprises sensors 252, 254, 256, and 258. Sensors 252-258 may be respectively disposed in proximity to a robotic arm and/or corresponding chute. As an example, sensors 252-258 are barcode readers/scanners or other sensors that capture data pertaining to a label affixed to the item (e.g., routing data, identifier data, etc.). A robotic arm may determine a path/trajectory for singulating an item to conveyor 208 based on a location of a sensors to be used to capture data from (e.g., an image of) a label on the item. For example, in the case of robotic arm 202, robotic arm 202 can control to move an item over the detection range of sensor 252 to capture routing data on the label of the item. System 200 may control robotic arm 202 to move the item being singulated from source conveyor 206 or chute or funnel feeding items to source conveyor 206 to conveyor 208 to within detection range of sensor 252 in response to determining that the vision system (e.g., cameras 214, 216, 224, and/or 226) was unsuccessful in capturing the label data. In some embodiments, system 200 controls robotic arm 202 to try multiple re-scanning attempts of an item using sensor 252, until the earlier of (i) label data is successfully captured, and (ii) a threshold number of attempts have been tried or a threshold time period has elapsed. The rescanning attempts may include repetitively moving the item across the detection range, such as at different orientations in order for the sensor to capture the label data.

In various embodiments, control computer 212 coordinates operation of the four robotic arms 202, 230, 232, and 234 and associated end effectors, along with conveyor 208, to pick/place items from (i) source conveyors 206, 236, 238, and 240 or chutes or funnels feeding items to source conveyors 206, 236, 238, and 240, to (ii) conveyor 208 in a manner that achieves a desired collective throughput of the system (e.g., a collective throughput that satisfies a throughput threshold, etc.). The plan or trajectory of an item during singulation at one station can be determined based at least in part on an attribute of an item to be singulated at another station, or based at least in part on a plan or trajectory of an item to be singulated at the other station. For example, the path or trajectory of an item to be singulated can be determined so as to avoid a collision (e.g., intersect) with the path or trajectory of another item to be singulated.

While in the example shown in FIG. 2B each station has one robotic arm, in various embodiments two or more robots may be deployed at a station, operated under control of an associated control computer, such as control computer 212 in the example shown in FIG. 2B, in a manner that avoids the robots interfering with each other's operation and movement and which maximizes their collective throughput (or attains a desired collective throughput such as in relation to a collective throughput threshold), including by avoiding and/or managing contention to pick and place the same item. In some embodiments, a plurality of robotic arms operating at the same workspace work independently to singulate the plurality of items. One or more of the plurality of robotic arms can perform an active measure to avoid a collision between two robotic arms in response to detecting a collision or a potential for a collision between the two robotic arms. For example, control computer 212 can coordinate operation of the plurality of robots to enable the plurality of robots to operate independently while ensuring that the plurality of robots and/or the items grasped by the plurality of robots do not collide with one another during singulation. The active measure can include updating a plan for singulating the item, such as changing a path or trajectory along with an item to be singulated. As an example, the robots (or control computer 212) access information from which their respective positions and the positions of one or more other robots are determined, and the robots are controlled to avoid an intersection between their respective positions and the positions of the one or more other robots at a certain time. In some embodiments, a first robot reserves an airspace (e.g., a certain position) that is to be used by the first robot during singulation of an item. The airspace can include the path or trajectory along which the item is to be singulated. In connection with a second robot scheduling singulation of an item, the second robot determines the plan to singulate the item based at least in part on the airspace reserved by the first robot. For example, in connection with scheduling singulation of the item, the second robot determines that the plan cannot include movement through the airspace reserved by the first robot and the second robot determines a plan that does not require the second robot or the item to move through the airspace reserved by the first robot during the time at which the airspace is so reserved. The second robot determines a path or trajectory along which the second item is to be singulated based on the airspace reserved for singulation of the first item and/or an attribute of the second item or first item such as a size of the first item or second item.

In various embodiments, a scheduler coordinates operation of a plurality of robots, e.g., one or more robots working at each of a plurality of stations, to achieve desired throughput without conflict between robots, such as one robot placing an item in a location the scheduler has assigned to another robot. The desired throughput can be a collective throughput that exceeds a predetermined throughput threshold.

A robotic system as disclosed herein may coordinate operation of multiple robots to one by one pick items from a source bin or chute and place the items on an assigned location on a conveyor or other device to move items to the next stage of machine identification and/or sorting. In some embodiments, each of at least a subset of a plurality of robots working at a workspace picks an item independent from the other robots of the plurality of robots and a corresponding plan for singulation of the item is determined. The at least the subset of the plurality of robots can pick in a predefined order such that no two robots select or pick an item at the same time. Each of the at least the subset of the plurality of robots can select or pick an item based on items that are currently available at the time of such selection. Accordingly, a second robot of the at least two subset of the plurality of robots that picks after a first robot will select an item to singulate that is different from the item selected or picked by the first robot.

System 200 can include multiple robots that may pick from a same chute or other source receptacle. In the example shown in FIG. 2B, for example, robotic arm 202 may be configured to pick from either source conveyor 206 or source conveyor 236. Likewise, robotic arm 230 may pick from source conveyor 236 or source conveyor 238 and robotic arm 232 may pick from source conveyor 238 or source conveyor 240. In some embodiments, two or more robotic arms configured to pick from the same chute may have different end effectors. A robotic singulation system as disclosed herein may select the robotic arm most suitable to pick and singulate a given item. For example, the system determines which robotic arms can reach the item and selects one with the most appropriate end effector and/or other attributes to successfully grasp the item.

While stationary robotic arms are shown in FIG. 2B, in various embodiments one or more robots may be mounted on a mobile conveyance, such as a robotic arm mounted on a chassis configured to be moved along a rail, track, or other guide, or a robotic arm mounted on a mobile cart or chassis. In some embodiments, a robotic instrumentality actuator other than a robotic arm may be used. For example, an end effector may be mounted on and configured to be moved along a rail, and the rail may be configured to be moved in one or more axes perpendicular to the rail to enable the end effector to be moved to pick, translate, and place an item as disclosed herein.

According to various embodiments, a robotic singulation system as disclosed herein, such as system 200 of FIG. 2A or the multi-station system of FIG. 2B, further comprises one or more chutes or funnels (e.g., chute 205) that respectively feed items to the source conveyors (e.g., source conveyor 206, source conveyor 236, source conveyor 238, and/or source conveyor 240).

According to various embodiments, a robotic singulation system as disclosed herein, such as system 200 of FIG. 2A or the multi-station system of FIG. 2B, manages a distributed data structure pertaining to the operation of one or more robots comprising the system and/or a state of the conveyance structure. For example, the distributed data structure may include one or more fields associated with each slot in the conveyance structure. The one or more fields may include a set of one or more fields for routing data (e.g., for elements of the routing data). For example, the set of one or more fields for routing data includes a field for destination data, a field for service class, etc.

According to various embodiments, the distributed data structure operates at a speed far in excess of the speed at which robots in the system operate. For example, the distributed data structure operates (e.g., is updated) on the order of 1 μs or 1 ms, and time at which the robots physically operate/move is on the order of 100 ms. In some embodiments, the control loop for a particular robot is substantially equal to, or on the order of, 800 Hz, and the control loop for the control computer (e.g., the dispatcher) sending targets to the robot is substantially equal to, or on the order of, 100 Hz.

The data structure may be atomic in that if one robot is updating the status of a slot, then another robot will not be able to read that information until the write is complete. Accordingly, the distributed data structure can be updated based on operation of a robot or a plan for singulation associated with a robot. Because the speed at which the robots operate is slower than the speed at which the distributed data structure operates, the distributed data structure is updated to reflect changes in the state of the workspace (e.g., the state of the conveyance structure) relatively quickly and the distributed data structure is likely to have been updated with the latest state by the time the robotic obtains and/or uses information from the distributed data structure in connection with determining a plan/strategy for singulating an item (e.g., selecting/claiming a slot in the conveyor). In some implementations, the relative speed of the distributed data structure reduces the likelihood that two robots would claim a slot on the conveyor at the same time and cause a fault in the distributed data structure. Accordingly, the distributed data structure can be updated based on operation of a robot or a plan for singulation associated with a robot.

In various embodiments, each (mostly) independently operated singulation robot comprising a system associated with an output conveyor updates the distributed data structure with information pertaining to a plan or with information pertaining to one or more characteristics associated with the workspace (e.g., whether a slot in the conveyor is occupied or claimed for use by a robot in the system as a planned destination to place an item on the conveyor). As an example, if the robot receives an error in connection with an attempt to write information to the distributed data structure (e.g., to claim a slot on the conveyor for its use), the robot waits a predetermined interval and re-attempts to write such information to the distributed data structure. If the data cannot be written because another robot has already written data to that location (e.g., already claimed an associated slot on the output conveyor), the robot chooses another slot determined to be available by reading another location in the data structure. In response to the data structure being updated by one robot, the data structure may be automatically updated with respect to one or more other robots within system 200. For example, in response to determining that an update (e.g., a write or delete operation) is performed, the update is distributed to the other robots within system 200.

The data structure may be a shared data structure to which a plurality of robots within a system have access (e.g., to read, write, etc.). In some embodiments, a distributed data is hosted on one machine (e.g., computer system), and all robots within a system have an active network connection to that machine (e.g., computer system) and can individually read/write data (e.g., to the data structure). The information pertaining to the data structure may be stored on a server.

In various embodiments, a robot may update the distributed data structure with information pertaining to a plan or with information pertaining to one or more characteristics associated with the workspace (e.g., whether a slot is occupied). For example, in response to the robot updating a plan to singulate an item (e.g., the path or trajectory along which the item is to be singulated), the robot may update the distributed data structure with information pertaining to a plan or with information pertaining to one or more characteristics associated with the workspace.

According to various embodiments, the distributed data structure comprises a field associated with a slot in the conveyance structure that is used to indicate whether the slot is occupied or reserved for an item in connection with singulation of the item by the robot. For example, a value in the field associated with a slot is indicative of whether the slot can be reserved or used by another robot for scheduling an item. In some embodiments, when a robot is determining (or updating) a plan to singulate an item, a slot on the conveyance structure is reserved. The slot in the conveyance structure (or tray on the conveyance structure) is reserved based at least in part on the distributed data structure pertaining to the state of the conveyance structure. For example, a slot associated with a field indicating that the slot is empty or unreserved can be reserved for singulation of an item. Occasionally, a robot arm can erroneously release an item in a slot different from a slot that corresponded to the singulation plan, or in a manner that the item straddles two slots (e.g., adjacent slots). The corresponding robot (or a downstream robot or sensor/camera) can detect that a slot has an item therein in contradiction to the corresponding field in the distributed data structure (e.g., such field indicating that the slot is empty or not reserved). In response to detecting that the slot has an item therein in contradiction to the corresponding field in the distributed data structure, the robot system updates the data structure to indicate that the slot is occupied or reserved.

According to various embodiments, the distributed data structure includes information pertaining to a timestamp, a speed of the conveyor, and one or more characteristics of a slot in the conveyor (e.g., an indication of whether the slot is occupied or reserved). The distributed data structure can include information pertaining to one or more attributes of one or more items within a slot or tray on the conveyor and/or an attribute of an item to be singulated by a robot within the robot system. The robot system can determine a plan for singulating an item from a source pile/flow to a slot in the conveyor based at least in part on the distributed data structure. For example, system 200 determines, based on the timestamp and the speed of the conveyor, a set of slots in which an item picked from the source pile/flow can be placed. System 200 can select a slot, from among the set of slots, that is empty or not reserved as a slot in which the item is to be singulated. The timestamp and the speed of the conveyor are used because system 200 can determine one or more slots with which the path or trajectory of the item being singulated can be caused to intersect based on operating the corresponding robot.

Figure 3:
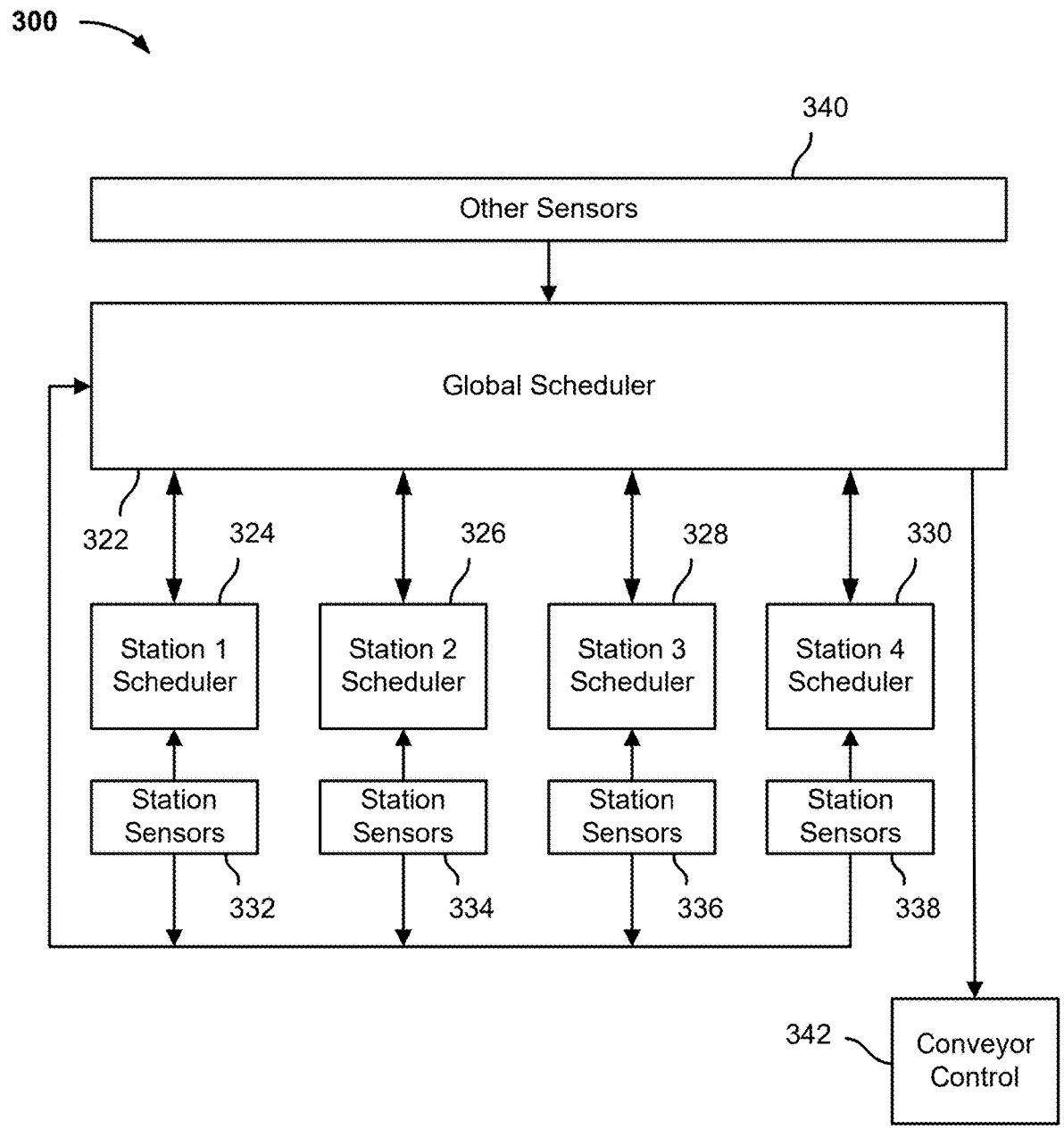
FIG. 3 is a diagram of a hierarchical scheduling system according to various embodiments of a robotic singulation system.

FIG. 3 is a diagram of a hierarchical scheduling system according to various embodiments of a robotic singulation system. In various embodiments, the hierarchical scheduling system 300 of FIG. 3 is implemented at least in part on a computer, such as control computer 212 of FIGS. 2A and 2B, control computer 512 of FIGS. 5A and 5B, control computer 815 of FIG. 8A, control computer 917 of FIG. 9, and control computer 1028 of FIG. 10A. In the example shown, hierarchical scheduling system 300 includes a global scheduler 322 configured to optimize throughput (or attain a desired throughput) by coordinating the operation of a plurality of robotic singulation stations and a segmented conveyor (or similar structure) on which the robotic singulation stations are configured to place items. According to various embodiments, the global schedule 322 is configured to coordinate operation of a plurality of robotic arms within a single workspace to ensure a desired throughput is attained while ensuring that the plurality of robots do not collide. Global scheduler 322 can be configured to implement an active measure in response to determining that a plurality of robotic arms (e.g., operating within a single workspace) have collided or are expected to collide (e.g., if the plurality of robots were to continue implementing their respective plans or strategies for singulating an item). The active measure can include causing one or more paths or trajectories of an item to be singulated by the plurality of robotic arms to be updated to ensure that the expected collision is avoided. Global scheduler 322 may be implemented as a processing module or other software entity running on a computer. The global scheduler supervises and coordinates work among the robotic singulation stations at least in part by monitoring and as needed controlling and/or otherwise providing input to a plurality of robotic singulation station schedulers 324, 326, 328, and 330.

In some embodiments, a robotic singulation station includes a single robotic arm that is controlled to singulate an item within a workspace, and a workspace can include a plurality of robotic singulation stations. A robotic singulation station includes a plurality of robotic arms that are coordinated to singulate a plurality of items within a workspace. In some cases, if the robotic singulation station includes a plurality of robotic arms, a particular workspace can include a single robotic singulation station.

Each of the robotic singulation station schedulers 324, 326, 328, and 330 is associated with a corresponding robotic singulation station and each controls and coordinates the operation of one or more robotic arms and associated end effectors to pick items from a corresponding chute or other item receptacle and place them singly on a segmented conveyor or similar structure. Each of the robotic singulation station schedulers 324, 326, 328, and 330 is associated with a corresponding set of one or more station sensors 332, 334, 336, and 338, respectively, and each uses the sensor data generated by its station's sensors to perform automated singulation at its robotic singulation station. In some embodiments, each implements and performs process 400 of FIG. 4A, process 420a of FIG. 4B, process 420b of FIG. 4C, process 600 of FIG. 6, process 850 of FIG. 8B, process 875 of FIG. 8C, and process 1050 of FIG. 10B, and process 1075 of FIG. 10C.

In various embodiments, each of the robotic singulation station schedulers 324, 326, 328, and 330 reports to global scheduler 322 one or more of image and/or other station sensor data; object identification, grasp strategy, and success probability data; pick/place plan information; path or trajectory information; and expected item singulation throughput information. Global schedule 322 is configured to use information received from the robotic singulation station schedulers 324, 326, 328, and 330—along with sensor data received from other sensors 340, such as cameras pointed at the segmented conveyor and/or other parts of the workspace not covered or covered well or completely by the station sensors—to coordinate work by the respective robotic singulation stations, each under the control of its station-specific scheduler 324, 326, 328, and 330, and to control the operation (e.g., speed) of the segmented conveyor via conveyor controller 342, so as to optimize (e.g., maximize) the collective singulation throughput of the system.

In various embodiments, the global scheduler 322 employs one or more techniques to implement collision avoidance between a plurality of robots comprising the robotic singulation system while using the plurality of robots to perform singulation, e.g., to maximize overall throughput or to attain a desired overall throughput level. For example, a particular workspace can include a plurality of robots operating to singulate items within the particular workspace (e.g., the plurality of robots picks items from a same source pile/flow in a chute and singly place the respective items in corresponding slots of the conveyance structure). Because the workspace includes a plurality of robotic arms to singulate items therein, the robotic arms can have respective ranges of motion that overlap with each other. In some embodiments, the global scheduler 322 detects an expected collision event based at least in part on information received from the robotic singulation station schedulers 324, 326, 328, and 330—along with sensor data received from other sensors 340, such as cameras pointed at the segmented conveyor and/or other parts of the workspace not covered or covered well or completely by the station sensors—to coordinate work by the respective robotic singulation stations. According to various embodiments, global scheduler 322 uses the information received from the respective robotic singulation station schedulers 324, 326, 328, and 330 to determine locations of the plurality of robots and determine a probability that two of the plurality of robots will collide with each other or that a robot will collide with another object within the workspace at which the robot operates. For example, the global scheduler detects an expected collision event based at least in part on a location of at least one robot and a path or strategy (for singulating an item) for at least one robot. In some embodiments, the expected collision event is detected based on a determination that a location or path of a first robot (or item grasped by the first robot) is planned to intersect with a location or path of a second robot (or item grasped by the first robot) at a particular time.

In some embodiments, each robot operating in a workspace in which a plurality of robots pick items from a common source, such as the same chute, operates mostly independently to identify and grasp items to be picked by that robot from the source. Conflicts may be minimized or avoided by configuring each robot to pick from potentially overlapping assigned regions of the chute or other source. For example, each robot may pick (primarily) from the side of the chute nearest to that robot. Or, in some embodiments, one robot may be configured to pick (primarily) from the back of the chute (farthest from destination conveyor) and another from the front of the chute (nearest to the destination conveyor). In some embodiments, in the event of a detected (risk of) collision, each robot implements a random wait interval and resumes operation. If the different/random waits result in no risk of collision, both resume and continue operation. In some embodiments, a heuristic or logic may be applied to resolve/avoid collisions, such as by allowing the robot targeting an item further back in the chute to reach and grasp first, followed by the robot targeting an item nearer the front (i.e., nearer the destination conveyor). In some embodiments, the robot that picked from nearer to the end of the chute may move first to place its item, followed by the robot that grasped an item from farther back.

In some embodiments, the plurality of robots operating at a single workspace operate to implement respective processes to singulate items in parallel, and each of the plurality of robots contemporaneously operates to implement a particular step or set of steps in a sequence of steps of the respective processes to singulate items before either of the plurality of robots moves to the next step or set of steps in the sequence of steps. For example, each of the plurality of robots operate to pick an item from a source pile/flow and each of the plurality of robots wait until the other robot(s) correspondingly pick an item before progressing to the next step or sequence of steps in the process to singulate items from the workspace. As another example, each of the robots operate to move the items from the chute area from which an item was grasped to a particular location at the conveyance structure at which the item is to be placed, and each of the plurality of robots wait until the other robot(s) correspondingly move the items in their grasp to corresponding locations at the conveyance structure before progressing to the next step or sequence of steps in the process to singulate items (e.g., to place the items on the conveyance structure). In the foregoing manner, a plurality of robots operates independently to determine plans and strategies for singulating items within a workspace, however, the plurality of robots are coordinated in progressing through the singulation process. According to various embodiments, a collision event is detected based on a determination that a location or path of a first robot (or item grasped by the first robot) is planned to intersect with a location or path of a second robot (or item grasped by the first robot) at a particular step in a singulation sequence. In such a manner, a location or path of a robot is only used by a single robot during a particular step or set of steps in the singulation process.

According to various embodiments, the robotic singulation station schedulers 324, 326, 328, and 330 register with global scheduler 322 plans or strategies for operating corresponding robots to singulate items, or otherwise store such plans or strategies in a storage location that is accessible to global scheduler 322. The robotic singulation station schedulers 324, 326, 328, and 330 can independently determine the plans or strategies for operating corresponding robots to singulate items. In some embodiments, although the robotic singulation station schedulers 324, 326, 328, and 330 operate independently to determine their respective plans or strategies, the robotic singulation station schedulers 324, 326, 328, and 330 determine their respective plans or strategies at different times (e.g., so that a same item is not selected for singulation by two robots, etc.). In some embodiments, the robotic singulation station schedulers 324, 326, 328, and 330 operate independently to determine their respective plans or strategies, and the robotic singulation station schedulers 324, 326, 328, and 330 register with their respective plans or strategies global scheduler 322 at different times, and global scheduler 322 can send a fault to a robotic singulation station scheduler if during registration of its plan or strategy global scheduler 322 that such plan or strategy conflicts with an existing registered plan or strategy. Examples of instances in which plans or strategies are deemed to conflict include a plurality of plans or strategies pertaining to singulation of a same item from the workspace, a plurality of plans or strategies using a same path or trajectory, a plurality of plans or strategies using intersecting paths or trajectories, a plurality of plans or strategies including moving a part of the robotic arm or item to a same location, a plurality of plans or strategies selecting a same slot at the conveyance structure in which corresponding items are to be placed, etc. Various other conflicts between plans or strategies are possible.

Although the robotic singulation station schedulers 324, 326, 328, and 330 operate independently to determine plans or strategies for operating corresponding robots to singulate items, in various embodiments, global scheduler 322 provides oversight over the entire robotic system to detect an expected collision event and to implement an active measure to prevent the expected collision event. In some embodiments, implementing the active measure includes sending a fault to a robotic singulation station scheduler (e.g., corresponding to at least one of the robots identified to be associated with the expected collision event). For example, in response to sending the fault to the robotic singulation station scheduler, global scheduler 322 can require the robotic singulation station scheduler to update its current plan or strategy (e.g., in a manner that avoids the expected collision event). The fault sent to the robotic singulation station scheduler can include an indication of the reason for the fault (e.g., an indication of the expected collision event, and/or information pertaining to the expected collision event such as an indication of the manner by which the plan or strategy of the robotic singulation station scheduler conflicts with the plan or strategy of another robotic singulation station scheduler). In response to global scheduler 322 determining that a path or trajectory for singulation of a first item intersects with a path or trajectory of another item or with a location of an object within the workspace, global scheduler 322 sends a fault to the robotic singulation station scheduler for the robotic structure to singulate the first item and causes such robotic singulation station scheduler to update the path (e.g., the path or trajectory) for singulating the first item in a manner that avoids such a collision.

In various embodiments, the global scheduler 322 employs one or more techniques to optimize the use of a plurality of robots comprising the robotic singulation system to perform singulation, e.g., to maximize overall throughput or to attain a desired overall throughput level. For example, if there are four robots in sequence, the lead (or other upstream) robot may be controlled to place packages in a manner that leaves open slots so that a downstream robot is not waiting for an empty slot. This approach has impacts because downstream robots wait for some unknown/random amount of time because of package flow etc. As a result, a naive strategy (say lead robot places into every empty $4^{th}$ slot) may not optimize collective throughput. Sometimes it might be better for the lead robot to put 2-3 packages into successive slots in sequence if its packages are not flowing, but overall the system makes such decisions with awareness of state and flow at each station. As an example, the optimal strategy for leaving open slots for downstream robots is based on an anticipated request for an open slot by the downstream robot (as a function of their package flow, for example). In some embodiments, information from the local station scheduler is used to anticipate the maximum throughput of each station and to control conveyor speeds and how many slots are left empty by upstream robots to ensure downstream robots have access to empty slots in proportion to the speed at which they are (currently) able to pick/place. In some embodiments, when the segmented conveyor is full due to some bottlenecks in the downstream sortation process, a robotic singulation system as disclosed herein may pre-singulate one or more packages, for example, inside its corresponding chute or in a nearby staging area, while keeping track of the poses of each pre-singulated package. Once some empty spaces are available from the segmented conveyor, the system/station moves the pre-singulated packages onto the segmented conveyor, singly and in rapid succession, without additional vision processing time.

In some embodiments, the presence of humans working alongside robots has an impact on the placement and multi-robot coordination strategy because the robots or associated computer vision or other sensor system must now also watch what humans do and adapt the robot's placements in real-time. For example, if a human took over a conveyor belt slot that was scheduled to be used by a robot, the system must adjust its global and local schedules/plans accordingly. In another example, if a human disrupts a robot's picked package and causes it to register as not picked the system adapts to correct the error. Or, if a human corrects a robot's errors in picking (robot was commanded to put a package into slot A but accidentally placed the item straddling across slot A and adjacent slot B; and the human places the item into slot B though the system memory says the package is in slot A), the system must observe the human's action and adjust downstream robot actions.

In various embodiments, the global scheduler 322 may cause a station to operate more slowly than its maximum possible throughput at a given time. For example, the global scheduler 322 may explicitly instruct the local station scheduler (e.g., 324, 326, 328, and 330) to slow down and/or may make fewer slots available to the local station, e.g., explicitly by assigning fewer slots to the station or indirectly, such as by allowing upstream stations to fill more slots.

In various embodiments, the global scheduler 322 communicates faults to one or more local station schedulers (e.g., 324, 326, 328, and 330) in response to detecting a state or condition associated with one or more items in the workspace. The fault can be communicated in connection with causing one or more of the local station schedulers to perform an active measure to change or adapt to the detected state or condition (e.g., to change or update a plan for singulation to modify the path or trajectory along which the item is to be singulated). For example, if the global scheduler 322 determines that a robot places two items into a single slot of the conveyor (e.g., based on sensor data pertaining to the conveyor, or in response to receiving an indication from the robotic structure corresponding to the robot), global scheduler 322 sends a fault to one or more local station schedulers downstream from the robot that placed two items into the single slot or downstream from the slot comprising two items. In response to receiving the fault, a local station scheduler can determine a plan or strategy to implement an active measure to pick one of the two items from the slot and to singly place the item in another slot on the conveyor (and to update the distributed data structure with an association between the item(s) and the slot(s)).

In some embodiments, the global scheduler 322 communicates a fault to one or more local station schedulers (e.g., 324, 326, 328, and 330) in response to a determination that an item placed on the conveyor straddles two different slots. The global scheduler 322 communicates the fault to cause the local station scheduler downstream from the item to determine a plan and strategy to reposition the item into a single slot on the conveyor, and to cause a corresponding robot to implement the plan or strategy to reposition the item. The distributed data structure can be correspondingly updated with an association between the item and the slot in which the item occupies after repositioning.

Figure 4A:
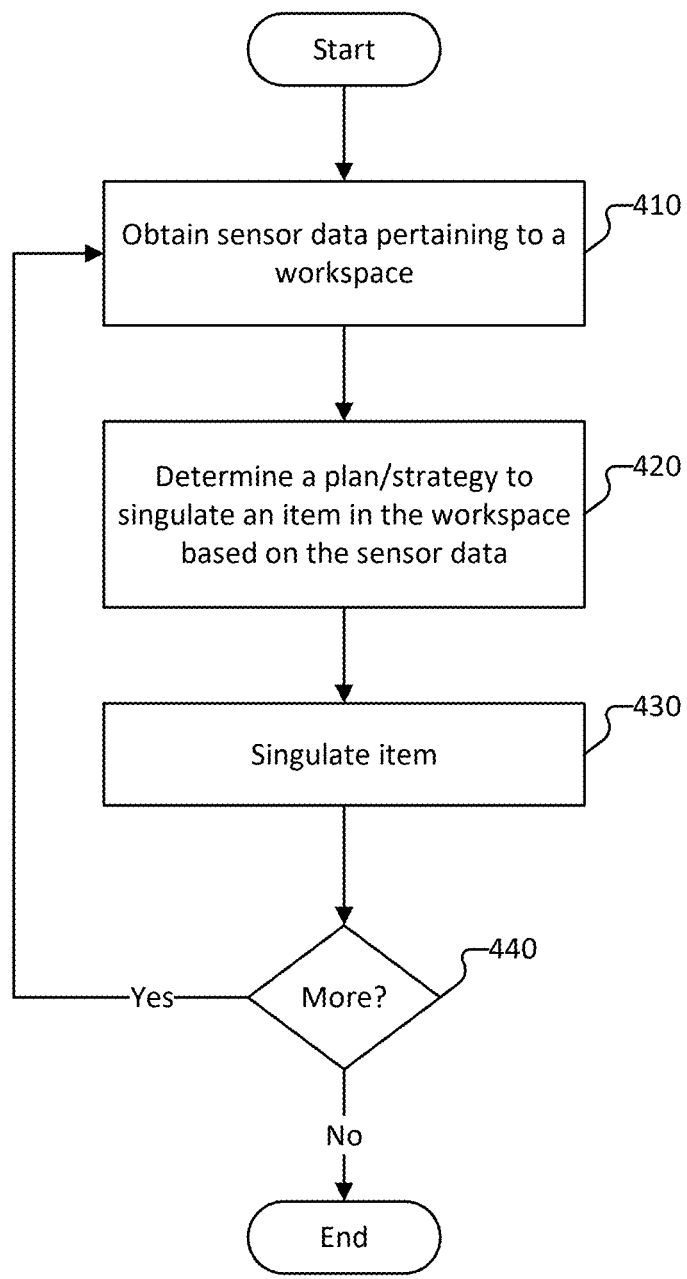
FIG. 4A is a diagram of a process to pick and place items for sorting according to various embodiments.

FIG. 4A is a diagram of a process to pick and place items for sorting according to various embodiments. In some embodiments, process 400 is implemented by a robot system operating to singulate one or more items within a workspace, such as system 200 of FIG. 2A and FIG. 2B. The robot system may include one or more processors that operate to cause a robotic structure (e.g., a robotic arm) to pick and place items for sorting.

At 410, sensor data pertaining to a workspace is obtained. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace may be determined based at least in part on the sensor data. The sensor data can be used in connection with determining at least one characteristic (e.g., attribute) of one or more items within the workspace such as items in the source pile/flow of the chute, or an item grasped by the robotic arm, and the item already positioned in a slot/tray on the conveyor, etc. In some embodiments, the sensor data is used in connection with determining one or more characteristics of the conveyance structure such as determining the slots on the conveyor that are empty or unreserved, determining a speed of the conveyor, and/or determining the characteristics of at least one slot or of at least one item already on the conveyor.

In some embodiments, the sensor data comprises (or is used to obtain) routing data. For example, the sensor comprises a first element of routing data, a second element of routing data, etc. The system may have a set of predefined required elements of routing data for which the system uses various sensors in the workspace to collect. As an example, the required elements of routing data may include a destination (e.g., a first element of routing data) and a service class (e.g., a second element of routing data).

At 420, a plan or strategy to singulate an item in the workspace is determined based at least in part on the sensor data. In some embodiments, a robotic system determines the plan or strategy to pick at least one item from a source pile/flow in the workspace and to singly place the at least one item in a slot on the conveyor. The plan or strategy to singulate the one or more items is determined in various embodiments on a robot-by-robot basis such that if the robotic system includes a plurality of robots, each robot operates independent of the other robot(s).

According to various embodiments, the plan or strategy to singulate the one or more items in the workspace is determined based at least in part on the sensor data, such as sensor data including data associated with an item present in a workspace (e.g., the item to be singulated and/or an item already located on the conveyor) or another object included in the workspace. For example, the plan or strategy to singulate the one or more items includes selecting an item within the source pile/flow that is to be singulated. The selected item can be identified from among other items or objects within the workspace based at least in part on the sensor data (e.g., the boundaries of the item and other items or objects within the workspace can be determined). As an example, one or more characteristics (or attributes) pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), a height of the item, a length of the item, an estimated weight of the item, routing data and the like, or any combination thereof. As another example, the plan to singulate the one or more items includes determining a location on the conveyance structure (e.g., a slot on the conveyor) at which the robotic structure (e.g., the robotic arm) is to singly place the item. The location on the conveyance structure at which the item is to be placed can be determined based at least in part on a timestamp, a speed of the conveyor, and one or more characteristics of a slot in the conveyor (e.g., an indication of whether the slot is occupied or reserved), and the like, or any combination thereof. As another example, the plan or strategy to singulate the one or more items includes determining a path or trajectory of the item along which the robotic arm is to move the item during singulation. The path or trajectory of the item along which the item is to be moved can be determined based at least in part on a location of one or more other objects within the workspace such as a frame of the chute, other items in the source pile/flow, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

In some embodiments, the determination of the plan to singulate an item includes a determination of a manner by which the applicable robotic arm is to grasp the item. The plan to singulate the item can indicate a particular end effector to be used to pick up the item from the source pile, and one or more settings associated with the end effector in connection with grasping the item such as a grasp strength, a pressure to apply on a suction-based end effector, etc. The plan to singulate the item can indicate an orientation of one or more of the robotic arm, a wrist on the robotic arm, and the end effector. In some embodiments, the end effector is positioned to be orthogonal to the item when grasping the item. To so position the end effector in relation to the item, the robotic structure can control to operate the orientation of one or more of the robotic arm, a wrist on the robotic arm, and the end effector.

In some embodiments, the plan/strategy for singulating the item is determined based at least in part on the routing data pertaining to the item. The system obtains the routing data by capturing label data or other markings on the item, such as by processing information captured by one or more sensors within the workspace. The system may determine a particular tray, segment of a conveyor, or conveyor at which an item is to be singulated (e.g., moved to and placed in). For example, the item may be differently routed according to the routing data, such as the destination or service class.

In some embodiments, the plan/strategy for singulating the item is determined based at least in part on a determination that the item is too heavy to be lifted by a robotic arm or that the item otherwise requires (or is to be subject to) special handling. The system determines that the item is too heavy to be lifted by a robotic arm or that the item otherwise requires (or is to be subject to) special handling based at least in part on sensor data (e.g., image data form a vision sensor, weight data from a weight sensor, current utilization from a motor that drives a source conveyor, etc.) or based on a previous indication of an attribute of the item that is associated with a corresponding item identifier. As an example, the system identifies, based on the image data, a symbol or indication that the item is to be subject to special handling (e.g., a priority service class, the item is fragile, the item is to handled according to a particular orientation(s)). As another example, the system determines that the item is too heavy for a particular robotic arm is an item weight exceeds a corresponding predefined weight threshold. As another example, the system determines that the item is too heavy for a particular robotic arm in response to determining that a threshold number of attempts to grasp/lift the item are unsuccessful (e.g., the force applied by suction cups on an end effector is insufficient to lift the item). Examples of the plan/strategy for singulating or handling the item that is deemed to be too heavy or otherwise requiring special handling include (i) controlling a robotic arm to push the item to a destination location (e.g., a segment/tray in the segmented conveyor), (ii) controlling a robotic arm to push or move the item to an alternate location (e.g., a location at which the item will be routed for special handling), (iii) controlling a plurality of robotic arms to push or otherwise move the item to the destination location, (iv) controlling to actuate a wall on the source conveyor to enable the item to be moved/pushed to an alternate location, (v) controlling to move a chute or funnel that feeds the source conveyor to enable the source conveyor to be controlled in a reverse direction to deliver/move the item to an alternate location (e.g., for special handling), (vi) controlling to move the source conveyor (e.g., lower the source conveyor to allow for sufficient clearance between the source conveyor (or item(s) on the source conveyor) and the chute or funnel that feed items to the source conveyor, etc.

At 430, the item is singulated. The item is singulated or otherwise handled according to the plan or strategy. In some embodiments, the item is singulated in response to the plan or strategy for singulating the item being determined. For example, a robotic arm is operated to pick one or more items from the workspace and place each item singly in a corresponding location in a singulation conveyance structure. The singulation of the item comprises picking the item from the workspace (e.g., from the source pile/flow) and singly placing the item on the conveyance structure. The system singulates the item based at least in part on the plan or strategy for singulating the item. For example, the system singulates the item along a path or trajectory according to the plan or strategy to singulate the item.

At 440, a determination is made as to whether further items are to be singulated. If there are more items, a further iteration of steps 410, 420, and 430 is performed, and successive iterations are performed until it is determined at 440 that there are no more items in the chute (or other receptacle or source) to be picked and placed.

Figure 4B:
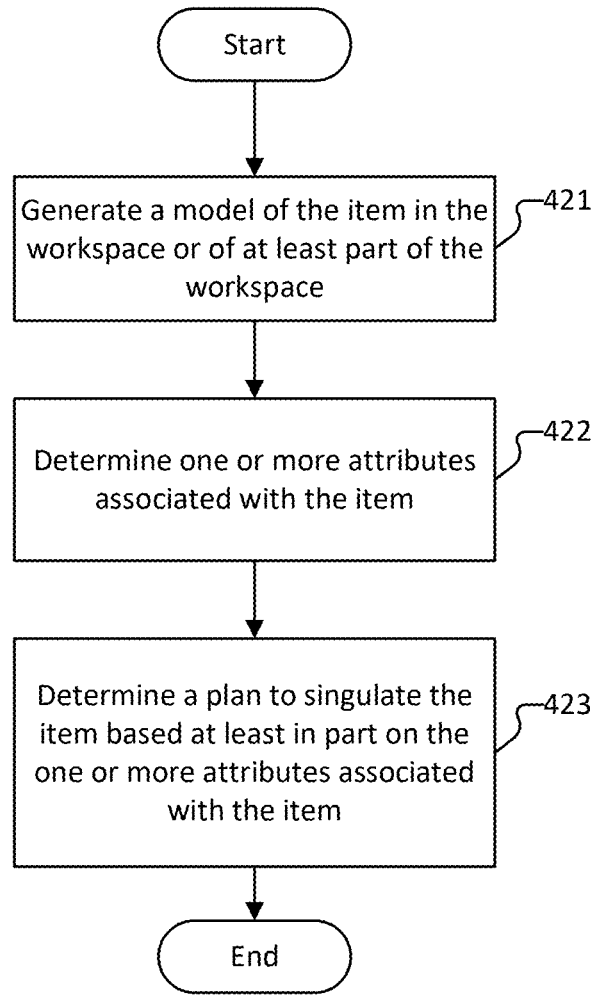
FIG. 4B is a diagram of a process to determine a plan to pick and place items for sorting according to various embodiments.

FIG. 4B is a diagram of a process to determine a plan to pick and place items for sorting according to various embodiments. In various embodiments, process 420a of FIG. 4B implements step 420 of the process 400 of FIG. 4A.

At 421, a model of the item in the workspace or of at least part of the workspace is generated. In some embodiments, the robotic system generates the model of the item within the workspace. The model of the item within the workspace can be part of a larger model of the workspace, including the one or more items within the workspace. The robotic system generates the model using the sensor data that is determined based at least in part on information obtained from one or more sensors (e.g., the vision system, sensor arrays, weight sensors, pressure sensors, etc.). The model can be indicative of one or more characteristics of various elements of the workspace such as the source pile/flow of items on the chute, a speed of the conveyor, a mapping of empty and occupied slots or trays on the conveyor, attributes of items on the conveyor, attributes within the source pile/flow, etc.

At 422, one or more attributes associated with the item are determined. In some embodiments, the one or more attributes associated with the item are determined based at least in part on the model of the item in the workspace. As an example, the robotic system determines an attribute of an item to be singulated based on identifying the item to be singulated, and obtaining information in the model pertaining to the item. The one or more attributes that are determined based on the model can be attributes that are to be used in connection with determining or updating a plan for singulating the item. In some cases, the robotic system obtains attributes of a first item within the workspace in connection with determining a plan for singulating a second item (e.g., to assess whether or how the first item within the workspace would impact singulation of the second item).

In some embodiments, the determining the one or more attributes associated with an item includes determining routing data associated with the item. For example, the system determines whether the required routing information has been obtained (e.g., captured by one or more sensors in the workspace). In response to determining that the system has not successfully determined the routing data, the system re-attempts to capture the routing data. As an example, the re-attempt to capture the routing data includes processing the information obtained by one or more sensors, such as performing an OCR with respect to an image of a label on the item. As another example, the re-attempt to capture the routing data includes capturing another image or rescanning the item (e.g., using a barcode scanner) using the same or different sensor(s). The system may determine that the routing data was not successfully obtained if not all the required routing data is obtained (e.g., if a destination is obtained but a service class has not been obtained).

At 423, a plan to singulate the item is determined. In some embodiments, the plan to singulate the item is determined based at least in part on the one or more attributes associated with the item. The plan can include one or more instructions used to operate a robotic structure to pick the item from the source pile/flow and singly place the item on the conveyor, or information from which the robotic structure can derive such instructions for singulating the item. According to various embodiments, the plan includes (or defines) a path or trajectory along which the item is to be moved during singulation.

As an example, in the case of the one or more attributes including the weight of the item, determining the plan to singulate the item may include determining whether the robotic arm can lift the item, and if so, determining the grasp strength required to pick the item from the source pile/flow. The robotic structure can determine the amount of pressure to attain between suction-based end effectors and the item. In response to determining that the robotic arm cannot lift the item, the determining the plan to singulate the item can include determining a path to partially lift and drag (or push) the item from the source pile/flow to a corresponding location on the conveyor. In some embodiments, in response to determining that the robotic arm cannot lift the item, the system controls a plurality of robotic arms to operate in coordination to push the item to the destination location (e.g., a segment/tray on the conveyor, etc.).

As another example, in the case of the one or more attributes including a location of a label on the item, determining the plan to singulate the item may include determining a manner of singulating the item that optimizes the likelihood that the label will be read by a sensor within the workspace. Based on the location of one or more sensors within the workspace, the robotic system can determine a side of the item that includes the label, determine a side by which to grasp the item, and a path/trajectory along which the item is to be singulated to expose the label on the item to the one or more sensors (e.g., the vision system or other sensor array such as a barcode reader).

As another example, in the case of the one or more attributes including a size or dimension of the item, determining the plan to singulate the item may include determining a manner by which to pick up the item, and a location on the conveyor on which the item is to be placed such as in a manner to optimize the likelihood that one or more labels or identifiers will be exposed to one or more sensors of the workspace. The system determines whether a slot/tray on the conveyor is occupied by a relatively large item, and determines that the slot/tray in which the item to be singulated is a slot/tray that is not adjacent to the relatively large item, or that such slot/tray is a predefined distance or spacing from the relatively large item. In some embodiments, in response to detecting a relatively large item on the conveyor, the system selects to place an item a predefined minimum distance or spacing from the relatively large item. For example, in response to detecting a relatively large item on the conveyor, the system determines a distance/spacing that is sufficient in order to ensure that the relatively large item does not block the one or more sensors from capturing information on the item to be singulated.

According to various embodiments, the determining the location in a manner to optimize the likelihood that one or more labels or identifiers will be exposed to one or more sensors includes determining a set of locations in which the item may be placed and corresponding probabilities that a label or identifier on the item would be scanned if the item were singulated to that location, and selecting a location that has a highest corresponding probability. As an example, a location having a corresponding probability that exceeds a threshold probability, or that is within a predefined percent or number of the set of locations having the highest corresponding probabilities is determined. As another example, a location and corresponding probability that the label or identifier on the item would be scanned if the item were singulated to that location are determined, and the probability is compared to a predefined threshold for a minimum desired probability. In response to determining that the probability corresponding to a particular location does not exceed the predefined threshold for a minimum desired probability, a new location and corresponding probability are determined. The system can continue to iterate determining the location and corresponding probability until the robotic system determines that the corresponding probability exceeds the predefined threshold for a minimum desired probability.

Although various embodiments have been described in connection with determining the plan to singulate an item based on at least one attribute for the item to be singulated, various embodiments include determining the plan to singulate the item based on an attribute of another item or object within the workspace. As an example, the plan to singulate the item may be determined based at least in part on an attribute of another item located on the chute and/or an attribute of another item within a slot on the conveyor.

Figure 4C:
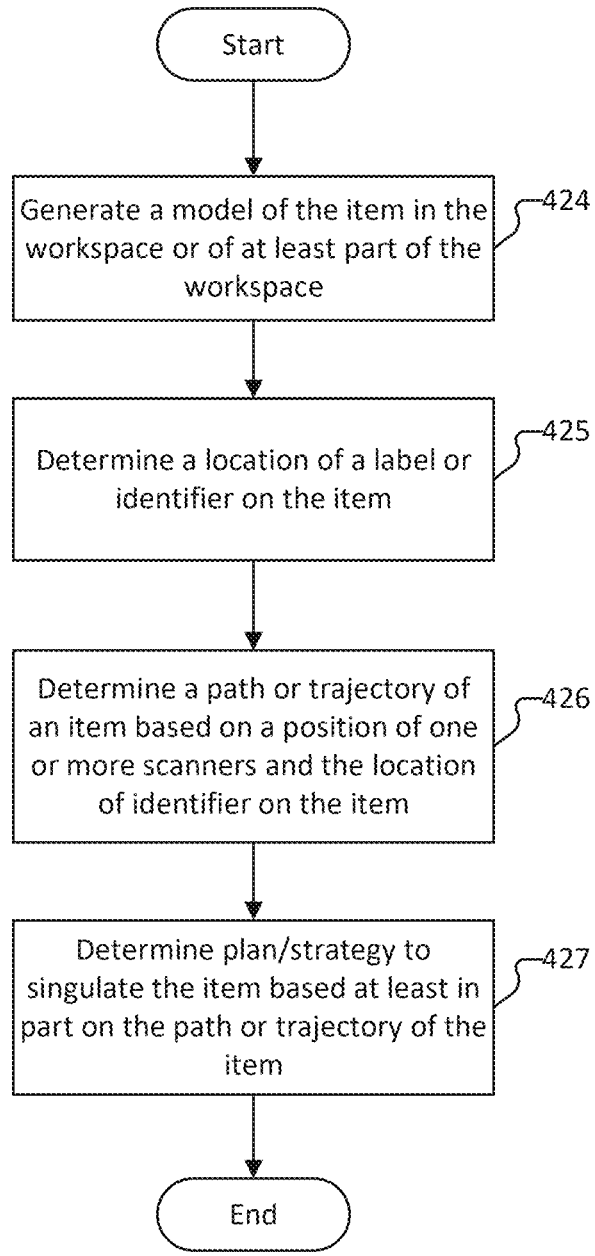
FIG. 4C is a diagram of a process to determine a plan to pick and place items for sorting according to various embodiments.

FIG. 4C is a diagram of a process to determine a plan to pick and place items for sorting according to various embodiments. In various embodiments, process 420*b* of FIG. 4C implements step 420 of the process 400 of FIG. 4A.

At 424, a model of the item in the workspace or of at least part of the workspace is generated. In some embodiments, the robotic system generates the model of the item within the workspace. The model of the item within the workspace can be part of a larger model of the workspace, including the one or more items within the workspace. The robotic system generates the model using the sensor data that is determined based at least in part on information obtained from one or more sensors (e.g., the vision system, sensor arrays, weight sensors, pressure sensors, etc.). The model can be indicative of one or more characteristics of various elements of the workspace such as the source pile/flow of items on the chute, a speed of the conveyor, a mapping of empty and occupied slots or trays on the conveyor, attributes of items on the conveyor, attributes within the source pile/flow, etc.

At 425, a location of a label or identifier on the item is determined. In some embodiments, the robotic system determines a location of the label or identifier on the item using the model of the item in the workspace or of the workspace. For example, sensor data based on information obtained from the vision system is analyzed to determine whether the item comprises an identifier or label on a visible side.

In some embodiments, in response to determining that the label or identifier is not visible on the surfaces of the item, the system can deem a non-visible surface (e.g., the bottom surface) to include the item and identifier. In some implementations, in response to determining that a label or identifier is not visible on the item, the robotic system can determine a mapping of probabilities to locations on the item at which the label may be located. For example, if one surface of the item is completely non-visible and another surface of the item is partially occulated by another item on the workspace, the robotic system can determine respective likelihoods that the item or label is located on a particular surface or in a particular area. The system may determine the location or the label or identifier based on the mapping of probabilities to locations on the item.

In some implementations, several similar items are singulated from the source pile/flow. The robotic system can build a model of an item based on markings (e.g., branding logos, labels, identifiers) on the item. For example, the robotic system may build a model that indicates for a particular item a certain logo is on a front of the package, and a label is on the reverse side. Accordingly, if label or identifier is not visible based on current information from the vision system, etc. but the logo is visible, the robotic system can determine the location of the label or identifier based on the determination of a location of the logo. The robotic system can use the model of the item or set of items to determine the location of the identifier or label based at least in part on determining the location of the logo, etc. As such, various embodiments use a model of an item that is based on historical information pertaining to similar items.

At 426, a path or trajectory of an item is determined based on a position of one or more scanners and the location of the identifier/label on the item. In some embodiments, the path or trajectory is determined to achieve a desired probability that the identifier/label on the item is successfully scanned. As an example, the path or trajectory may be determined to optimize the likelihood that the identifier/label is scanned. In some embodiments, the path or trajectory is determined to achieve a desired probability that the item is successfully singulated.

In some embodiments, the determining the path or trajectory includes determining a set of possible paths or trajectories of the item and determining corresponding probabilities that the particular path/trajectory would result in a successful scan. The robotic system may then select the path or trajectory along which the item is to be singulated from among the set of possible paths or trajectories. As an example, the robotic system selects the path or trajectory corresponding to a highest likelihood that the identifier/label is successfully scanned, or scoring function that takes into account the cost of singulating the item along the path or trajectory and the likelihood that the identifier/label is successfully scanned (e.g., provided that the selected path/trajectory satisfies a minimum threshold likelihood that the identifier/label is scanned). The robotic system can select the path or trajectory along which the item is to be singulated based at least in part on a relative probability that the identifier/label is expected to be successfully scanned (e.g., relative to the probabilities of other paths/trajectories in the set), and one or more of an amount of time to singulate the item according to a particular path/trajectory, an expected collision with another item/object along the path/trajectory, a probability that the item will be successfully singulated if moved along the particular path/trajectory, etc. The robotic system may select the path or trajectory according to a determination that the probability of successful scanning of the identifier/label is greater than a predefined threshold value.

At 427, a plan or strategy to singulate the item is determined based at least in part on the path or trajectory of the item. The plan or strategy can include one or more instructions used to operate a robotic structure to pick the item from the source pile/flow, to move the item from the source pile/flow to a selected location of the conveyor, and singly place the item on the conveyor. In some cases, the plan or strategy includes information from which the robotic structure can derive such instructions for singulating the item.

In some embodiments, the plan includes a strategy for grasping the item. For example, the strategy for grasping the item can include an indication of a side from which the item is to be grasped. The robotic system can use the model to determine a location of an identifier/label on the item, and determine the side from which the item is to be grasped based at least in part on the location of the identifier/label. The manner by which the item is grasped can be selected to ensure that the identifier/label is exposed to the one or more sensors for scanning the identifier/label. The strategy for grasping the item on a particular side can include repositioning/reconfiguring the item to allow for the end effector to engage the item on the particular side. For example, the strategy for grasping the item can include pulling the item from the source pile/flow or knocking the item over onto a different side, etc. to provide better access to the desired surface. As another example, the strategy for grasping the item can include a grasping strength (e.g., a pressure to be applied by the end effector). The grasping strength can be determined based at least in part on a weight of the item, a determination that the item is partially occluded and the picking of the item will experience resistance from other items, a determination that the item may oscillate or sway during singulation, etc. As another example, the strategy for grasping the item can include an indication of a type of end effector or a particular end effector(s) among a plurality of end effectors, etc. to be used to singulate the item. The type of end effector may be selected based on a type of packaging of the item (e.g., to avoid slippage, tenting, etc.), a weight of the item, a location of the identifier/label on the item, etc.

In some embodiments, the plan includes a strategy for moving the item. As an example, the strategy for moving the item can include an indication of a speed at which the item is moved during singulation. In some cases, the speed can be impacted based on the path/trajectory of the item in relation to the location or path/trajectory of other items or objects in the workspace or on the conveyor, a speed at which the conveyor is moving, a slot/tray in which the item is to be singulated, the strategy for releasing the item (e.g., whether the item is to be "tossed" such as along a determined ballistic trajectory), etc. As another example, the strategy for moving the item can include an indication of one or more mechanisms to dampen oscillation (or swaying of the item) during singulation. The indications of the one or more mechanisms can include increasing the grasping strength, decreasing the speed of singulation, etc.

In some embodiments, the plan includes a strategy for releasing the item. For example, the plan can have a strategy to release all end effectors at the same time. As another example, the plan can have a strategy for staggering release of at least two different end effectors. In the case of suction-based end effectors, a staggered release of the end effectors can improve the speed by which the item is released because after a first end effector is released, the air flow can be reversed for that end effector and air can be dispersed therefrom. The reversed airflow serves to push the item from the other end effector(s) as such other end effector(s) are released (e.g., as pressure is ceased in the remaining end effector). In contrast, if the suction is removed at the same time across the end effectors, gravity acts on the item and release of the item is not immediate as the pressure takes a certain amount of (non-negligible) time to normalize. Accordingly, the staggered release of the end effectors can be a more efficient method for releasing an item (to the applicable location on the conveyor). In some embodiments, the strategy for releasing the item includes releasing all the end effectors at the same time and promptly reversing air flow in the suction-based system to emit air from the end effectors to push the item away from the end effector.

In some embodiments, the strategy for releasing the item includes moving the arm to a location from which the item is to be dropped, and thereafter releasing the end effectors (so that the item drops straight down to the selected location on the conveyor). In some embodiments, the strategy for releasing the item includes releasing the end effectors in a manner that serves to "toss" the item to the selected location on the conveyor. For example, the robotic system in various embodiments determines a ballistic trajectory based on a determination of a timing of releasing the end effectors while the robotic arm is moving so that a trajectory of the item will lead to the selected location on the conveyor (at the determined time so as to land within the applicable slot/tray on the moving conveyor). The strategy for releasing the item and/or the plan for the singulating the item using a ballistic trajectory may be determined based at least in part on a size of the item, such as a height of the item.

Figure 5A:
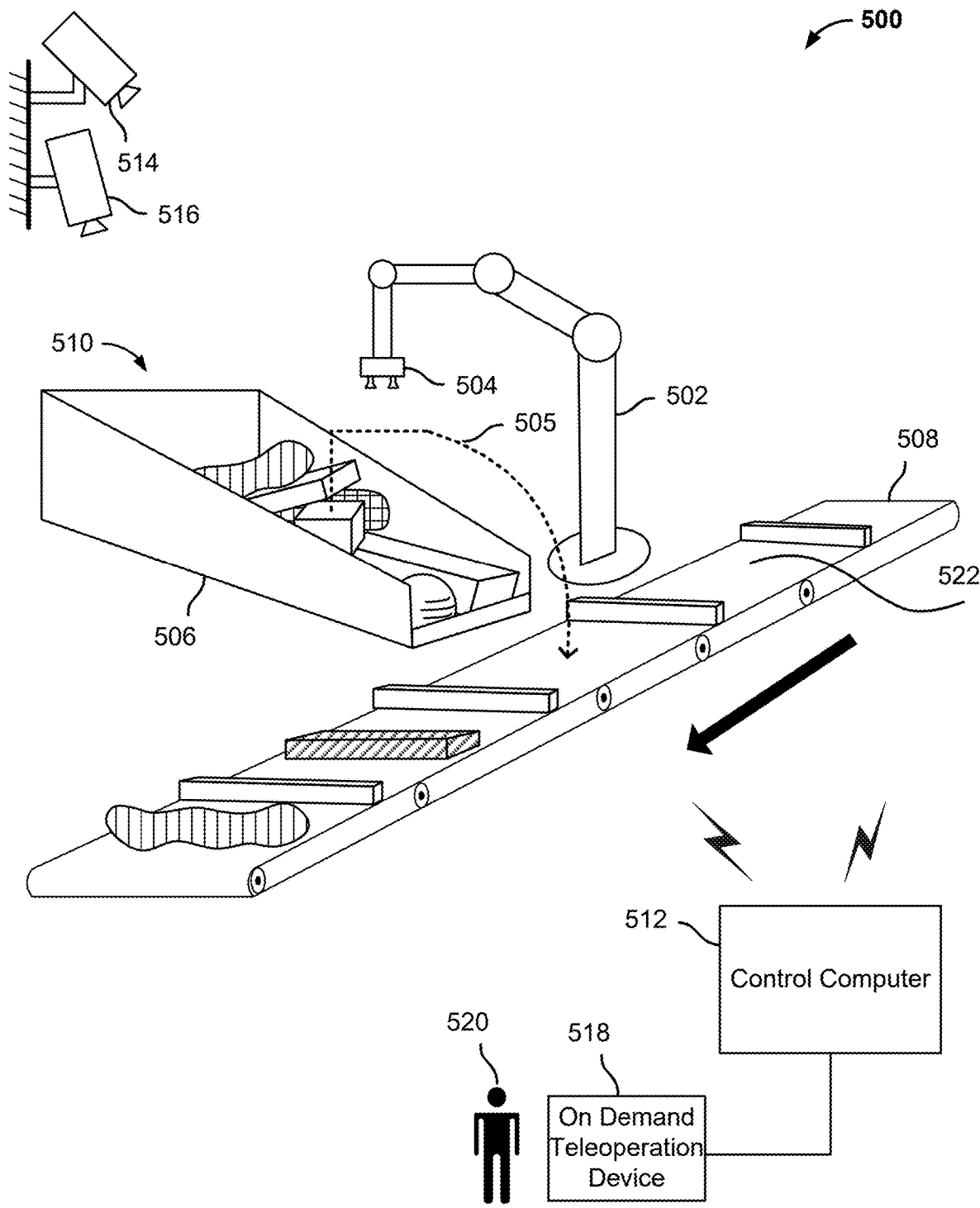
FIG. 5A is a diagram illustrating a robotic singulation system according to various embodiments.

FIG. 5A is a diagram illustrating a robotic singulation system according to various embodiments. In various embodiments, system 500 of FIG. 5A implements the hierarchical scheduling system 300 of FIG. 3, process 400 of FIG. 4A, process 420a of FIG. 4B, process 420b of FIG. 4C, process 600 of FIG. 6, process 850 of FIG. 8B, and process 875 of FIG. 8C.

In the example illustrated in FIG. 5A, system 500 includes a robotic arm 502 equipped with end effector 504. While in the example shown the end effector 504 is a suction-based end effector, in various embodiments, one or more other types of end effectors may be used in a singulation system as disclosed herein, including without limitation a pinch-based end effector or other types of actuated grippers. Further, while in the example shown the items are picked from chute 506, system 500 may include a source conveyor comprising items fed by chute 506 or a funnel or other infeed system. Robotic arm 502 and end effector 504 are configured to be used to retrieve parcels or other items that arrive via chute or bin 506 and place each item in a corresponding location on segmented conveyor 508. In this example, items are fed into chute 506 from an intake end 510. For example, one or more human and/or robotic workers may feed items into intake end 510 of chute 506, either directly or via a conveyor or other electro-mechanical structure configured to feed items into chute 506.

In the example shown, one or more of robotic arm 502, end effector 504, and conveyor 508 are operated in coordination by control computer 512. In some implementations, control computer 512 is configured to control a plurality of robotic arms operating at one or more workstations. System 500 can include one or more sensors from which an environment of the workspace is modeled. In the example shown in FIG. 5A, system 500 includes image sensors, including in this example 3D cameras 514 and 516. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, control computer 512 includes a workspace environment state system such as a vision system used to discern individual items, debris on the workspace, and each item's orientation based on sensor data such as image data provided by image sensors, including in this example 3D cameras 514 and 516.

According to various embodiments, in connection with singulating an item, system 500 determines a path/trajectory 505 for singulating the item. As illustrated in FIG. 5A, path/trajectory 505 starts from a location from which the item is to be picked, the path/trajectory along which the item is moved to conveyor 508, and a location and time at which the item is to be released to coincide in space and time with a slot, tray, or other destination selected as the location at which the item is to be placed on the destination conveyance structure, i.e., slot/tray 522 of conveyor 508 in this example. In some embodiments, system 500 determines a slot/tray 522 to which the item is to be singulated. Accordingly, the path/trajectory 505 is determined taking into account a location of the slot/tray 522 and the movement of conveyor 508. For example, system 500 determines the path/trajectory 505 to attain an intersection between the item to be singulated and the selected slot/tray 522 at a particular time. In various embodiments, system 500 reserves the slot/tray 522 to ensure that slot/tray 522 is unoccupied at the time the item is to be placed therein. For example, system 500 updates the distributed data structure to indicate that slot/tray 522 is occupied (or will be occupied). The updating the distributed data structure may include associating the routing data for the item with an identifier associated with the slot/tray. In various embodiments, the trajectory 505 includes a final, pre-release phase or stage in which the robotic arm 502 is operated to track and match a speed and direction of motion of conveyor 508, to maintain the item in position over the destination slot/tray 522 until the item is released.

Referring further to FIG. 5A, in the example shown, system 500 further includes an on-demand teleoperation device 518 usable by a human worker 520 to operate one or more of robotic arm 502, end effector 504, and conveyor 508 by teleoperation. In some embodiments, control computer 512 is configured to attempt to grasp and place items in a fully automated mode. However, if after attempting to operate in fully automated mode control computer 512 determines it has no (further) strategies available to grasp one or more items, in various embodiments, control computer 512 sends an alert to obtain assistance from a human operator via teleoperation, e.g., by human worker 520 using teleoperation device 518. In various embodiments, control computer 512 uses image data from cameras such as cameras 514 and 516 to provide a visual display of the scene to human worker 520 to facilitate teleoperation.

Figure 5B:
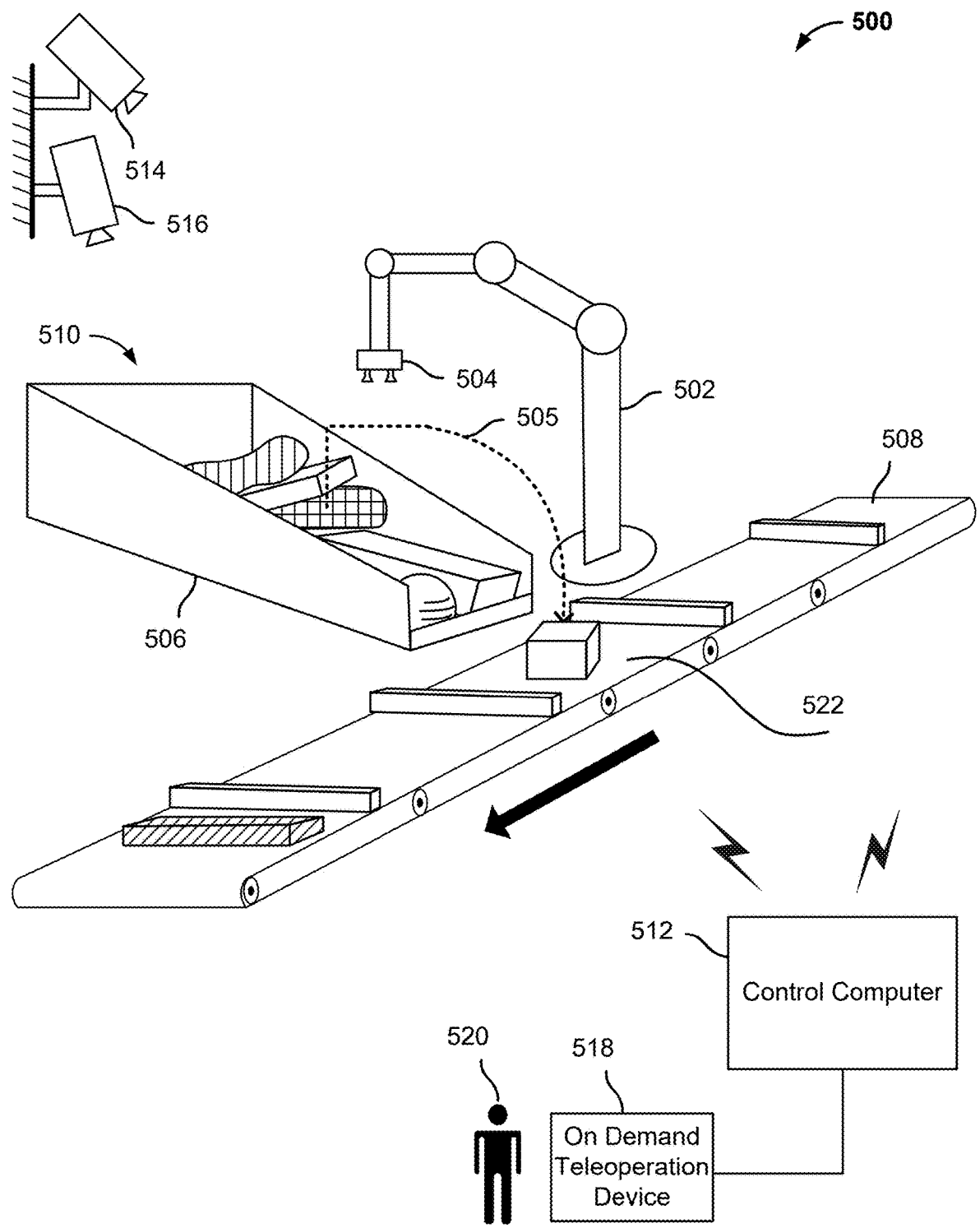
FIG. 5B is a diagram illustrating a robotic singulation system according to various embodiments.

FIG. 5B is a diagram illustrating a robotic singulation system according to various embodiments. In the example shown, the robotic singulation system of FIG. 5A has been advanced to a subsequent point in time to illustrate that the item has been picked from chute 506 and placed on slot/tray 522 of conveyor 508 according to the path/trajectory 505. System 500 models the workspace to include information pertaining to the items within chute 506 (including the item to be singulated) and information pertaining to conveyor

508. Accordingly, system 500 may determine the plan to singulate the item to a selected slot/tray 522 on conveyor 508. In some embodiments, system 500 includes a source conveyor onto which items flow from the chute or other infeed system. The model of the workspace may include a model of the source conveyor and/or the items comprised on the source conveyor.

Figure 6:
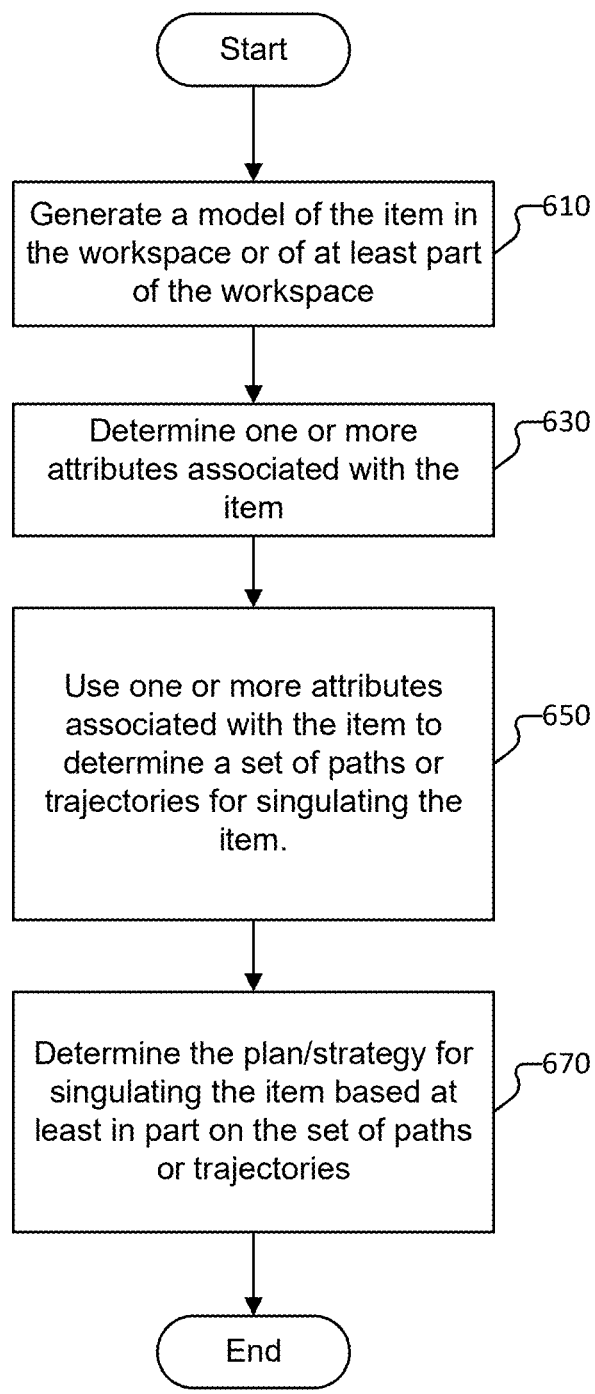
FIG. 6 is a diagram of a process to determine a plan or strategy to singulate one or more items using an attribute of an item within a workspace according to various embodiments.

FIG. 6 is a diagram of a process to determine a plan or strategy to singulate one or more items using an attribute of an item within a workspace according to various embodiments. Process 600 of FIG. 6 can be performed by system 200 of FIGS. 2A and 2B and/or system 500 of FIGS. 5A and 5B. In some embodiments, process 600 is implemented by a robot system operating to singulate one or more items within a workspace. The robot system includes one or more processors that operate to cause a robotic structure (e.g., a robotic arm) to pick and place items for sorting.

At 610, a model of the item in a workspace or of at least part of a workspace is generated. The mode of the item or the workspace may be generated in a similar manner to the model of 421 in process 420a of FIG. 4B, and/or the model of 424 in process 420b of FIG. 4C. In some embodiments, a global model of the workspace includes various models for different parts of the workspace, such as a model of the item in the workspace, a model of a conveyor, a model of other robotic arms within the workspace, etc.

At 630, one or more attributes associated with the item are determined. The one or more attributes associated with the item may be determined in a similar manner to the one or more attributes of 422 in process 420a of FIG. 4B, and/or the location of the label or identifier of 425 in process 420b of FIG. 4C.

At 650, the one or more attributes associated with the item are used in connection with determining a set of paths or trajectories for singulating the item. According to various embodiments, at least one of the set of paths or trajectories is determined in a similar manner to the path or trajectory of 426 of process 420b of FIG. 4C.

The path or trajectory along which an item is to be singulated is determined based at least in part on sensor data according to various embodiments. The path or trajectory along which the item is to be singulated may include a path according to which the item is pushed from a source location (e.g., a location in the chute or source conveyor) to a destination location (e.g., a segment on the conveyor, etc.). The robotic system may obtain a plurality of sensors that output information pertaining to the workspace, including the items or objects within the workspace. The sensor data is obtained based on the information output from one or more sensors and used in connection with determining a path or trajectory. In some embodiments, the path or trajectory is determined based at least in part on one or more attributes of the item to be singulated. Examples of attributes of the item include a weight, a size (e.g., one or more dimensions), a type of packaging, an identifier on the item, a location of an identifier or label on the item, a location of the item relative to the chute and/or conveyor, information obtained from the identifier or label on the item (e.g., routing data, such as a destination, a service class), etc. Various other attributes can be used in connection with determining the path or trajectory. Determination of the path or trajectory of the item may be further based at least in part on a location on the conveyor at which the item is to be placed, an attribute of an item(s) already on the conveyor, an attribute of an item within the workspace (e.g., an item within the source pile/flow), a grip strength with which the robotic arm has grasped the item, a speed with which the robotic arm is to move the item, etc.

According to various embodiments, a set of paths or trajectories for singulating an item is determined, and the path or trajectory along which the item is to be singulated is selected from the set of paths or trajectories. The path or trajectory may be selected based on various properties associated with the corresponding paths or trajectories within the set. Examples of the properties associated with the corresponding paths or trajectories that may be used in connection with selecting the path or trajectory include a speed with which the item is to be singulated, a location on the conveyor in which the item is to be singulated, a probability of success that the item is to be singulated according to the particular path or trajectory, an indication of whether another item or object within the workspace intersects with the particular path or trajectory, etc. In some embodiments, the probability of success that the item is to be singulated according to the particular path or trajectory is determined for at least a subset of the set of paths or trajectories, and the path or trajectory is selected based on the corresponding probability of success relative to the probability of success corresponding to other paths or trajectories. As an example, the path or trajectory is selected in response to determining that the probability of success corresponding to the path or trajectory exceeds a threshold probability, or exceeds a threshold number or percentage of other paths or trajectories within the subset.

At 670, the plan or strategy for singulating the item is determined based at least in part on the set of paths or trajectories. According to various embodiments, at least one of the set of paths or trajectories is determined in a similar manner to the plan of 423 of process 420a of FIG. 4B, and the plan of 427 of process 420b of FIG. 4C. The plan or strategy for singulating the item may be determined based at least in part on the path/trajectory selected from the set of paths or trajectories for singulating the item.

Figure 7A:
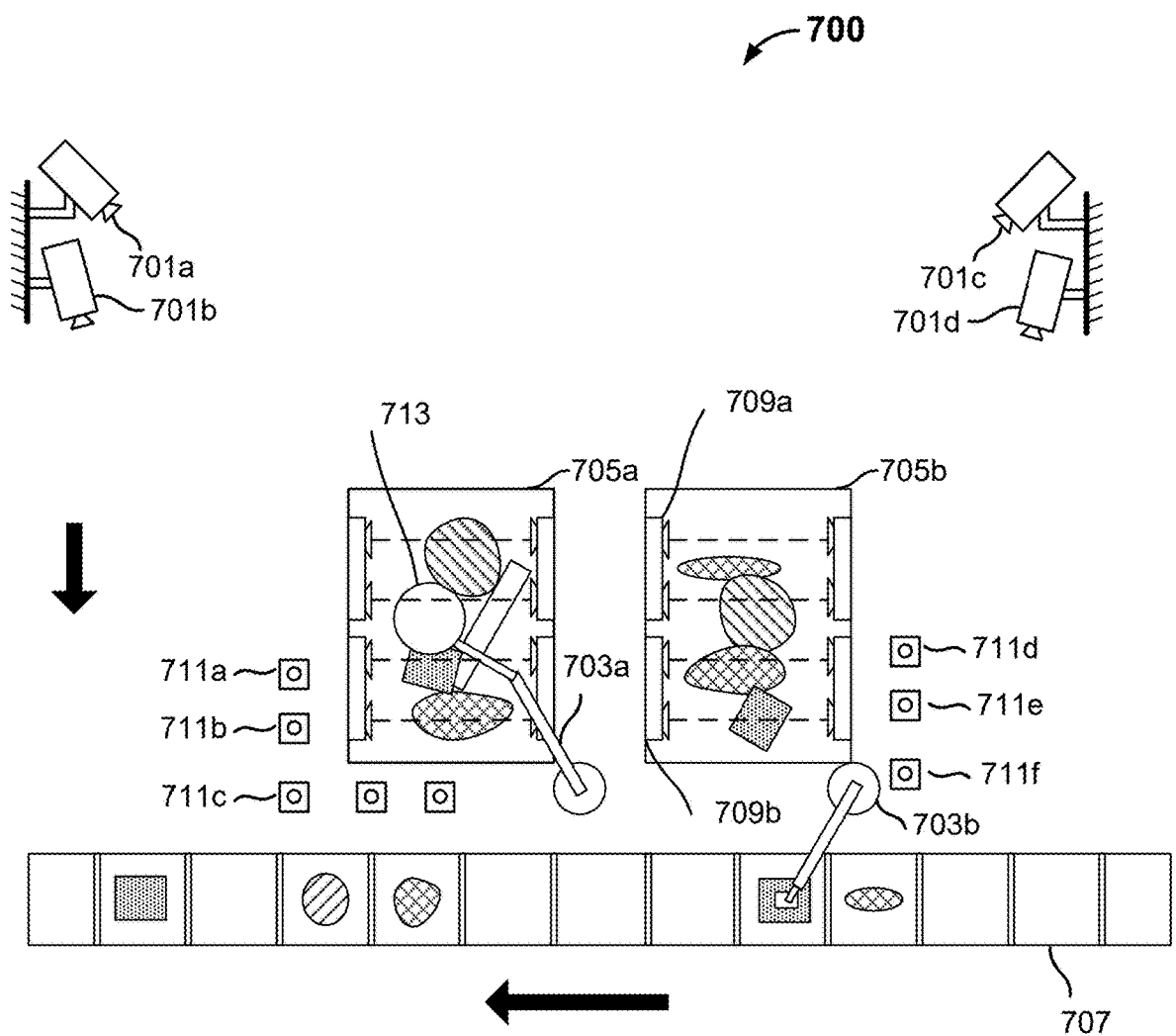
FIG. 7A is a diagram illustrating a robotic singulation system according to various embodiments.

FIG. 7A is a diagram illustrating a robotic singulation system according to various embodiments. In various embodiments, system 700 of FIG. 7A implements the hierarchical scheduling system 300 of FIG. 3, process 400 of FIG. 4A, process 420a of FIG. 4B, process 420b of FIG. 4C, process 600 of FIG. 6, process 850 of FIG. 8B, and process 875 of FIG. 8C.

In various embodiments, a robotic system comprising one or more robotic arms performs singulation/induction that includes performing one or more active measures in response to a detected state or condition associated with one or more items in the workspace of the robotic system or changing or updating the plan for singulating an item in response to determining an attribute associated with an item or an attribute associated with another item or object within the workspace. The robotic system may include one or more robotic arms each having one or more end effectors. In the example shown in FIG. 7A, system 700 includes a robotic arm 703a that is operated to singulate one or more items within chute 705a to conveyance structure 707, and robotic arm 703b operates to singulate one or more items within chute 705b to conveyance structure 707.

In various embodiments, system 700 may include one or more sensors from which an environment of the workspace is modeled. In the example shown in FIG. 7A, system 700 includes image sensors, including in this example 3D cameras 701a, 701b, 701c, and 701d. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a current utilization sensor, a weight sensor, and the like. As illustrated in FIG. 7A, system 700 includes one or more sensors arrays disposed within or around the chutes 705a and 705b. For example, chute 705b includes sensor arrays 709a and 709b. According to various embodiments, one or more of sensor arrays 709a and 709b include a vertical array of sensors. System 700 may include one or more sensors or sensor arrays disposed around the workspace. In the example shown, system 700 includes sensors 711a, 711b, and 711c disposed around chute 705a, and sensors 711d, 711e, and 711f disposed around the workspace (e.g., chute 705b). According to various embodiments, system 700 includes one or more sensor arrays disposed at conveyance structure 707. For example, a sensor array may be disposed at the conveyance structure in a manner that a signal (e.g., an IR beam) is emitted across the conveyance structure.

In various embodiments, a control computer (not shown) includes a workspace environment state system such as a vision system used to discern individual items, debris on the workspace, and the orientation of each item based on sensor data such as image data provided by image sensors, including in this example 3D cameras 701a, 701b, 701c, and 701d, and sensor arrays 709a and 709b. The workspace environment state system may also include sensors in the robotic arm to detect a weight of an item (e.g., a grasped item) or to detect information from which an estimated weight is determined. For example, information pertaining to an amount of current, voltage, and/or power used by one or more motors driving movement of the robotic arm may be used to determine the weight (or an estimated weight) of the item. As another example, information pertaining to an output from one or more sensor arrays (e.g., sensor arrays 709a and 709b) can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays).

Information output from sensors within a workspace and/or a chute may be used to determine a location and/or characteristic (e.g., attribute) of one or more items such as item 713 in chute 705a. According to various embodiments, information output from sensor arrays 709a and/or 709b is used to determine a location and/or characteristic (e.g., attribute) of one or more items within chute 705b. The height of an item within chute 705b may be determined based at least in part on a determination of a set of sensors within sensor arrays 709a and/or 709b that are tripped by the item. In some embodiments, system 700 determines that an item within chute 705b is arranged such that its longest side is perpendicular (e.g., orthogonal) to the surface of the chute, and that singulation of the item would be improved if the item was grasped by a different side. Accordingly, system 700 determines and implements a plan including an active measure to rearrange the item such that the longest side thereof is parallel with surface of the chute (e.g., to knock the item over using robotic arm 703b, a blowing mechanism, etc.). In various embodiments, system 700 is configured to implement an active measure to rearrange an item within chute 705b if the height of the item is greater than a predefined height threshold. The item may be reconfigured or repositioned (e.g., by the robot or by another element within system 700) to improve the ease/access for the end effector to engage with a desired surface of the item, or to clear the item from occulting another item that is to be singulated.

According to various embodiments, the workspace environment state system produces output used by system 700 to determine and implement a plan to autonomously operate robotic arm 703a and/or robotic arm 703b to pick one or more items from chute 705a and/or chute 705b and place each in a corresponding available defined location for machine identification and sorting, such as a partitioned section of segmented conveyance structure 707. The workspace environment state system produces an output (e.g., sensor data or information otherwise characterizing the workspace and items within the workspace) used by system 700 to detect a state/condition or attribute associated with one or more items in the workspace, and/or a state/condition or attribute associated with the robotic arm or other element of the workspace. In response to detecting (e.g., determining) the state/condition or attribute associated with one or more items in the workspace, system 700 determines to implement a plan to singulate the item, which may include one or more active measures to improve singulating an item. As an example, the active measure includes updating the plan to autonomously operate a robotic structure to pick one or more items from the workspace and place each item singly in a corresponding location in a singulation conveyance structure. As another example, the active measure or the updating the plan includes operating the robotic structure to change or adapt to the detected state/condition or attribute of the item (e.g., implement a change with respect to a manner by which an item is singulated, implement to reconfigure items within the source pile/flow to make grasping a selected item easier, operate to reposition the robotic arm or end effector to increase the ability to grasp the item, etc.). As another example, the active measure includes updating the plan to comprise the robotic arm moving or re-orienting the item to enable the rescanning of the item, such as by moving the item within a detection range of a particular sensor, etc.

The output used by system 700 may correspond to sensor data including image data associated with a plurality of items present in a workspace. In various embodiments, system 700 uses the sensor data to identify items within the workspace (e.g., within chute 705a and/or chute 705b) that cannot be singulated. For example, system 700 may identify predefined items that are mapped to types of items that cannot be singulated (or that are difficult to be singulated). As another example, system 700 identifies items within chute 705a and/or chute 705b for which a plan or strategy to singulate from chute 705a and/or chute 705b to conveyance structure 707 cannot be determined. In response to determining an item that cannot be singulated, system 700 operates to implement an active measure. The active measure implemented in response to determining that the item cannot be singulated may include removing the item from the corresponding workspace, invoking human intervention (e.g., alerting a human operator), etc. In some embodiments, in response to determining that an item within chute 705a and/or chute 705b cannot be singulated, system 700 operates robotic arm 703a and/or 703b to move the item to a designated location. As an example, the designated location may be a rejected items bin or other area at which items are stored for handling outside the singulation process. Examples of items that may be identified as not to be singulated include items having a particular shape (e.g., a poster tube), items for which system 700 cannot locate a label or other predefined identifier to be scanned, items having a predefined identifier on a side thereof (e.g., a label indicating that the item comprises a fragile object therein, a label indicating that the item is not to be stacked, a label indicating that the item comprises hazardous matter, etc.), items for which a label cannot be read (e.g., the label is occluded or otherwise comprises markings that renders the label unreadable), etc.

In some embodiments, the chute in the corresponding workspace (e.g., workspace for chute 705a or chute 705b) comprises a weight sensor. System 700 may determine a weight of an item to be singulated based on determining a difference between a weight measured by the weight sensor in the chute before the item is grasped by the robotic arm and a weight measured by the weight sensor after the item is grasped (and moved completely off the chute). In response to determining the weight of the item, system 700 may use the item in connection with determining whether to implement an active measure in connection with singulating the item, and if so, to implement the active measure. For example, in response to determining the weight, system 700 can update the path or trajectory of the item according to the corresponding plan or strategy for singulating the item. If the weight of the item is greater than a predefined weight threshold, system 700 can update the plan to singulate the item based on the weight of the item. In some cases, if the weight of the item exceeds a first weight threshold, the robotic arm is operated to partially lift the item from the chute and the robotic arm is operated to drag the item to conveyance structure 707. In some cases, if the weight of the item exceeds a second weight threshold, the robotic arm is operated to push the item from the chute (or a source conveyor onto which the chute feeds items) to conveyance structure 707. The second weight threshold may be greater than the first weight threshold. For example, the second weight threshold may be set to be weights for which a robotic arm is unable to lift/grasp the item.

Figure 7B:
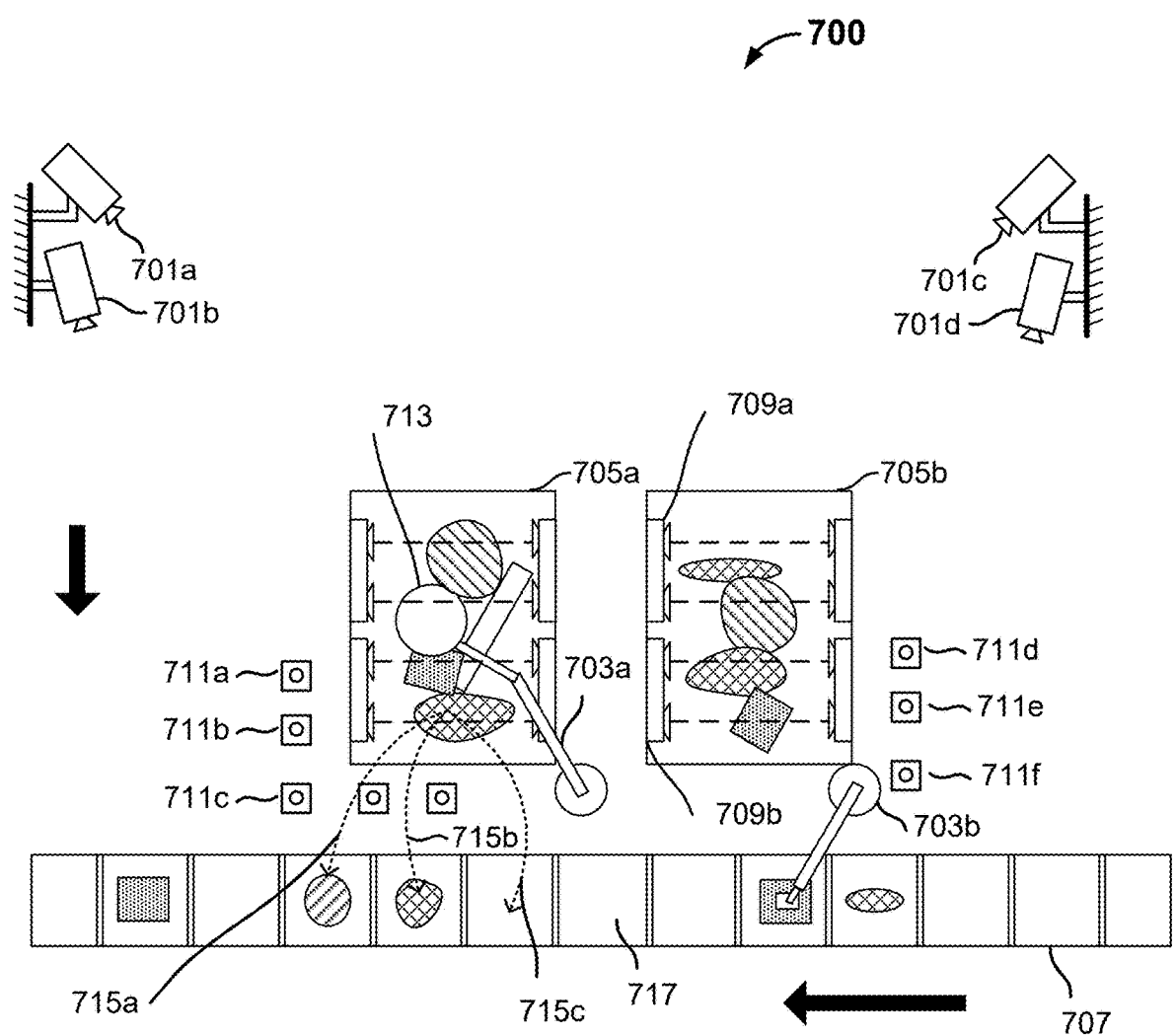
FIG. 7B is a diagram illustrating a robotic singulation system according to various embodiments.

FIG. 7B is a diagram illustrating a robotic singulation system according to various embodiments. In the example shown, system 700 of FIG. 7A has been expanded to illustrate that the one or more paths/trajectories for singulating an item from chute 705a to conveyance structure 707 can be determined. System 700 can further implement a plan to pick the item from chute 705a and place the item on slot/tray 717 of conveyance structure 707 according to a selected path/trajectory. System 700 models the workspace to include information pertaining to the items within chute 705a (including the item to be singulated) and information pertaining to conveyance structure 707 (e.g., a location of a slot/tray, an occupied/unoccupied status of a particular slot/tray, a speed of the conveyor, etc.). Accordingly, system 700 may determine the plan to singulate the item to a selected slot/tray 717 on conveyance structure 707 based on a path/trajectory defined or otherwise specified in the plan to singulate the item.

As illustrated in FIG. 7B, system 700 may determine that the item can be singulated along path/trajectory 715a, path/trajectory 715b, and path/trajectory 715c. For example, system 700 may determine the paths/trajectories for singulating the item to a selected slot/tray 717 to different positions of slot/tray 717 (e.g., the location of the slot/tray 717 is dynamic as the conveyor moves during singulation). According to various embodiments, system 700 selects one of the paths/trajectories along which to singulate the item, and determines a plan based at least in part on the selected path/trajectory. In connection with determining the plan, system 700 may obtain a speed of the conveyor, a location of the selected slot/tray 717, and thus determine a speed and timing for singulating or moving the item along the selected path/trajectory. For example, the system computes an amount of force to be applied to the item and/or speed at which the robotic arm is to be controlled to move the item to the location of the selected slot tray.

In some embodiments, the system coordinates control of conveyance structure 707 (e.g., a speed at which the conveyance structure is driven, or a timing for arrival of the selected slot/tray) with control of one or more robotic arms. The robotic arms may be controlled to partially lift and/or push (or otherwise apply force to) the item towards conveyance structure 707 (e.g., to the location of the selected slot/tray). If the robotic arm(s) move the item more slowly than expected according to the plan for handling the item, the system may control conveyance structure 707 to slow arrival of the selected slot/tray or to stop when the selected slot/tray has arrived at the location at which the item is to be pushed on conveyance structure 707. The system may further control the robotic arm(s) to push the item more quickly (e.g., to apply more force on the item). Conversely, if the robotic arm(s) moves the item quicker than expected according to the plan for handling the item, the system may control conveyance structure 707 to increase the speed of conveyance structure 707 (e.g., to ensure the arrival of the selected slot/tray when the item is being pushed from the chute or source conveyor).

Figure 7C:
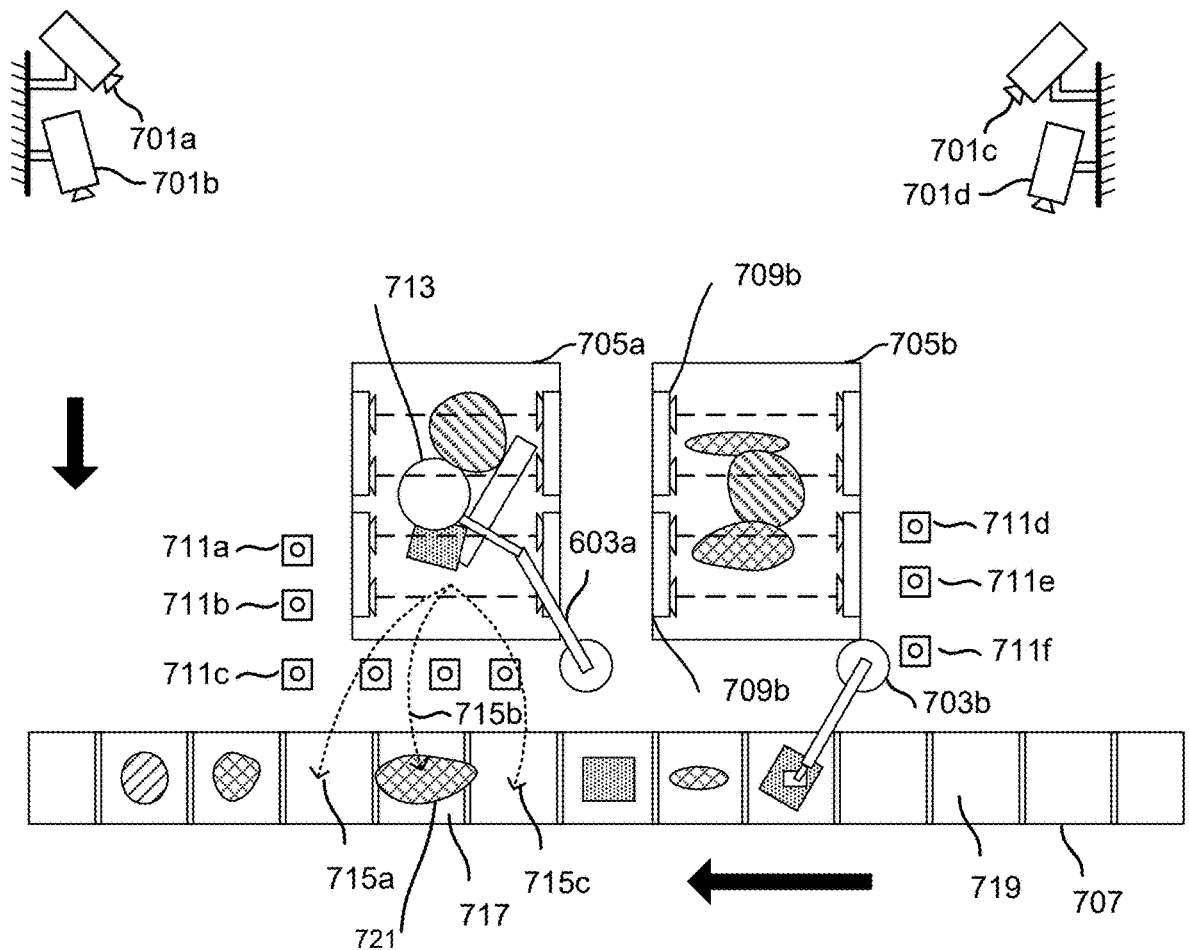
FIG. 7C is a diagram illustrating a robotic singulation system according to various embodiments.

FIG. 7C is a diagram illustrating a robotic singulation system according to various embodiments. In the example shown, system 700 of FIGS. 7A and 7B has been expanded to illustrate that item 721 was singulated from chute 705a to slot/tray 717 on the conveyance structure 707. Item 721 was picked from chute 705a, moved along path/trajectory 715b, and singly placed in slot/tray 717.

Figure 7D:
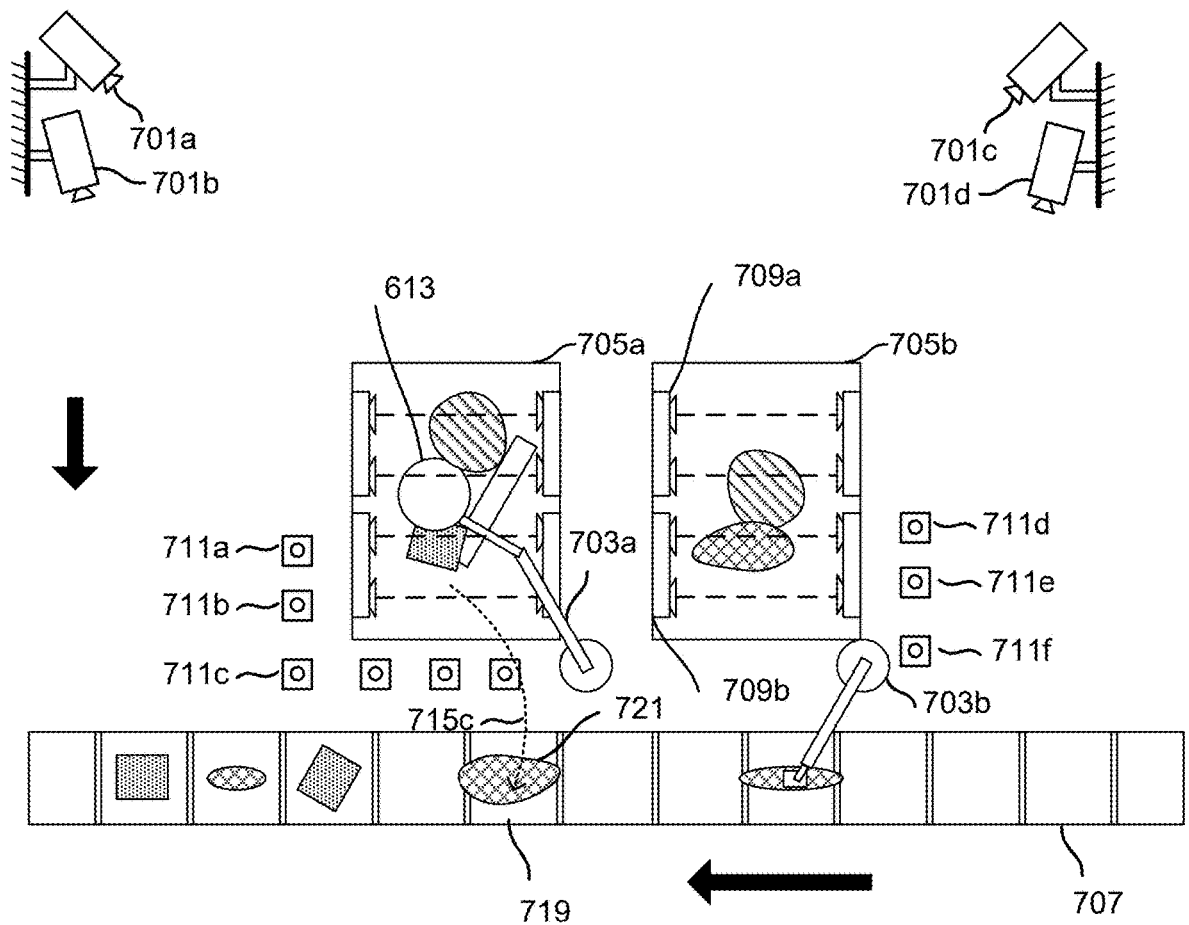
FIG. 7D is a diagram illustrating a robotic singulation system according to various embodiments.

FIG. 7D is a diagram illustrating a robotic singulation system according to various embodiments. In the example shown, system 700 of FIGS. 7A and 7B has been expanded to illustrate that item 721 was singulated from chute 705a to a different slot/tray 719 on the conveyance structure 707. Item 721 was picked from chute 705a, moved along path/trajectory 715c, and singly placed in slot/tray 719.

According to various embodiments, system 700 selects a different slot/tray at which the item is to be singulated in response to determining a state or condition of the item or workspace, or in response to determining a particular attribute associated with the item, another item within the workspace, or the workspace. For example, in response to picking up item 721, system 700 may determine that robotic arm 703a cannot move item 721 as quickly as expected according to the plan for singulation. In response to such a determination, system 700 may select a new slot/tray 719 within which the item is to be placed. In various embodiments, the new slot/tray is a slot/tray that is upstream on the conveyance structure 707 from the originally selected slot/tray 717.

In some embodiments, system 700 determines to select a new tray in response to determining a state/condition of the item or workspace, or in response to determining an attribute of the item. As example, system 700 determines to singulate item 721 to slot/tray 719 in response to picking up item 721 and determining a weight thereof. System 700 may determine that item 721 was too heavy to move at a speed necessary to place the item at slot/tray 717. As another example, system 700 determines to singulate item 721 to slot/tray 719 in response to determining that slot/tray 717 was occupied with an item, or in response to system 700 receiving an indication of a fault from a global scheduler that slot/tray 717 has been reserved by another robot. Various other instances in which system 700 may determine to singulate the item to a new slot/tray include a determination that a slot adjacent or within a threshold proximity of slot/tray 717 has another item or an item having a size that exceeds a predefined size threshold; a determination that a slot adjacent or within proximity of slot/tray 717 has an item that would block sensors within the workspace from reading a label or identifier on the item; etc.

Figure 8A:
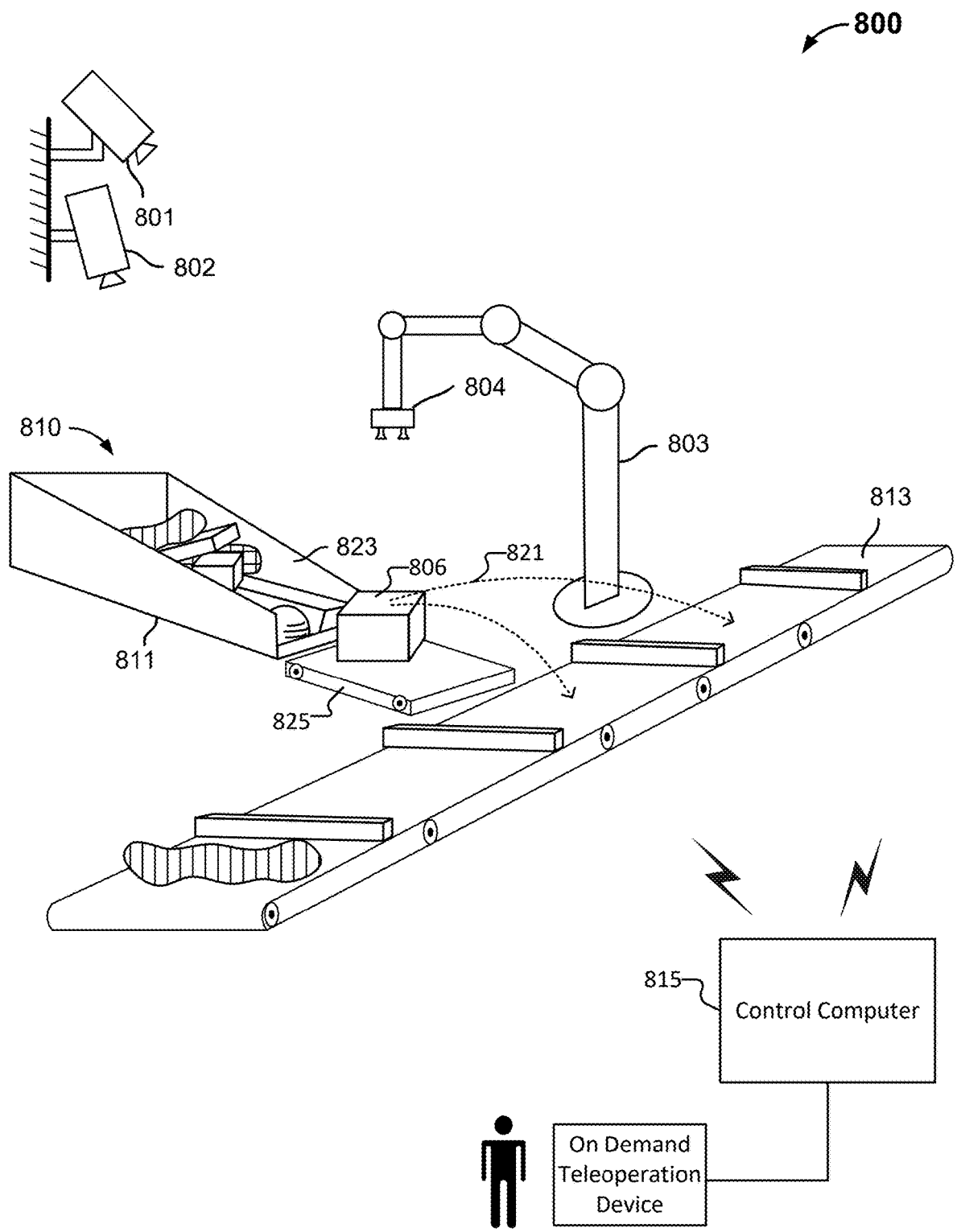
FIG. 8A is a diagram illustrating a robotic singulation system according to various embodiments.

FIG. 8A is a diagram illustrating a robotic singulation system according to various embodiments. In various embodiments, system 800 of FIG. 8A implements the hierarchical scheduling system 300 of FIG. 3, process 400 of FIG. 4A, process 420a of FIG. 4B, process 420b of FIG. 4C, process 600 of FIG. 6, process 850 of FIG. 8B, and process 875 of FIG. 8C.

In the example shown, system 800 comprises source conveyor 825 that is configured to comprise one or more items and to move (e.g., translate) the items along the path of the conveyor. The one or more items comprised on source conveyor 825 are fed by chute 823 or a funnel or other infeed system.

The example illustrated in FIG. 8A illustrates system 800 determining to singulate item 806 from source conveyor 825 to conveyance structure 813 according to a new path 821 based a timing at which the slot at which the initial path terminates arrives relative to an expected arrival time of item 806. In response to determining that an adjacent slot comprises a relatively large item (e.g., exceeds a predetermined size, or has at least one dimension that exceeds a threshold), system 800 may determine to not place item 806 adjacent to such large item, and determines new path 821 to singulate item 806. Robotic arm 803 is operated to grasp item 806 using end effector 804 and to move item 806 according to new path 821. In some implementations, system 800 determines to singulate item 806 into a different slot if the item to be singulated would block sensors from obtaining information from an item already placed on conveyance structure 813.

In response to determining that item 806 is too heavy for robotic arm 803 to grasp or completely lift up, system 800 (e.g., control computer 815) determines a plan for handling the item. For example, the plan for handling the item includes controlling robotic arm 803 (e.g., individually or in coordination with one or more other robotic arms) to push item 806 from source conveyor 825 to conveyance structure 813. The plan may further include driving source conveyor 825 in the direction towards conveyance structure 813 (e.g., to assist the robotic arm(s) with providing item 806 with momentum in the direction of the destination location).

System 800 may include one or more sensors from which an environment of the workspace 810 is modeled. In the example shown in FIG. 8A, system 800 includes image sensors, including in this example 3D cameras 801 and 802. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, and the like. As an example, system 800 may include one or more sensors arrays disposed within or around chute 811. System 800 may include one or more sensors or sensor arrays (not shown) disposed around the workspace.

According to various embodiments, system 800 includes one or more sensor arrays disposed at conveyance structure 813. For example, a sensor array can be disposed at the conveyance structure in a manner that a signal (e.g., an IR beam) is emitted across the conveyance structure. In various embodiments, a control computer (not shown) includes a workspace environment state system such as a vision system used to discern individual items, debris on the workspace, and the orientation of each item based on sensor data such as image data provided by image sensors, including in this example 3D cameras 801 and 802. The vision system may also include one or more sensors and/or sensors arrays (not shown). The one or more sensors or sensor arrays may obtain information from which sensor data pertaining to item 806 is determined. For example, the sensors/sensor arrays detect a size of item 806 and other items in the workspace, such as items on conveyance structure 813. The height of an item within chute 811 or on conveyance structure 813 may be determined based at least in part on a determination of a set of sensors within sensor arrays that are tripped by the item. In some embodiments, system 806 determines that item 806 is relatively large based on information stored in the distributed data structure mapping item identifiers or types to item attributes such as weight.

According to various embodiments, the workspace environment state system produces output used by system 800 to determine and implement a plan to autonomously operate robotic arm 803 to pick one or more item 806 from chute 811 and place item 806 in a corresponding available defined location for machine identification and sorting, such as a partitioned section of segmented conveyance structure 813. In some embodiments, the workspace environment state system produces an output (e.g., sensor data or information otherwise characterizing the workspace and items within the workspace) used by the robotic system to detect a state/condition or attribute associated with one or more items in the workspace, and/or a state/condition or attribute associated with the robotic arm or other element of the workspace. According to various embodiments, in response to detecting (e.g., determining) the state/condition or attribute associated with one or more items in the workspace, the robotic system determines to implement a plan to singulate the item, which may include one or more active measures to improve singulating an item. As illustrated in the example of FIG. 8A, the active measure includes selecting a new path 821 along which item 806 is to be singulated. The active measure may include updating the plan to autonomously operate a robotic structure to pick one or more items from the workspace and place each item singly in a corresponding location in a singulation conveyance structure. In some embodiments, the active measure or the updating the plan includes operating the robotic structure to change or adapt to the detected state/condition or attribute of the item (e.g., implement a change with respect to a manner by which an item is singulated, implement to reconfigure items within the source pile/flow to make grasping a selected item easier, operate to reposition the robotic arm or end effector to increase the ability to grasp the item, etc.).

Figure 8B:
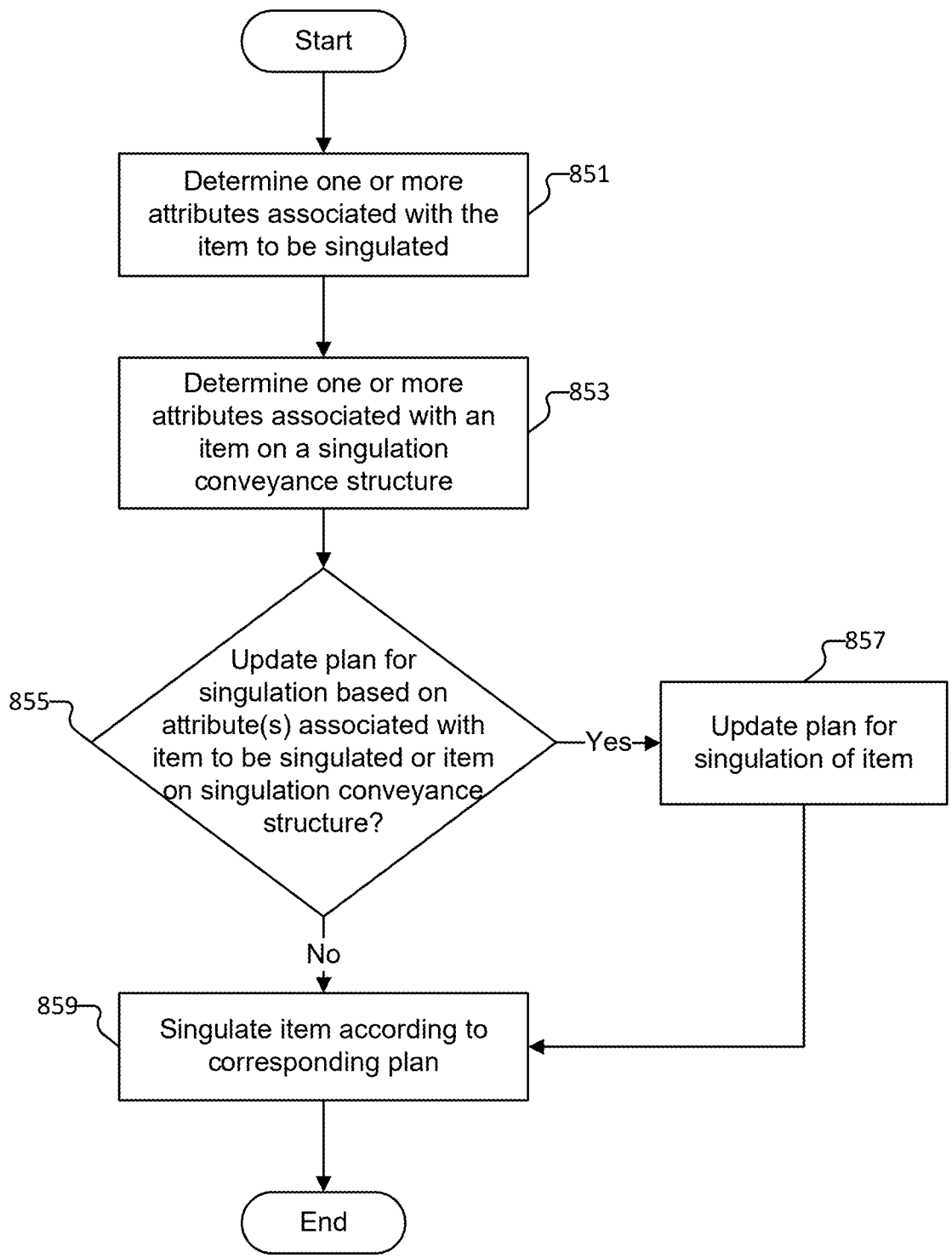
FIG. 8B is a diagram of a process to determine a plan or strategy to singulate one or more items using an attribute of an item within a workspace according to various embodiments.

FIG. 8B is a diagram of a process to determine a plan or strategy to singulate one or more items using an attribute of an item within a workspace according to various embodiments. Process 850 of FIG. 8B may be performed by system 200 of FIG. 2A and FIG. 2B, system 500 of FIGS. 5A and 5B, and/or system 800 of FIG. 8A. In some embodiments, process 850 is implemented by a robot system operating to singulate one or more items within a workspace. The robot system includes one or more processors that operate to cause a robotic structure (e.g., a robotic arm) to pick and place items for sorting.

At 851, one or more attributes associated with the item are determined. The one or more attributes associated with the item may be determined in a similar manner to the one or more attributes of 422 in process 420a of FIG. 4B, and/or the location of the label or identifier of 425 in process 420b of FIG. 4C. According to various embodiments, the one or more attributes associated with the item are determined after the item has been picked from the source pile/flow. For example, information obtained from one or more sensors/sensor arrays is used in connection with determining the one or more attributes. Examples of attributes that may be determined after the item is picked from the source pile/flow include a weight of the item, a size of the item, a location of an identifier/label on the item, etc.

At 853, one or more attributes associated with an item on a singulation conveyance structure are determined. The system determines one or more attributes associated with the item based at least in part on sensor data using information obtained by sensors in the workspace, or based on information stored in a distributed data structure (e.g., such information stored in association with the slot in which the item is located on the conveyor). As an example, the sensor data may include an image, and the determining the one or more attributes includes processing the image, such as performing OCR with respect to text comprised in the image, and determining the attribute(s) (e.g., routing data) from the text.

According to various embodiments, in response to determining a plan to singulate the item and after beginning to implement the plan, the system obtains the one or more attributes associated with the item. During singulation of the item, the system may dynamically receive information associated with the item and the workspace based at least in part on information received by sensors within the workspace. As an example, in response to picking up the item, the system may determine a weight of the item based at least in part on one or more of a measure of a change in weight on the chute after the item is removed from the chute, a force sensor coupled to the robotic arm, an amount of work/power required by the robotic arm to pick up or move the item, etc. As another example, in response to picking up the item, a label or identifier on the item can be located using information received from the vision system.

According to various embodiments, the one or more attributes associated with an item on the singulation conveyance structure (e.g., conveyor) are determined based on information stored in a distributed data structure. For example, in response to (or in connection with) a robotic arm placing the item on the conveyor, the system updates the distributed data structure with one or more attributes associated with the item, and associates such information with the slot of the conveyor in which the item is placed. As another example, after the item is placed on the conveyor, one or more sensors along the conveyor or otherwise within the workspace obtain information pertaining the item, such as routing data (e.g., destination data, service class, etc.). Attributes associated with the item can be obtained from such information, and the distributed data structure is correspondingly updated.

At 855, a determination of whether to update the plan for singulation of the item to be singulated is made. According to various embodiments, the system (e.g., a robotic system) determines whether to update the plan based at least in part on one or more attributes associated with the item and/or one more attributes associated with an item on the conveyor.

In some embodiments, the system determines, based on the attributes, that singulation of the item is expected to be more successful or more efficient if the plan is updated. Similarly, the system can determine that singulation of the item is expected to be impeded along a current path, and that singulation along a new path would improve singulation of the item. As an example, the system determines that a relatively large item is located in a slot within a predefined proximity (e.g., an adjacent slot) to a location at which the item is to be singulated, and thus determine to update the plan to change a location at which the item is to be singulated. The relatively large item could block sensors from reading information on another item, or otherwise obtaining information pertaining to such other item. In addition, the relatively large item may impede the robotic arm while placing the item in the initial location. As another example, the system determines that the speed at which the robotic arm would have to move the item in order to singulate the item in the initially planned location may increase the chance of a singulation failure (e.g., misplaced item, dropping of the item, etc.), and in response to such a determination, the system determines to use another slot further upstream to allow the robotic arm to operate at a relatively slower speed.

In response to determining to update the plan for singulation at 855, process 850 proceeds to 857 at which the plan for singulation of the item is updated. The system provides to a robotic arm updated instructions for carrying out singulation of the item, such updated instructions corresponding to the updated plan. In some embodiments, in response to updating the plan, the system provides information pertaining to the plan to the global scheduler and/or updates the distributed data structure accordingly. According to various embodiments, the updating of the plan includes one or more of updating the path for singulation of the item, changing to a new slot in which the item is to be singulated, a strategy for releasing the item to the desired location, a speed at which the robotic arm is to move the item, etc.

Conversely, in response to determining not to update the plan for singulation of the item at 855, process 850 proceeds to 859 at which the item is singulated according to the corresponding plan. According to various embodiments, the robotic system operates the robotic arm according to the plan in order to singulate the item based at least in part on the plan. In some embodiments, singulation of the item in 859 corresponds to 430 of process 400 of FIG. 4A.

Figure 8C:
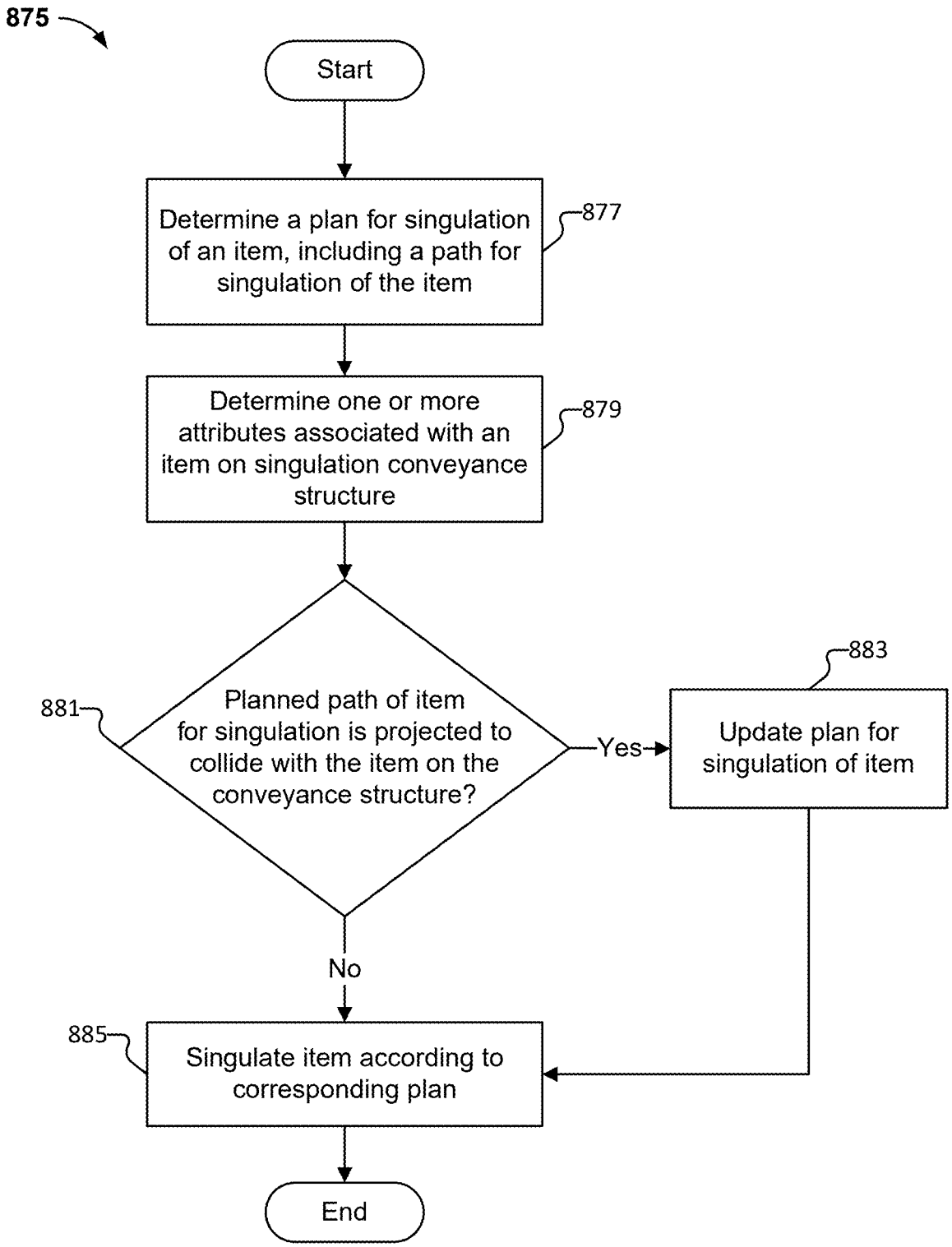
FIG. 8C is a diagram of a process to determine a plan or strategy to singulate one or more items using an attribute of an item within a workspace according to various embodiments.

FIG. 8C is a diagram of a process to determine a plan or strategy to singulate one or more items using an attribute of an item within a workspace according to various embodiments. Process 875 of FIG. 8C may be performed by system 200 of FIG. 2A and FIG. 2B, system 500 of FIGS. 5A and 5B, and/or system 800 of FIG. 8A. In some embodiments, process 875 is implemented by a robotic system operating to singulate one or more items within a workspace. The robotic system includes one or more processors that operate to cause a robotic structure (e.g., a robotic arm) to pick and place items for sorting.

At 877, a plan for singulating an item is determined. The plan includes an expected path along which the item is to be moved during singulation of the item.

At 879, one or more attributes associated with an item on a singulation conveyance structure are determined. In various embodiments, the system determines the one or more attributes associated with the item based on sensor data using information obtained by sensors in the workspace, or based on information stored in a distributed data structure (e.g., such information stored in association with the slot in which the item is located on the conveyor). The one or more attributes associated with the item may be determined in a similar manner to the attributes of 853 of process 850 of FIG. 8B, the attributes of 422 of process 420a of FIG. 4B, and/or the location of the label or identifier of 425 in process 420b of FIG. 4C.

At 881, a determination is made as to whether the path of the item is projected to collide with the item on the conveyance structure. According to various embodiments, the system determines whether the item is projected to collide with the item on the conveyance structure (e.g., conveyor) based at least in part on the path included in the plan, and on the one or more attributes associated with the item on the conveyor. The system may further determine whether the item is expected to collide with the item on the conveyor based on one or more attributes of the item being singulated.

In some embodiments, the system determines whether the item being singulated (or the robotic structure) is expected to intersect with the item on the conveyor at a point in time while the item is moving along the planned path. The system may use the speed of the conveyor, the location of the item on the conveyor, a size of the item on the conveyor, etc. in connection with determining whether the path of the item is projected to collide with the item on the conveyor. The size of the item being singulated may also be determined by the system and used in connection with determining whether a collision is expected.

In some implementations, the determining whether the path of the item is projected to collide with the item on the conveyance structure includes determining whether the item being singulated will be moved within a predetermined proximity threshold of the item on the conveyor. The system may implement a buffer to avoid moving the item being singulated too close to the item on the conveyor. In response to a determination that the item being singulated will, at any point along the path, be moved within the predetermined proximity threshold of the item on the conveyor, the system determines that the path of the item is projected to collide with the item on the conveyance structure.

In response to determining that the path of the item is projected to collide with the item on the conveyor at 881, process 875 proceeds to 883 at which the plan for singulating the item is updated. The updating the plan for singulating the item at 883 may correspond to the updating of the plan at 857 of process 850 of FIG. 8B.

Conversely, in response to determining that the path of the item is not projected to collide with the item on the conveyor at 881, process 875 proceeds to 885 at which the item is singulated according to the corresponding plan. According to various embodiments, the robotic system operates the robotic arm according to the plan in order to singulate the item based at least in part on the plan. In some embodiments, singulation of the item in 885 corresponds to 430 of process 400 of FIG. 4A and/or singulation of the item in 859 of process 850 of FIG. 8B.

Figure 9:
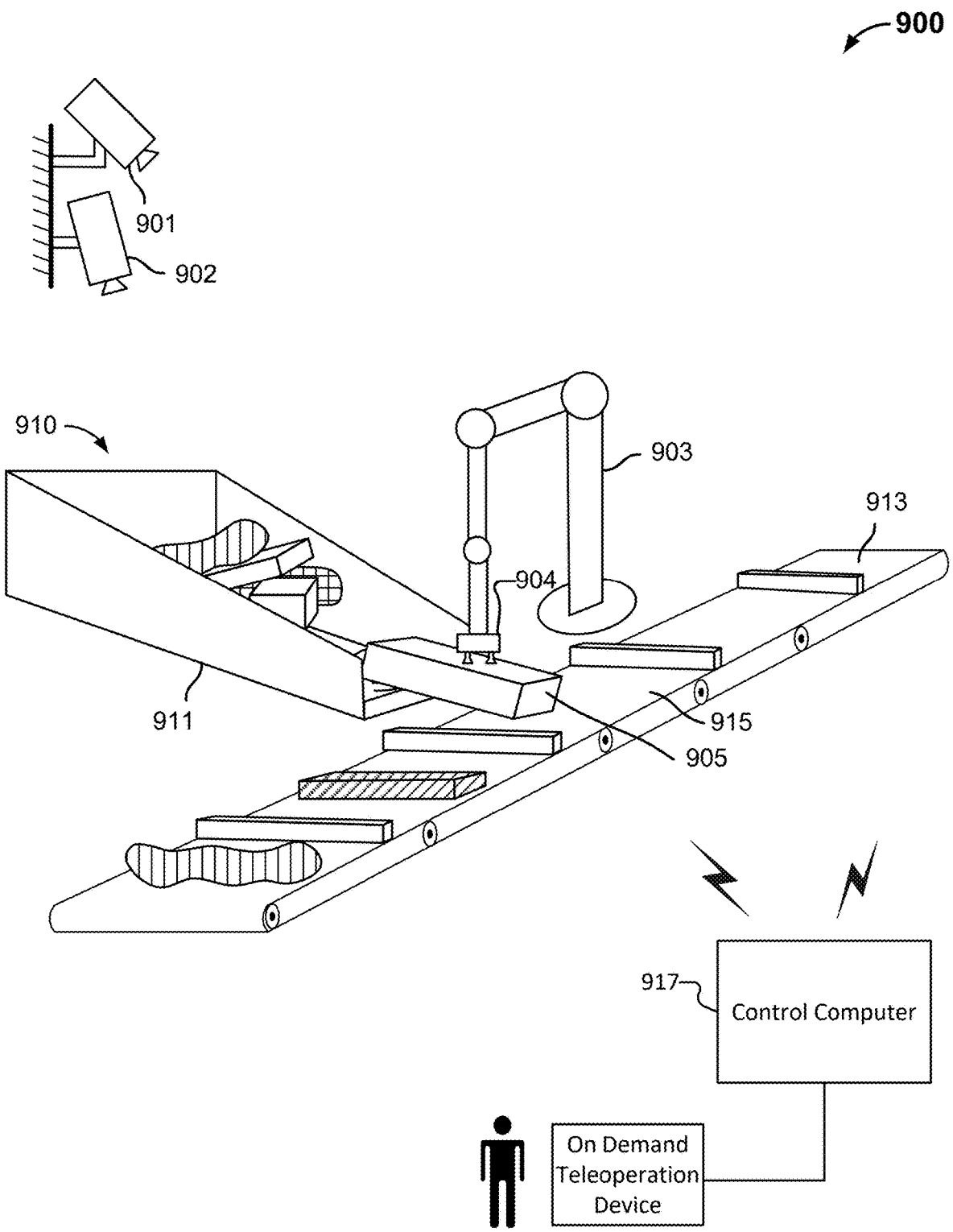
FIG. 9 is a diagram illustrating a robotic singulation system according to various embodiments.

FIG. 9 is a diagram illustrating a robotic singulation system according to various embodiments. In various embodiments, system 900 of FIG. 9 implements the hierarchical scheduling system 300 of FIG. 3, process 400 of FIG. 4A, process 420*a* of FIG. 4B, process 420*b* of FIG. 4C, process 600 of FIG. 6, process 850 of FIG. 8B, and process 875 of FIG. 8C.

According to various embodiments, system 900 pushes or partially lifts and pulls or drags an item from the source pile/flow to the corresponding location on the conveyor. As an example, system 900 (e.g., control computer 917) determines to partially drag the item in response to a determination that completely picking up the item and moving robotic arm 903 to place the item on the conveyor is not feasible. Some examples of instances in which the item may be pushed or dragged include: if the item is determined to be relatively heavy (e.g., has a weight greater than a predetermined threshold); if the item is relatively large; if the item is determined to have an irregular shape or a type of packaging that is difficult to grasp (e.g., if a successful grasp rate is less than a predetermined threshold); if an initial grasping strength is less than expected (e.g., if a subset of the plurality of suction cups on the end effector have failed); and if a path of dragging the item is determined to be more efficient than completely picking up the item.

In the example shown, system 900 determines to singulate item 905 according to a path corresponding to dragging the item 905 from chute 911 to slot 915 on the conveyor 913. In some instances, robotic arm 903 engages end effector 904 to item 905 at chute 911 and partially lift item 905 and move the item 905 towards conveyor 913 so as to drag item 905 from chute 911 to conveyor 913. In some instances, robotic arm 903 engages end effector 904 to item 905 at chute 911 to drag the item 905 (e.g., without partially lifting item 905) towards conveyor 913 so as to drag item 905 from chute 911 to conveyor 913.

System 900 may include one or more sensors from which an environment of the workspace 910 is modeled. In the example shown in FIG. 9, system 900 includes image sensors, including in this example 3D cameras 901 and 902. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, and the like. As an example, system 900 may include one or more sensors arrays disposed within or around chute 911. In various embodiments, system 900 includes one or more sensors or sensor arrays (not shown) disposed around the workspace.

According to various embodiments, workspace 910 is modeled and a model of the workspace 910 is used in connection with determining to drag item 905 from chute 911 to conveyor 913. For example, system 900 may determine a weight of item 905 based at least in part on the model of the workspace, and may determine to drag item 905 based at least in part on the weight.

Although the example shown in FIG. 9 illustrates singulation from chute 911 to conveyor 913, in some embodiments, system 900 comprises a source conveyor onto which items are fed via chute 911 or a funnel or other infeed system. The source conveyor may be driven to move the items towards conveyor 913. In some embodiments, the source conveyor comprises one or more sensors. As an example, the one or more sensors obtain information pertaining to the items on the source conveyor, such as one or more item attributes. For example, system 900 determines item attributes for items on the source conveyor based on a camera or other image system that captures information pertaining to a size, shape, label, or other symbol on the item. As another example, system 900 determines item attributes for items on the source conveyor based on a weight sensor. As another example, system 900 determines item attributes for items on the source conveyor based on an amount of work implemented by the source conveyor to move the items. The current utilization of one or more motors that drive the source conveyor may be a proxy for amount of work implemented by the source conveyor.

Figure 10A:
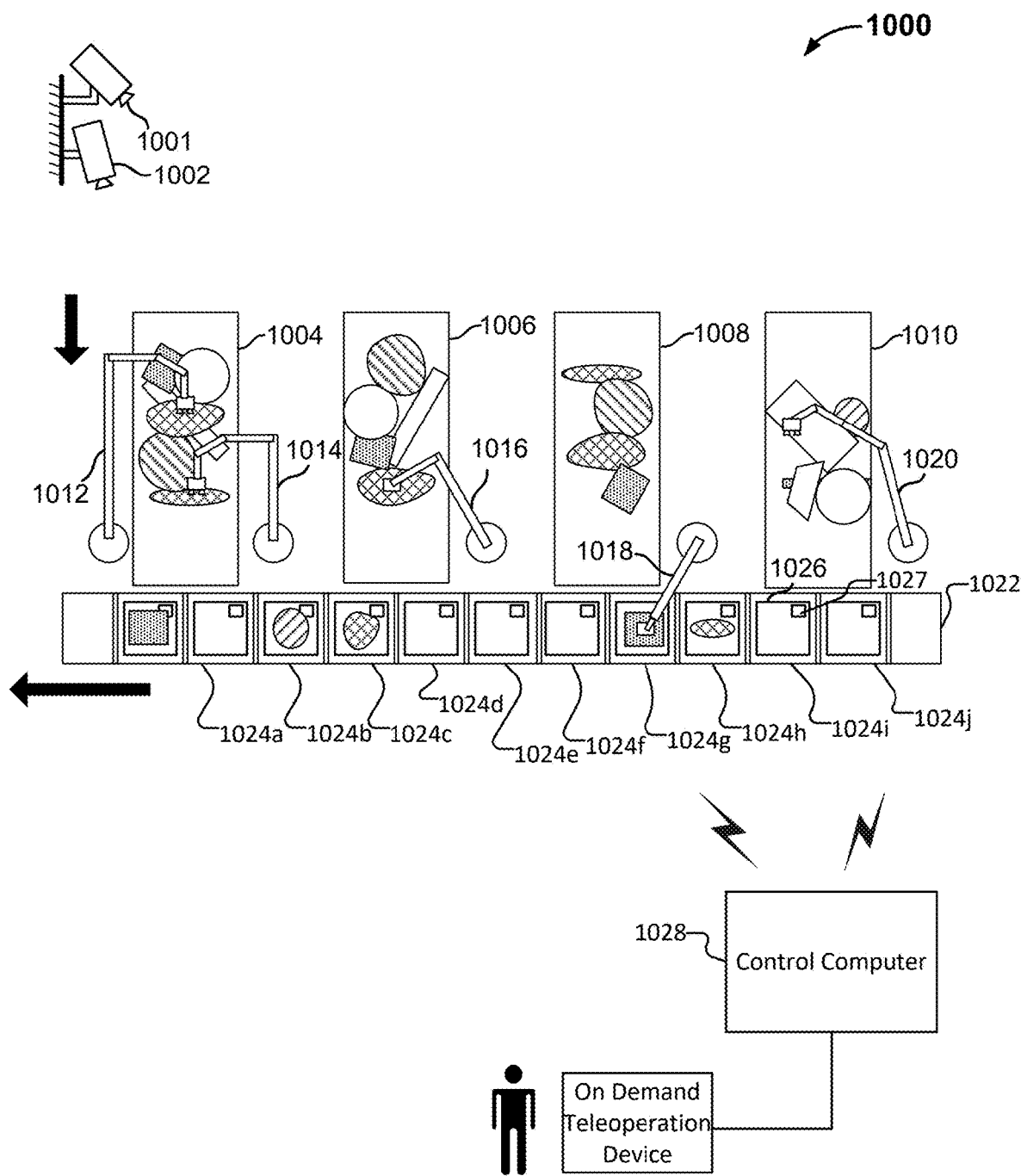
FIG. 10A is a diagram illustrating a robotic singulation system according to various embodiments.

FIG. 10A is a diagram illustrating a robotic singulation system according to various embodiments. In various embodiments, system 1000 of FIG. 10A implements the hierarchical scheduling system 300 of FIG. 3, process 400 of FIG. 4A, process 420*a* of FIG. 4B, process 420*b* of FIG. 4C, process 600 of FIG. 6, process 850 of FIG. 8B, process 875 of FIG. 8C, and process 1050 of FIG. 10B.

As illustrated in FIG. 10A, system 1000 includes three additional stations: robotic arms 1012, 1014, 1016, 1018, and 1020 positioned and configured to pick/place items from stations 1004, 1006, 1008, and 1010. According to various embodiments, one or more robotic arms operate to singulate items from a same chute. For example, robotic arms 1012 and 1014 operate to pick/place items from stations 1004. System 1000 includes one or more sensors that provide information from which sensor data pertaining to a workspace is determined. System 1000 includes cameras 1001 and 1002 which may be configured or arranged to provide a 3D view of the full scene, including each of the four stations 1004, 1006, 1008, and 1010, as well as conveyor 1022. In some embodiments, the stations may comprise one or more of a chute, an infeed system, a source conveyor, etc. For example, the station may include an infeed system that delivers items to a chute or funnel, which creates a flow of items (e.g., a more segmented flow of items) towards the source conveyor from which the items are moved to the destination location (e.g., conveyor 1022).

In various embodiments, control computer 1028 coordinates operation of the robotic arms 1012, 1014, 1016, 1018, and 1020, and associated end effectors, along with conveyor 1022, to pick/place items from the stations 1004, 1006, 1008, and 1010 to conveyor 1022 in a manner that achieves a desired collective throughput of the system (e.g., a collective throughput that satisfies a throughput threshold, etc.). Control computer 1028 may implement global scheduler 322 of hierarchical scheduling system 300 of FIG. 3. In some embodiments, control computer 1028 further implements robotic singulation station schedulers 324, 326, 328, and 330 of hierarchical scheduling system 300 of FIG. 3. As an example, global scheduler 322 may coordinate operation of robotic arms 1012, 1014, 1016, 1018, and 1020 to ensure that collision events are avoided during operation of robotic arms 1012, 1014, 1016, 1018, and 1020 to singulate items from stations 1004, 1006, 1008, and 1010 to conveyor 1022. Robotic singulation station schedulers 324, 326, 328, and 330 may control to determine plans or strategies for robotic arms 1012, 1014, 1016, 1018, and 1020 to singulate items, and robotic singulation station schedulers 324, 326, 328, and 330 may provide the robotic arms with such plans or strategies to cause the robotic arms to implement such plans or strategies (or provide the robotic arms with instructions corresponding to plans or strategies).

According to various embodiments, system 1000 comprises a conveyor 1022 that includes a plurality of slots or trays 1024*a*-1024*j*. An item to be singulated is picked from a corresponding chute and singly placed in one of the plurality of slots. Each robotic arm (or scheduler thereof) may determine a slot of the slots or trays 1024*a*-1024*j* in which an item is to be singulated. The selected slot in which the item is to be placed is stored in association with the plan for singulating the item. In addition, a distributed data structure associated with the state or conveyor may be updated to reflect that the robotic arm is to place an item in the slot. For example, the distributed data structure may have a field for indicating that a slot is reserved or occupied, and in response to determining the particular slot into which an item is to be placed, the corresponding field for the slot may be updated.

According to various embodiments, a slot corresponds to a segmented portion of the conveyor 1022. However, in some embodiments, conveyor 1022 may be configured to carry a tray(s) that is distinct from conveyor 1022. As an example, as illustrated in FIG. 10A, tray 1026 may be carried on the conveyor 1022 in slot 1024*i*. According to various embodiments, each of the plurality of slots or trays is associated with an identifier. As an example, as illustrated in FIG. 10A, slot 1024*i* comprises identifier 1027. The identifier may be unique within at least system 1000 (at least with respect to the conveyor 1022). Some examples of forms in which the identifier may be implemented include a barcode, a QR code, an alphanumeric string, a symbol, etc.

In some embodiments, system 1000 stores routing data for an item in association with the slot/tray identifier in which the item is placed. The system (or another sortation system) may correspondingly route/sort the items based at least in part on the routing data. In response to determining that a data structure for a particular slot/tray identifier does not include all the required routing data, system 1000 may obtain further information from one or more sensors in the workspace or further process the initially obtained information (e.g., the image comprising a representation of the item) to obtain the requisite routing data. For example, if system 1000 determines that the routing data associated with the slot/tray identifier includes a service class but not a destination, system 1000 obtains further sensor data or further processes the initially obtained sensor data, to determine a destination for the item.

In various embodiments, a system such as system 1000 uses the vision system to determine whether a particular tray is empty. The vision system may include image data from sensors directed at the conveyor 1022. As the conveyor 1022 moves and the slots/trays are moving, the vision system may obtain an image associated with a slot/tray (or generate a model of the slot/tray) and determine whether the image associated with the slot corresponds to an empty slot/tray. As an example, system 1000 determines that a slot is empty by comparing the image data to a model of an empty slot and performing an analysis to determine a difference between the image data and the model of the empty slot. System 1000 may further determine whether a difference between the image data and the model of the empty slot is indicative of an item being comprised in the slot. In some embodiments, a model of an empty slot is stored for each particular slot in the system to account for differences among slots. For example, system 1000 may store a mapping of models of empty slots to identifiers for the slots, and the mapping can be used in connection with obtaining the applicable model of the empty slot for use in determining whether a particular slot is empty.

According to various embodiments, system 1000 determines whether a particular slot is empty based on an image analysis of image data for the slot. The image analysis may include edge detection or object recognition.

According to various embodiments, system 1000 implements a dynamic model in connection with determining whether a particular slot is empty. Through normal use over time, one or more properties of a slot on the conveyor may change. For example, a side or surface of the slot may change color or have visible scratches/scuffing. As another example, one or more dimensions of a slot may change as a result of relatively oversized/overweight items being placed and carried in the slot. If the appearance or dimensions (or other properties) of the slot change over time, the robotic system may err in determining whether the slot is empty (and available to carry an item to be singulated). System 1000 determines that a slot is not empty because the slot appears different from the definition of what an empty slot looks like (e.g., different color, scratches or other markings on the surfaces, etc.). Accordingly, in some embodiments, the definition of an empty slot (e.g., a mapping of one or more properties of an empty slot) is updated over time. The updating of the definition of the empty slot may be performed periodically at predetermined time intervals, or in response to detecting one or more conditions being satisfied (e.g., an error rate threshold being attained by the robotic system). In various embodiments, the definition of the empty slot is continuously performed. For example, the system data obtains sensor data pertaining to a vision system that is captured with respect to a slot at a location on the conveyor where the slot is deemed to be empty (e.g., at the beginning of the conveyor, or at the end of the conveyor after a step where the slot is emptied), and uses the sensor data to update the definition of the empty slot. In some embodiments, the definition of an empty slot or tray is determined on a slot-by-slot or tray-by-tray basis such that each slot/tray has a corresponding definition of such a slot or tray. As an example, the definition for a particular slot is stored in association with a corresponding identifier for such slot. The updating of the definition of an empty slot may be implemented using a machine learning process.

In various embodiments two or more robots may be deployed at a station, operated under control of an associated control computer, such as the control computer, in a manner that avoids the robots interfering with each other's operation and movement and which maximizes their collective throughput, including by avoiding and/or managing contention to pick and place the same item. In some embodiments, a plurality of robotic arms operating at the same workspace work independently to singulate the plurality of items. The plurality of robots deployed at a station may be controlled to push, in coordination, an item from the station (e.g., the source conveyor) to the destination location (e.g., conveyor 1022). For example, in the case of a heavy item that a single robot is unable to move (e.g., pick and place) by itself, control computer 1028 controls a plurality of robots at the station to work in coordination to move the item (e.g., one or more robots may pick the item and/or one or more robots may push or pull the item). One or more of the plurality of robots may perform an active measure to avoid a collision between two robotic arms (or of items grasped by the robotic arms) in response to detecting a collision or a potential for a collision between the two robotic arms. For example, control computer 1028 coordinates operation of the plurality of robots to enable the plurality of robots to operate independently while ensuring that the plurality of robots and/or the items grasped by the plurality of robots do not collide with one another during singulation. In some embodiments, control computer 1028 implements/enforces "force fields" between two or more robots in order to prevent collisions between the two or more robots. As an example, the robots (or control computer 1028) access information from which their respective positions and the positions of one or more other robots are determined, and the robots are controlled to avoid an intersection between their respective positions or paths and the positions or paths of the one or more other robots at a certain time or at a certain stage of singulation. In some embodiments, a first robot reserves an airspace (e.g., a certain position) that is to be used by the first robot during singulation of an item. In connection with a second robot scheduling singulation of an item, the second robot determines the plan to singulate the item based at least in part on the airspace reserved by the first robot. For example, in connection with scheduling singulation of the item, the second robot determines that the plan cannot (or should not) include movement through the airspace reserved by the first robot and the second robot determines a plan that does not require the second robot or the item to move through the airspace reserved by the first robot during the time at which the airspace is so reserved.

In various embodiments, a scheduler coordinates operation of a plurality of robots, e.g., one or more robots working at each of a plurality of stations, to achieve desired throughput without conflict between robots, such as one robot placing an item in a location (e.g., a slot/tray) the scheduler has assigned to another robot. The scheduler may implement the conflict avoidance by sending faults to robotic structures or the associated schedulers in response to detecting a conflict arising associated with the singulation of items by different robotic arms.

In some embodiments, each of at least a subset of a plurality of robots working at a workspace picks an item independent from the other robots of the plurality of robots and a corresponding plan for singulation of the item is determined. The at least the subset of the plurality of robots may pick in a predefined order such that no two robots select or pick an item at the same time. Each of the at least the subset of the plurality of robots may select or pick an item based on items that are currently available at the time of such selection. Accordingly, a second robot of the at least two subset of the plurality of robots that picks after a first robot will select an item to singulate that is different from the item selected or picked by the first robot.

In some embodiments, multiple robots may pick from a same chute or other source receptacle. In the example shown in FIG. 10A, for example, robotic arm 1014 may be configured to pick from either station 1004 or station 1006. Likewise, robotic arm 1016 may pick from station 1006 or station 1008, etc. In some embodiments, two or more robotic arms configured to pick from the same chute may have different end effectors. A robotic singulation system as disclosed herein may select the robotic arm most suitable to pick and singulate a given item. For example, system 1000 determines which robotic arm(s) can reach the item and selects one with the most appropriate end effector and/or other attributes to successfully grasp the item. As used herein, a station may include a chute, a funnel, a pickup table, a source conveyor, etc.

While stationary robotic arms are shown in FIG. 10A, in various embodiments one or more robots may be mounted on a mobile conveyance, such as a robotic arm mounted on a chassis configured to be moved along a rail, track, or other guide, or a robotic arm mounted on a mobile cart or chassis. In some embodiments, a robotic instrumentality actuator other than a robotic arm may be used. For example, an end effector may be mounted on and configured to be moved along a rail, and the rail may be configured to be moved in one or more axes perpendicular to the rail to enable the end effector to be moved to pick, translate, and place an item as disclosed herein.

Figure 10B:
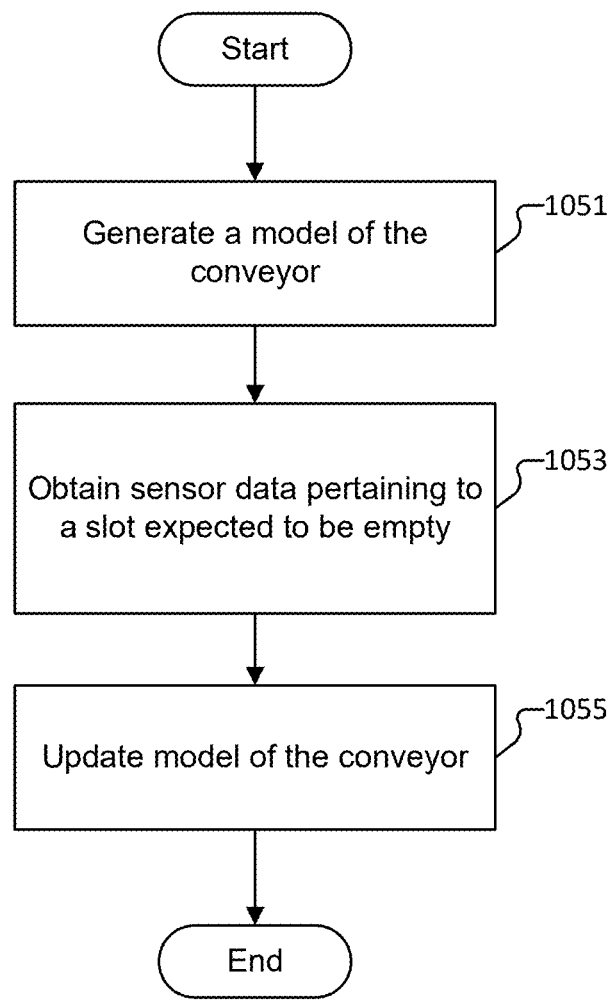
FIG. 10B is a diagram of a process to configure the robotic singulation system using properties of a conveyance structure according to various embodiments.

FIG. 10B is a diagram of a process to configure the robotic singulation system using properties of a conveyance structure according to various embodiments. Process 1050 of FIG. 10B can be performed by system 1000 of FIG. 10A. In some embodiments, process 1050 is implemented by a system (e.g., a robotic system) operating to singulate/handle one or more items within one or more workspaces such as workspaces corresponding to stations 1004, 1006, 1008, and 1010 of system 1000 of FIG. 10A. System 1000 includes one or more processors that operate to cause robotic arms 1012, 1014, 1016, 1018, and 1020 to pick and place items for sorting. System 1000 may implement a vision system and/or use sensor data pertaining to at least the slots/trays of conveyor 1022.

At 1051, a model of the conveyor is generated. According to various embodiments, the model of the conveyor is generated based at least in part on sensor data (e.g., image data from an image system). The model may be further based on information comprised in a distributed data structure that pertains to a state/condition of the conveyor.

System 1000 may include one or more sensors from which a conveyor is modeled. In the example shown in FIG. 10A, system 1000 includes image sensors, including in this example 3D cameras 1001 and 1002. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, a control computer of system 1000 includes a workspace environment state system such as a vision system used to discern individual slots/trays, items, debris on the workspace, label data (e.g., routing data for the item(s)) and orientation of items based on sensor data such as image data provided by image sensors, including in this example 3D cameras 1001 and 1002.

In some embodiments, control computer 1028 of system 1000 stores or otherwise has access to a distributed data structure comprising information pertaining to a state/condition of the workspace, including information pertaining to the conveyor. The distributed data structure may store one or more attributes associated with a particular slot/tray on the conveyor, including information such as an association between an identifier and a slot, an indication of whether the slot is occupied, an identifier corresponding to an item included in the slot (e.g., if the slot is occupied), and various other information associated with the slot. The distributed data structure may further store routing data for an item in association with the slot/tray identifier. The information comprised in the distributed data structure may be used in connection with generating the model. For example, the image data and the data stored in the distributed data structure can be aggregated to form a more holistic model of the conveyor.

At 1053, sensor data pertaining to a slot expected to be empty is obtained. During a singulation process, various locations or points in the process exist wherein a slot is expected to be empty. Examples of locations or points in the process where the slot is expected to be empty include upstream at the beginning of the conveyor (e.g., further upstream than any other robotic arm), at the end of the singulation process after items are removed from the slots on the conveyor, etc. According to various embodiments, system 1000 obtains sensor data (e.g., image data) for the slot at least at one location or point in the process where the slot is expected to be empty. In some implementations, system 1000 also obtains the identifier associated with the slot that is captured in the sensor data.

At 1055, the model of the conveyor is updated. According to various embodiments, in response to receiving current sensor data of an expected empty slot, system 1000 updates the model of the conveyor. Specifically, system 1000 may update a model for the particular slot associated with the sensor data. For example, system 1000 can store a definition of an empty slot in association with the identifier for the slot so that each slot has a corresponding definition.

According to various embodiments, the update to the model of the conveyor includes an update of the characteristics of an empty slot. For example, the updated model may include in its definition discoloration or scuffing that occurs through normal wear and tear of system 1000. Because the definition of the empty slot is updated over time, a current definition of the empty slot more precisely defines the expected characteristics of the empty slot. As such, when comparing image data pertaining to the slot with the definition of the empty slot, system 1000 can more accurately determine whether an item is in the slot (or whether a particular mark/irregularity in the image data is part of the current look of the slot).

According to various embodiments, the system obtains various information pertaining to an item based on information received from a vision system. For example, the system uses image data to detect a predefined symbol on a side/surface of an item in the workspace. As another example, the system uses image data to obtain information from an item label (e.g., a label affixed to one or more surfaces on the item). Examples of symbols or information obtained based at least in part on the image data include (i) a symbol or indication that the item is fragile, (ii) a symbol or indication that the item is heavy, (iii) a symbol or indication of an item weight, (iv) a symbol or indication that the item is to be handled according to one or more orientations, (v) a symbol or indication that the item is deformable (or on which another item is not to be placed, (iv) a symbol or indication that the item is subject to a special handling requirement. The system may also obtain (e.g., infer) other information pertaining to the item based at least in part on the image data. Examples of information that may be inferred based on the image data include item dimensions, an item size, a side on which the label or printed information is disposed (or expected to be disposed), an item weight, etc.

Figure 11:
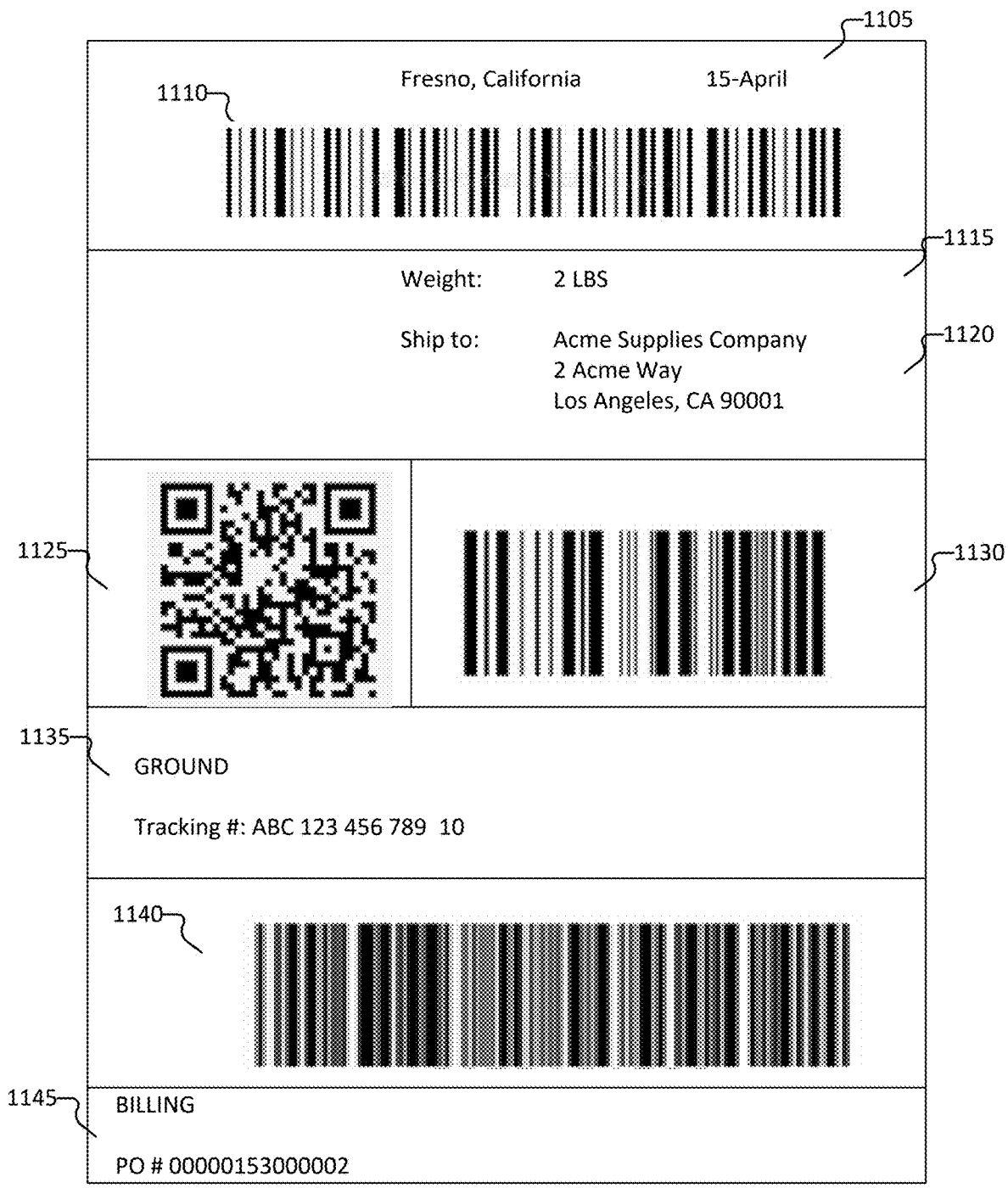
FIG. 11 is a diagram illustrating an example of a shipping label.
Figure 12A:
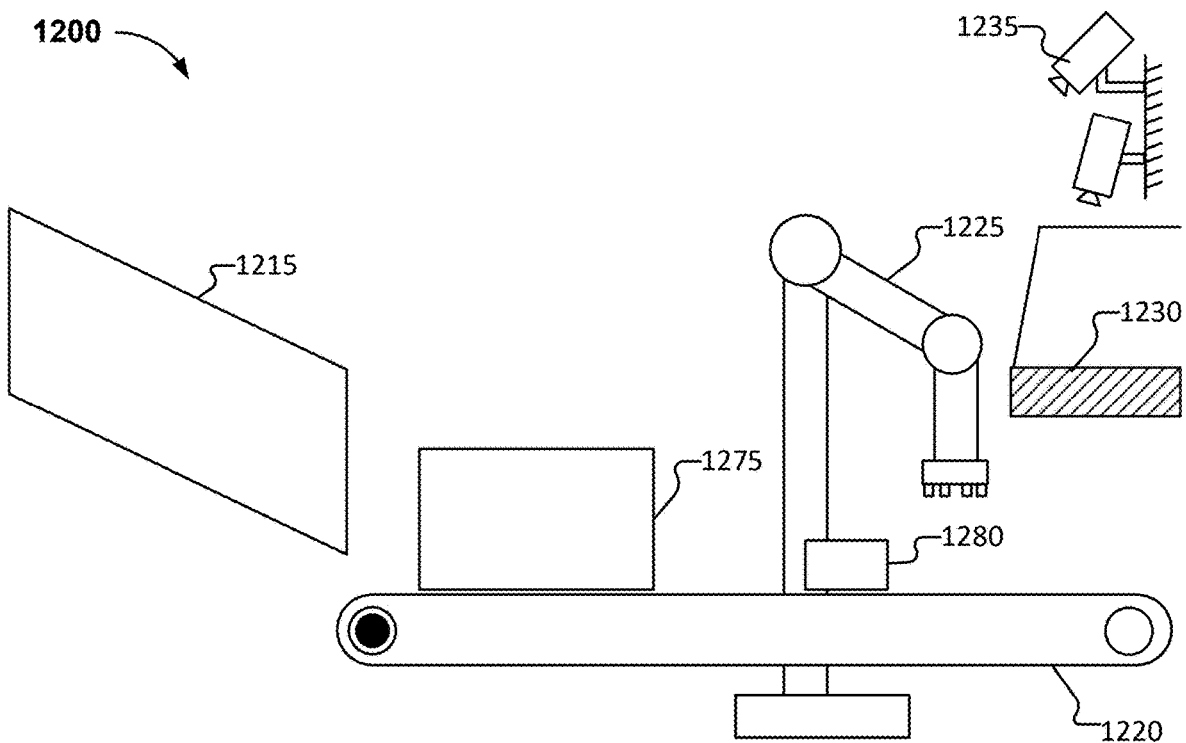
FIG. 12A is a diagram illustrating a singulation system according to various embodiments.
Figure 12B:
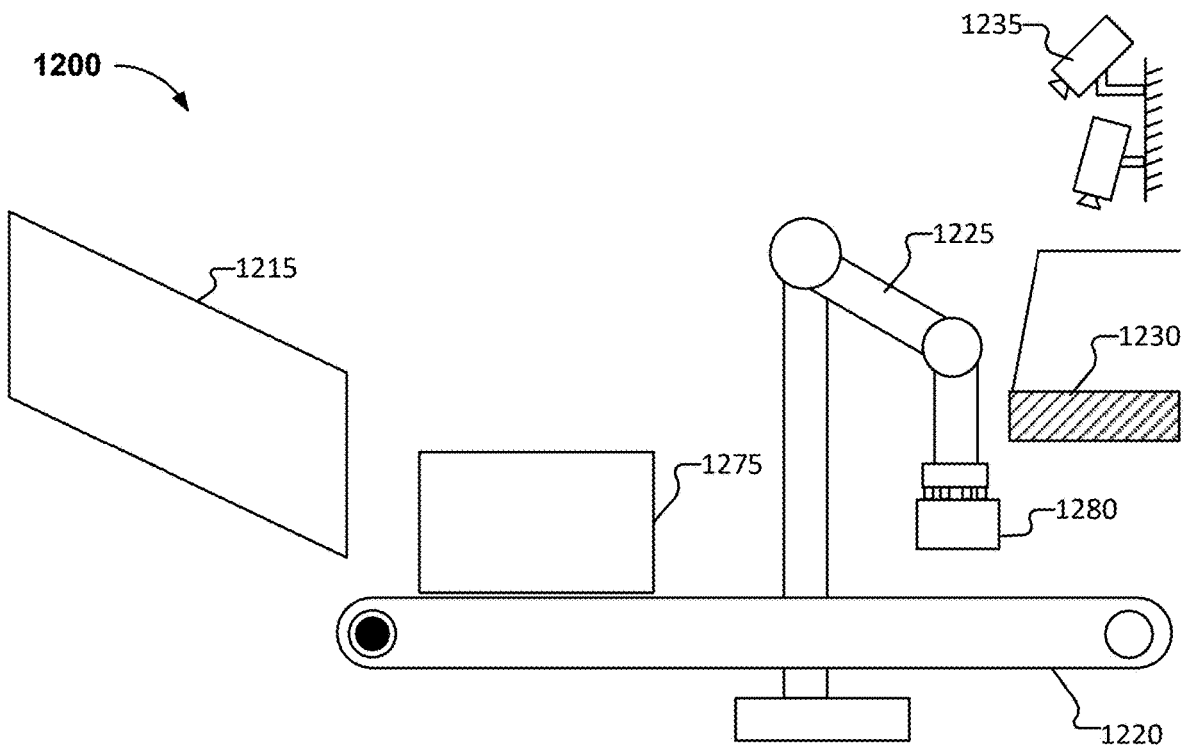
FIG. 12B is a diagram illustrating a singulation system according to various embodiments.
Figure 12C:
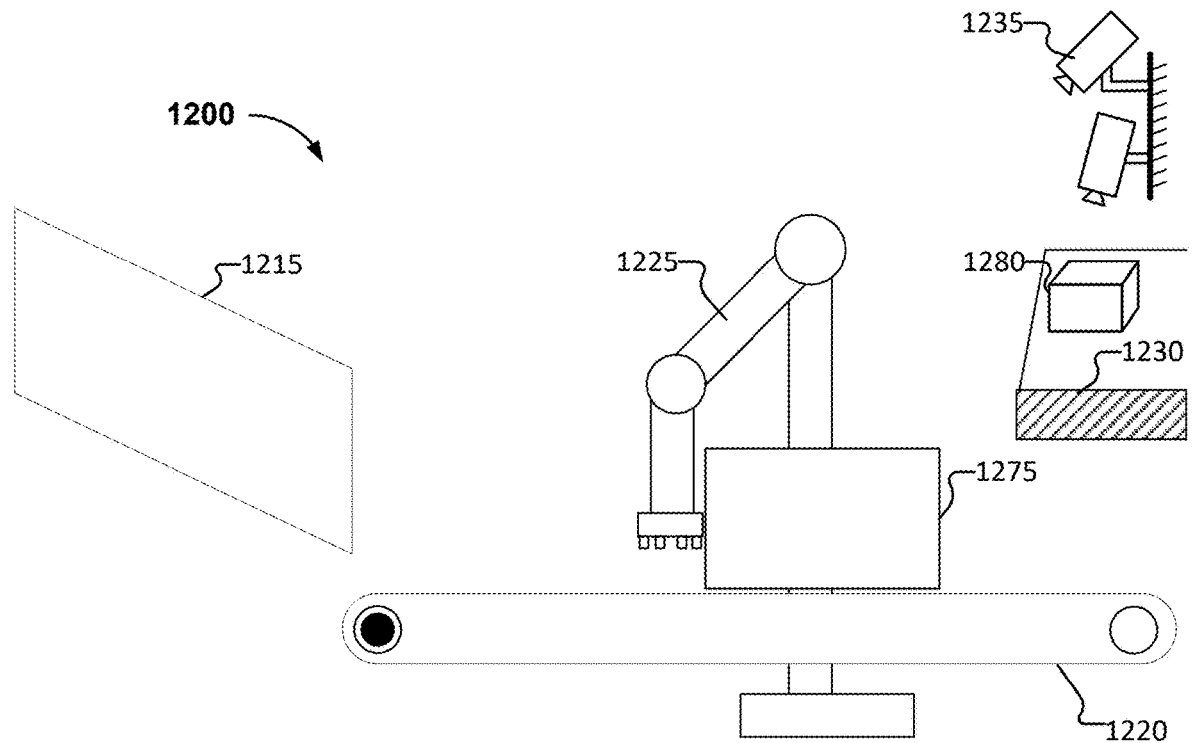
FIG. 12C is a diagram illustrating a singulation system according to various embodiments.
Figure 12D:
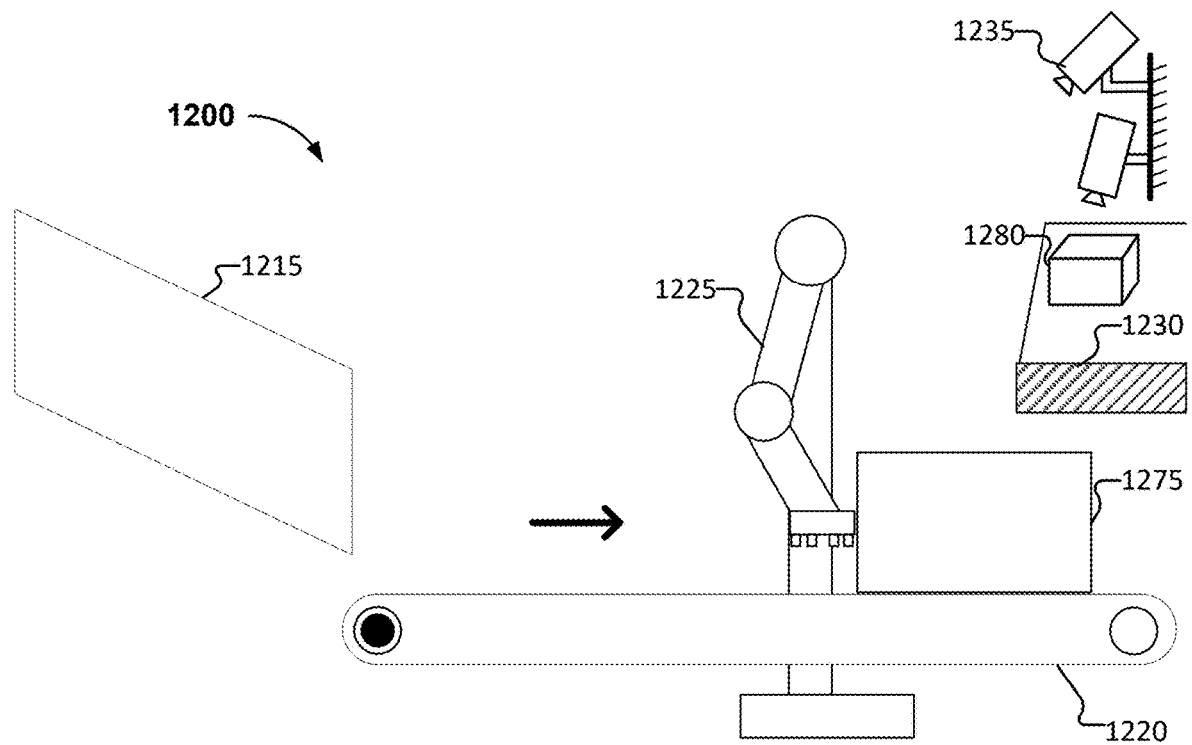
FIG. 12D is a diagram illustrating a singulation system according to various embodiments.

FIG. 11 is a diagram illustrating an example of a shipping label. In the example shown, label 1100 comprises a plurality of fields (e.g., fields 1105-1145). The plurality of fields may comprise different types of information or the same type of information as another field but presented in a different format such as a different encoding of the information into a QR code, barcode, etc.

In some embodiments, label 1100 comprises a date and location field 1105 in which information pertaining to a date and location associate with the intake of the item to the shipping system (e.g., a store location and date of receipt at the store, etc.). Label 1100 further comprises code 1110, which may be a barcode. As an example, code 1110 comprises information pertaining to an order or record under which the item is entered into the shipping system.

Label 1100 may further comprise field in which package weight (or other attributes) are identified. Label 1100 may further comprise addressee field 1120 in which an address to which the item is to be delivered is identified.

In some embodiments, label 1100 comprises code field 1125 in which a maxi code or QR code is printed. The maxi code or QR code comprises rich information, such as an indication of all required routing data (e.g., shipping facility destination, service class, etc.). However, the maxi code or QR code is relatively difficult to read. Proper reading of the maxi code or QR code generally requires a clear image of label 1100. Accordingly, although code field 1125 may comprise sufficient information from which the system may determine the required routing data, the system may not always be able to properly read/decode the information comprised in code field 1125. Therefore, the system relies on extraction of information from other fields of label 1100 to determine the routing data (e.g., if the system has been unable to extract the information from code field 1125).

In some embodiments, label 1100 comprises code field 1130 in which a barcode (e.g., a 420 code) is printed. A 420 code is generally the easiest for the system to read using barcode scanners, etc. The barcode in code field 1130 may encode the destination, but does not include the service class. Accordingly, the information extracted from code field 1130 yields incomplete routing data. If the system is unable to extract the routing data from code field 1125 and extracts the destination element of the routing data from code field 1130, the system may extract the remaining/missing routing data (e.g., the service class).

In some embodiments, label 1100 comprises text field 1135. Text field 1135 includes information printed in alphanumeric format. Text field 1135 may include an indication of a service class, a tracking number, etc. In some embodiments, in response to determining that the system is unable to extract the service class from a code on label 1100, the system may perform OCR with respect to label 1100 and use the text comprised in text field 1135 to determine the service class and/or the tracking number, etc. In some embodiments, the tracking number encodes the service class. For example, a predetermined set of digits corresponds to a code for a service class.

In some embodiments, label 1100 comprises code field 1140 in which a barcode such as an IZ code is printed. As an example, an IZ code encodes destination information but and service class information. The IZ code may comprise human readable code, and a subset of the digits in the IZ code identify the service class. Accordingly, the information extracted from code field 1140 yields complete routing data (or at least all required routing data). If the system is unable to extract the routing data from code field 1125 and extracts only part of the routing data from code field 1140, the system may extract the remaining/missing routing data (e.g., the service class) from another field.

In some embodiments, label 1100 comprises account field 1145 in which billing information is provided (e.g., a PO number, billing terms, etc.).

Referring to FIG. 11, the system may determine destination information by scanning a 420 code, such as the code printed in code field 1130. The destination information extracted from the 420 code may be combined with other elements of routing data, such as service class information obtained by OCR processing of an image to read text printed in text field 1135. The text included in text field 1135 may indicate a service class, such as "Ground" or "Next Day Air". Additionally or alternatively, text field 1135 may comprise text pertaining to a tracking number comprising a numerical or alphanumerical code or portion thereof that indicates a class of service.

According to various embodiments, the system intelligently parses label information captured in images of labels (e.g., images obtained by the vision system) to determine the required routing data to facilitate robotic sortation and routing of items. The system iterates over the different fields to obtain the various elements of routing data (e.g., until all required routing data is obtained). In response to determining the routing data, the system stores the routing data in association with the item.

A robot may encounter items that the robot that are unable to be safely inducted by grasping and placing into a moving tilt tray or conveyor segment. For example, the items may be large, bulky, and/or heavy items.

Techniques are disclosed to use a robot (e.g., a robotic arm) to perform induction of a heavy item or other object that the robot is unable to safely and/or efficiently grasp and/or move to a corresponding destination location.

In various embodiments, a heavy item may be detected based at least in part on one or more of (i) induction station conveyor torque, (ii) scale or other weight sensor, (iii) unsuccessful attempted grasps, (iv) computer vision detection of sizes or type of specific items of known weight, or (iv) computer vision detection of weight information or indication that the item is heavy from one or more labels or symbols on the item.

In various embodiments, upon detecting a heavy item (e.g., an item marked as heavy or having a weight that exceeds a weight threshold), a robotic singulation system as disclosed herein determines and executes a strategy to move the item to a specific destination location (e.g., a particular tilt tray or segment on a segmented conveyor) at least in part by pushing the item with a robotic arm, rather than grasping and lifting it. The robotic system may control a plurality of robotic arms to operate in coordination to move the item to the destination location, such as by partially lifting the item with a first robotic arm, and pushing or pulling the item with a second robotic arm.

In various embodiments, the determined strategy may include using a robotic arm in cooperation with one or more other robotically controlled instrumentalities, such as (i) a second robotic arm, (ii) a conveyor on which the item is located or onto which the item is to be pushed, (iii) a baffle or other tool in the workspace that may be actuated in response to robotic control. The robotic arm and/or other instrumentalities are operated in coordination to push the item to the destination location (e.g., onto the tilt tray or segment on the segmented conveyor) as the destination location moves pass the induction station.

In some embodiments, the segmented conveyor is under robotic control. For example, the system controls the segmented conveyor and the robotic arm/other instrumentalities in coordination to singulate a set of source items. The system may control the speed of the segmented conveyor in connection with singulating an item, such as to improve the cost of moving the item, to increase the likelihood that the item is successfully moved to the destination location, to make moving the item more efficient, etc. As an example, the segmented conveyor is controlled to reduce the speed (or stop the segmented conveyor at a position where the item may be pushed to the destination location) to allow time for a heavy item to be pushed into position. As another example, the segmented conveyor is controlled to increase the speed to enable the item to be pushed into the appropriate destination location, such as in the case that the robotic arm pushes the item faster than was expected according to the plan for moving/handling the item.

In some embodiments, the system uses computer vision to determine the trajectory and timing required to push the item (e.g., a heavy package) to the destination location (e.g., onto the destination tilt tray or segment on a segmented conveyor). The system uses the vision system to obtain image data. As an example, the system generates a model of the workspace based at least in part on the image obtained from the image data. The system may determine whether to adjust the trajectory of the moving the item to ensure successful placement to the destination location. For example, the system may use the computer vision (e.g., the image data obtained from the vision system or a model of the workspace generated based on the vision system) to adjust the trajectory (e.g., update the plan for handling the item) to ensure successful placement (or to increase the likelihood of successful placement).

In various embodiments, the system may control to handle heavy or non-inductable items (e.g., using control of a robotic arm or other instrumentality) by one or more of (i) rejecting heavy or non-inductable items on a tilt tray sorter using a robotic push, (ii) inducting heavy or non-inductable items onto a tilt tray sorter using a conveyor system (e.g., cooperatively pushing the item to the destination location using a plurality of robots operating in coordination, or a robotic cooperating with the source conveyor, etc.), (iii) rejecting heavy or non-inductable items by operating conveyor systems (e.g., source conveyors) to route such items to a reject chute or a chute that routes the items for alternate handling. As an example, in response to determining that the heavy or non-inductable items are to be rejected, the system actuates one or more of a funnel or chute that feeds the source conveyor, a pick table or conveyor (e.g., the source conveyor), a side wall of the chute, pick table, or source conveyor, etc. The system may actuate the funnel or chute to raise the funnel or chute relative to the pick table or source conveyor, such as to ensure sufficient clearance between the item or the pick table/source conveyor and the funnel or chute. The system may actuate the pick table or conveyor to lower the pick table or source conveyor to ensure sufficient clearance between the item or the pick table/source conveyor and the funnel or chute.

According to various embodiments, a chute, pick table, or source conveyor comprises one or more sensors or other structures to collect sensor data. For example, the one or more sensors or other structures may comprise an IR reflector plate. The one or more sensors or other structures may be disposed in an area subject to item flow. In some embodiments, the one or more sensors or other structures are configured to be deflected by an item that flows over or against the sensor or other structure. For example, the one or more sensors or other structures may be configured to be biased in a position in which sensor data pertaining to the workspace (e.g., the flow of items) may be obtained and when subject to a force by an item (e.g., an item flowing over the sensor or other structure) the sensor or other structure is deflected (e.g., configured to be recessed relative to a surface of the chute, pick table, source conveyor, etc.). Accordingly, the sensor or other structure is deflected to enable flow of the item without damage to the sensor or other structure.

In some embodiments, the system (e.g., a control computer) prepares the area around the heavy or non-inductable item in response to determining that the item is heavy or non-inductable. For example, in preparation for pushing such an item to the corresponding destination location, the system prepares the area to clear a path between such item and the destination location. Examples of strategies for preparing the area around the heavy or non-inductable item include (i) picking objects (e.g., other items) and placing the objects to out-feed conveyors, (ii) picking the objects and placing the objects further back in the pickup zone, (iii) picking the objects obstructing a path between such item and the destination location and placing the objects in a buffer zone (e.g., a side table), and (iv) controlling to pick/move the object to the robot area for the other robot to induct. The system may implement a strategy for preparing the area around the heavy or non-inductable item based at least in part on one or more of the context of the workspace (e.g., a model of the workspace, including locations of the item and other objects), an expected likelihood of success, a cost for implementing the strategy (e.g., relative to the cost for implementing alternative strategies, etc.).

FIGS. 12A-12D are diagrams illustrating a singulation system according to various embodiments. In some embodiments, system 1200 comprises, or is similar to, the singulation systems described herein.

In the example shown, system 1200 comprises a chute 1215, a source conveyor 1220, and robotic arm 1225. System 1200 further comprises one or more sensors, such as vision system 1235 (e.g., one or more cameras, weight sensors, etc.). Chute 1215 may be a chute or other funnel that feeds items to source conveyor 1220, from which robotic arm 1225 picks items and moves the items to a corresponding destination location. As an item moves throughout the workspace (e.g., through chute 1215 or across source conveyor 1220), system 1200 may detect whether the item is heavy or otherwise non-inductable. For example, system 1200 determines that item 1275 is heavy or otherwise non-inductable, such as in the case that system 1200 determines that the weight of item 1275 exceeds the weight that robotic arm 1225 is able to safely, securely, and/or efficiently move item 1275 to the corresponding destination location (e.g., a segment in a segmented conveyor). In response to determining that item 1275 is a heavy or otherwise non-inductable item, system 1200 determines a plan for moving item 1275 to the corresponding destination location.

In some embodiments the plan for moving item 1275 includes pushing or pulling item 1275 from source conveyor 1220 to the corresponding destination location. However, the system may determine that one or more objects (e.g., other items) obstruct the path along which item 1275 is to be moved (e.g., pushed/pulled). In the example shown, item 1280 is disposed on source conveyor 1220 ahead of item 1275. Accordingly, if system 1200 determines to move item 1275 to a corresponding destination location, system 1200 determines a manner for handling item 1280 in advance. Examples of manners by which item 1280 may be handled include moving item 1280 to a buffer zone (e.g., buffer area 1230), picking and placing item 1280 further back on source conveyor 1220, picking and placing item 1280 to chute 1215, picking and placing item 1280 to another source conveyor in the workspace of another robot, determining a destination location on the segmented conveyor (e.g., a tilt tray or segment) for item 1280 and moving item 1280 to such destination location before moving item 1275.

In some embodiments, buffer area 1230 may be a task table on the robot, a shelf, a side table, a designated area on the floor, etc.

FIGS. 12A-12D illustrate an example of system 1200 moving item 1280 to a buffer zone (e.g., buffer area 1230) before moving (e.g., pushing) item 1275 to a corresponding destination location. At FIG. 12A, system 1200 determines that item 1275 is heavy or otherwise non-inductable. The system may also determine that item 1275 is to be moved to the segmented conveyor before item 1280. At FIG. 12B, system 1200 controls robotic arm 1225 to engage (e.g., pick up) item 1280. System 1200 controls robotic arm 1225 to move item 1280 to buffer area 1230. Buffer area 1230 may be a side table or area within the workspace where system 1200 may store/buffer items to allow robotic arm 1225 to singulate other items in the workspace in advance of the items in the buffer area. At FIG. 12C, item 1280 is placed in buffer area 1230 and system 1200 controls robotic arm 1225 to engage item 1275. For example, system 1200 controls robotic arm 1225 to apply a force on item 1275 to push or pull item 1275 to the destination location (e.g., the tilt tray or segment on the segmented conveyor). In connection with controlling robotic arm 1225 to engage item 1275, system 1200 may control source conveyor 1220 to move item 1275 to a location at which robotic arm 1225 is to engage item 1275. For example, system 1200 controls source conveyor 1220 and robotic arm 1225 (e.g., in coordination) to move item 1275. At FIG. 12D, system 1200 controls robotic arm

1225 to push item 1275 along source conveyor 1220 towards the corresponding destination location.

In some embodiments, system 1200 monitors the workspace during implementation of the plan. For example, system 1200 obtains sensor data, such as data from vision system 1235, and monitors the progress of moving items from source locations (e.g., an infeed conveyor, a chute or funnel, or a pick table or source conveyor) through to the applicable destination location. System 1200 may determine whether to update the plan for handling/moving the item based at least in part on the monitoring. For example, in the event that system 1200 determines that robotic arm 1225 is moving item 1275 slower than expected (e.g., because item 1275 is heavier than expected), system 1200 may update the plan for moving item 1275, such as to use control of another robot or source conveyor 1220 in coordination, or to control the segmented conveyor to slow down to coordinate timing of arrival of the destination location with the moving of the item to the destination location (e.g., a tray or segment on the segmented conveyor).

In some embodiments, system 1200 comprises two or more robots (e.g., robotic arms). Each of the robots may have a suction based robotic end effector. The robots may be operated in coordination, in a fully autonomous mode, each to pick items from an adjacent "pick table" or "source conveyor" or other pick area, and place the items singly at a destination location(s), such as a tilt tray or segment of a segmented conveyor. In various embodiments, the two are more robots are used, singly or in cooperation, to push an item deemed to be heavy or non-inductable onto the segmented conveyor in a specific destination location (e.g., a particular segment or tilt tray, etc.).

In various embodiments, system 1200 (e.g., a control computer) performs one or more of:

- Track the position of a particular tray or other segment of the segmented conveyor corresponding to a destination location for a particular item. The system may perform real-time tracking of the destination tray or segment and determine (e.g., in real-time) a timing of a push motion to induct the item to the destination tray or segment. The system determines an optimal distance (e.g., between the destination tray or segment of the source conveyor or the robot) at which the system is to control the robotic arm to begin a pushing motion to push the item along a particular push path and an item attribute (e.g., an item size). For example, the system models the pushing of the item and determines when to begin pushing the item based on the item attribute (e.g., size, weight, etc.) and a location of the particular destination tray or segment of the source conveyor.
- Use real-time object tracking with computer vision system for adjusting a pushing motion of an item onto a destination location (e.g., a particular tray or other segment of the segmented conveyor).
- User real-time object tracking to verify that the item was correctly pushed to the destination location (e.g., onto the applicable tilt tray or segment of the segmented conveyor, etc.).
- Determine that the item successfully landed (e.g., was delivered) to the destination location based at least in part on a force sensor on the robot (e.g., a sensor on the gripper of the robot).
- Determine a trajectory of a path in a push motion towards the destination location (e.g., the specific tilt tray or segment). The system may determine the trajectory based on the size or other attribute of the item.
- Control the robot, source conveyor, and/or segmented conveyor to ensure that the item ends up in the correct (e.g., intended) tray or segment, such as at the end of the push/pull motion.
- Control the robot(s) to ensure contact between the item and the robot (e.g., the end effector on the robot) is maintained throughout the motion from the source conveyor to the destination location. The system may use force feedback or other sensor data to detect/monitor engagement between the item and the robot. The system may use force, joint encoders, joint torque sensors, or other sensor feedback to ensure contact is maintained between the parcel and the end-effector.
- Control the robot(s) or other instrumentality to reorient or reposition the item before or during the induction motion. For example, the system controls to cause the item to be reoriented or repositioned to that the item is in an orientation such that a label or other marking on the item can be read by vision system or other sensor. As another example, the system controls to cause the item to be reoriented or repositioned to ensure a safe push path.
- Control one or more robots to clear a pick area (e.g., a pick table or source conveyor) of items that may be in the way of the item that the robot(s) is to move (e.g., push) to the destination location or in the way of a robot's gripper (e.g., end effector) when attempting to engage the desired item. In response to determining that the item to be moved is heavy or otherwise non-inductable (e.g., non-inductable by picking and placing the item to the destination location), the system checks for potential collisions in the push path (e.g., based at least in part on a model of the workspace) and positions the robotic arm (e.g., the gripper) behind the item to be moved.
- Control a robot(s) to push a plurality of items with one motion. For example, the robot simultaneously pushes a plurality of items across the source conveyor or other pick table. The robotic arm may push on an item which will engage and push on another item during the induction motion.
- Control a robot to perform dual induction with respect to multiple items. For example, the system controls a robot to push one item and to use a suction gripper on another item.
- Plan a collision-free robot (e.g., robot end effector) path based at least in part on an item location and a destination location (e.g., an induction tilt tray). The system may further determine the path based at least in part on a model of the workspace.
- Schedule picks to remove objects and clear a path for moving the item to the destination location.
- Use (e.g., control) peripherals (e.g., a source conveyor, a baffle, or other instrumentality) to accelerate the item during push motion.
- Modulate velocity at which the robot pushes the item based on a timing of pushing the item onto the segmented conveyor (e.g., the timing of arrival of a particular tray or segment).
- Modulate the velocity at which the segmented conveyor is driven based on the timing of based on a timing of pushing the item onto the segmented conveyor (e.g., the timing of arrival of a particular tray or segment). For example, the system uses real-time monitoring of the workspace (e.g., location of a particular tray or segment, speed at which source conveyor is being driven, speed at which item is being pushed, distance along which item is to be pushed, etc.).

In various embodiments, system 1200 (e.g., a control computer) autonomously performs one or more of:

Detect a push opportunity. The system determines when to push an item versus when to grasp an item. For example, the system detects a heavy item and determines to push the item.

Prepare an item for push induction. For example, the system detects obstacles between the item to be inducted and the destination location, such as an object obstructing the path along which the item is to be pushed. As another example, the system determines a plan to avoid an obstacle, such as by moving the obstacle before pushing the item or by determining a path along which to push the item where obstacle will not obstruct the path.

Track the location/position of a destination location (e.g., destination tray or segment of the segmented conveyor).

Compute optimal velocity for pushing motion and/or driving the segmented conveyor.

Adjust the push motion based at least in part on real-time object tracking or robotic kinematics. The real-time object tracking may be performed based on a computer vision system (e.g., using image data obtained by the vision system). For example, the system tracks the item extents or corners in real-time to verify that the push/movement of the item progresses along intended trajectory and/or according to intended speed.

Perform real-time object tracking in connection with verifying that the pushed item successfully lands (e.g., is moved to) the destination location (e.g., a destination/target tray or segment). For example, the system tracks the 3D position and orientation of the item in real-time. The position and orientation of the item may be tracked using RGB data and depth images in real-time to verify successful placement or movement.

Obtain force sensor information from a sensor on the end effector (e.g., a sensor on the gripper) to verify that the item is successfully or securely grasped and/or to verify that the item successfully lands (e.g., is moved to) the destination location (e.g., a destination/target tray or segment). For example, by the end of the push motion, the robot gripper presses the item against the side walls of the target tile tray and uses force/torque data (e.g., signals obtained by corresponding sensors) to verify that the item is within the destination tray or segment.

In various embodiments, a system as disclosed herein may determine to use a push strategy or technique for handling a heavy item or an item otherwise deemed to be non-inductable based on one or more of the following:

The system (e.g., the robot) selects the item to pick or push to the destination location. The item may be selected based on image data obtained by a vision system or a model of the workspace that is generated based on sensor data obtained by one or more sensors (e.g., the vision system, a weight sensor, a force sensor, etc.).

The system uses previous interactions with the item (e.g., by a robotic arm or other instrumentality controlled by the system) to determine the item is too heavy to grasp. For example, the system may determine that a weight of the item (e.g., measured by a weight sensor) exceeds a predefined weight threshold. As another example, the system may determine that the item is too heavy based on a force contact or suction applied by a robotic arm (e.g., an end effector) in the previous interactions.

Information obtained by one or more force sensors mounted on a robotic arm that estimates the item weight while grasping the item.

Information obtained by one or more weight sensors comprised in the source conveyor or table, chute or funnel that feeds items to the source conveyor, or an infeed conveyor that feeds items to the chute or funnel.

Signals obtained from other system components such as a vision system or conveyors can be sued to alert the system that a particular item is heavy or otherwise requires special handling.

In some embodiments, system 1200 shuffles items in the push path of an item intended to be pushed. For example, system 1200 is configured to detect the presence of an object (e.g., another item) in the way of the push path along which the item is to be pushed. In response to detecting the presence of the object, system 1200 selects the object to be picked and moved to a location to clear a path for pushing. For example, system 1200 causes the object to be moved to a buffer area. In the case of a second item blocking access for robotic arm 1225 to engage a first item from the rear, system 1200 may select to induct the second item before pushing the first item to the corresponding destination location. For example, system 1200 picks the second item from behind the first item (e.g., a heavy or large item) and places the second item into a corresponding tray or segment of the segmented conveyor. In some embodiments, system 1200 comprises a plurality of robots (e.g., a plurality of robotic arms) and system 1200 controls multiple robots to move objects (e.g., items) out of the way for items that are out of reach of the robot handling the heavy item. For example, system 1200 controls a partner robot in coordination with a robot being controlled to induct a heavy item. The partner robot may be controlled to induct an item blocking the intended path of the heavy item or to move the item so the item is no longer obstructing the intended path.

An item orientation may impact the motion of the item being pushed. For example, an item may be caused to rotate when pushed in a certain orientation. In some embodiments, system 1200 controls robotic arm 1225 or another instrumentality (e.g., a partner robot, a baffle, etc.) to reorient the item. For example, system 1200 reorients the item by pushing the item at a point off-center in an arc shaped path. System 1200 may rotate the item to an orientation conducive to induction. In some embodiments, system 1200 uses a model of the workspace to determine a location at which to push the item and/or a direction in which to apply a force on the item. For example, system 1200 determines a difference between a desired item orientation and a current item orientation. The difference between the desired item orientation and the current item orientation may be computed based on the model of the workspace (e.g., image data obtained by vision system 1235 being segmented, etc.). The potential paths for pushing or reorienting the item may be evaluated based at least in part on an effective torque that results on the item and/or potential collision risks. System 1200 may further or alternatively evaluate the potential paths based on a predefined cost function (e.g., a measurement of time, energy, etc.). System 1200 monitors the workspace to detect whether/when the item is reoriented to a desired orientation, and in response to determining that the item is in the desired orientation, system 1200 controls robotic arm 1225 to push the item, such as from the center (or center of gravity) along the planned path.

In some embodiments, system 1200 determines a plan for handling an item, such as a plan for pushing an item deemed to be heavy or otherwise non-inductable (e.g., non-inductable based on a pick and place operation). The plan for handling (e.g., pushing) the item may be determined based at least in part on a model of the workspace. The path is determined to move the item from a contact point (e.g., a current item location) through to the destination location (e.g., a destination tray or segment). The contact point may be determined by system 1200, such as based on the model of the workspace and/or model for pushing items. For example, the contact point is a center (or center of gravity) of the item.

In some embodiments, the plan for pushing the item is determined based on a current location of the item and the destination location. In the case of the destination location being dynamic, such as a tray or segment of a segmented conveyor, the plan for pushing the item is further determined based at least in part on a speed at which the destination location is moving, and/or a direction in which the destination location is moving. The system may further determine the plan for pushing the item based at least in part on one or more item attributes, such as size, weight, material, shape, etc. System 1200 can use the distance to the selected tray (e.g., the destination location) and the expected time to complete the push path in connection with determining a timing for starting the push motion. In systems comprising multiple robots that are controlled in cooperation to move a particular item to a destination location, the plan for each robot handling the item may be similarly determined based on a context of the workspace (e.g., a model of the workspace, location of the item, location of the destination location, time for arrival, etc.).

In some embodiments, system 1200 determines a timing for pushing the item, such as based at least in part on the selected push path and a location of the destination location (e.g., an estimated time of arrival to the induction point). For example, system 1200 selects an optimal velocity for pushing the item based on a determination that the item, when pushed at such velocity, intersects with the destination location (e.g., the induction point) when the destination location is expected to arrive. The velocity may be determined based on modelling the push of the item (e.g., based on item attributes, path attributes, timing/location of the destination tray/segment, etc.). The velocity is determined to ensure that the item is slotted into the correct tray/segment. The velocity may be selected and/or updated based on an item attribute (e.g., an item size, etc.), a path length, etc.

In some embodiments, system 1200 uses feedback sensor data that is indicative of whether robotic arm 1225 (e.g., the end effector of robotic arm 1225) is engaged with the item. If contact between robotic arm 1225 and the item is lost, the push of the item may become uncontrollable or unsuccessful. The sensor data may be obtained by a force sensor in robotic arm 1225, a sensor on source conveyor 1220, and/or vision system 1235. As an example, the feedback sensor data is used to adjust the motion of robotic arm 1225 (e.g., to update the plan for controlling the robot to handle the item). As another example, the feedback sensor data is used to detect push failures. The use of feedback sensor data increases the likelihood of successful induction of an item (e.g., a heavy or non-inductable item).

In some embodiments, system 1200 comprises multiple robots. The multiple robots may be disposed on opposing sides of a pick table/source conveyor, or at opposing sides of adjacent pick tables/source conveyors. System 1200 may control the multiple robots in coordination to perform a task, such as to induct an item, or to route the item for rejection (e.g., to move the item to an alternate location for special handling). For example, in the case of an item being out of reach of a first robot tasked with handling the item, system 1200 controls another robot to move the item within range of the first robot for handling. As another example, in the case of an item being out of reach of a first robot tasked with handling the item, system 1200 controls the other robot to perform the task (e.g., to perform the handling of the item).

In some embodiments, system 1200 handles multiple items concurrently. For example, system 1200 uses a gripper (e.g., a suction-based end effector) to pick a first item (e.g., an item that can be inducted by pick and place operations) and pushes a second item with the robotic arm or end effector. The first item and second item may be moved by the robotic arm to corresponding destination locations. For example, the robotic arm first pushes the second item to its corresponding destination location (e.g., destination tray/segment) and then places the first item to its corresponding destination location (e.g., the following tray/segment).

During operation of induction/singulation systems, robots may encounter items that are too heavy to grasp and security induct (e.g., induct via a pick and place operation). As an example, an item may be too heavy or large to safely induct by picking and placing to a destination location. Early detection of these heavy or otherwise non-inductable items can improve the system's ability to autonomously handle the item (e.g., without human intervention). For example, the system is configured to restrict the flow of incoming item to enable the system to handle the heavy or non-inductable item. If heavy or non-inductable items are not timely detected, then by the time the system has determined that the robotic arm is unable to safely/securely pick and place the item at a destination location, the workspace (e.g., the pick table or source conveyor, etc.) may be too cluttered with other items for the system to effectively autonomously handle the heavy or non-inductable item. Throughput of induction/singulation systems is very important in certain contexts. Thus, in some embodiments, the methods/systems for detecting heavy or non-inductable items is embedded with an existing item flow without slowing the system down. For example, restricting or slowing item flow to assess item weight individually is infeasible.

During operation of induction systems, multiple items may be staged on a conveyor and moved forward as a robotic arm picks and places the items into the induction system. In some embodiments, the system is configured to differentiate between a set of smaller items (e.g., lightweight items, items that are inductable, etc.) and a single heavy or non-inductable package.

In some embodiments, the system monitors the workspace in connection with detection of heavy or non-inductable items (e.g., items for which a robotic arm cannot safely/securely pick and place for induction, or items that otherwise require special handling). For example, the system monitors a pick table or source conveyor for heavy or non-inductable items. The system may also monitor items flowing through the chute or funnel to the pick table/source conveyor or flowing from an infeed conveyor to the chute or funnel to detect heavy or non-inductable items. The monitoring of the workspace (e.g., detection of heavy or non-inductable items) includes obtaining information (e.g., sensor data) from a plurality of sensor data, including vision data, weight data, force data, etc.

In some embodiments, the system obtains data (e.g., signals, such as conveyor data) from a conveyor (e.g., a source conveyor from which items are inducted or an infeed conveyor that feeds items to a chute) and uses such data to autonomously detect heavy packages. For example, the system may convert the conveyor data to weight data (e.g., for items being transported by the conveyor). The signals obtained from the conveyor data may be indicative of current utilization by a motor(s) driving the conveyor. The system can store a current utilization threshold that, if exceeded, is indicative of the conveyor having one or more items exceeding a weight threshold (e.g., the weight threshold used to distinguish between heavy and non-heavy items). Thus, the system can monitor the current utilization during operation of the induction system and detect when the current utilization exceeds the current utilization threshold. In response to determining that the current utilization exceeds the current utilization threshold, the system deem the item(s) on the conveyor to be heavy items. However, the current utilization may only be indicative of a total weight on the conveyor exceeding the weight threshold. Accordingly, use solely of the current utilization as a detection mechanism for heavy items may lead to false positives (e.g., items falsely characterized as heavy items). As an example, a set of smaller (lightweight) items may in the aggregate have a weight that exceeds the weight threshold. Monitoring the current utilization to detect when the current utilization exceeds the current utilization threshold may determine that the workspace comprises a heavy item on the conveyor when the set of smaller items are on the conveyor together. The system may thus inaccurately classify the set of smaller items as being a heavy item.

In some embodiments, the system improves the accuracy of detecting heavy items by combining the monitoring of current utilization from a conveyor motor with the monitoring of other sensor data, such as image data obtained by a vision system. For example, in response to detecting that the current utilization exceeds a current utilization threshold (e.g., determining that an item on the conveyor is a heavy item), the system verifies that the conveyor comprises a heavy item (e.g., as opposed to several smaller items). For example, the system performs image segmentation with respect to image data obtained by the vision system to determine whether a single item is on the conveyor (e.g., in which case the item is deemed to be a heavy item) or whether several smaller items are on the conveyor. As another example, the system performs image segmentation with respect to the image data to determine dimensions of one or more items on the conveyor. The system may determine whether a heavy item is present based on the size, dimensions, or labelling of an item on the conveyor. In some embodiments, the system is trained (e.g., using a machine learning model) to predict whether an item is a heavy item based on the size or dimensions of an item.

In response to detecting a heavy item (e.g., determining that the current utilization exceeds the current utilization threshold and/or verifying the classification based on other data such as image data), the system performs an active measure. Examples of an active measure performed upon detection of a heavy item include (i) determining a plan for handling the item, (ii) stopping or slowing the flow of items feeding items to the pick table or source conveyor, (iii) actuating a gating mechanism to restrict the flow of items from an infeed conveyor, (iv) determining to push the item using a robotic arm, (v) determine to use a plurality of robots (e.g., cooperatively or in coordination) to move the item, (vi) determine to move the item to an alternate location for special handling, etc.

In response to detecting a heavy item, the system autonomously stops/slows the flow of new items to the station (e.g., to the pick table or source conveyor from which pick and place operations are performed), begins subroutines to autonomously remove the heavy item from the pick table or source conveyor, determine when the heavy item has been successfully handled, and in response to determining that the heavy item has been successfully handled, cause the flow of items to be re-enabled (e.g., normalize the flow of items, such as by removing the stop or slowing mechanism). As an example, in response to detecting a heavy item on the pick table or source conveyor, the system provides a signal to an infeed conveyor(s) to stop infeeding packages onto the pick table/source conveyor (e.g., via a chute or funnel).

In various embodiments, information from conveyor signals (e.g., torque, utilization, etc.) is combined with other information pertaining to the workspace, such as image data from a computer vision system, to detect a heavy item or to estimate the weight of an item. For example, the system determines the presence of a heavy item by combining information pertaining to a number or types of items at the pick table/source conveyor. The information pertaining to a number or types of items at the pick table/source conveyor may be obtained from image data captured by a vision system, such as by performing image segmentation to detect boundaries of items and/or other information pertaining to the items in the image (e.g., item attributes such as label information, shape, dimensions etc.). The system uses the combination of the information from conveyor signals with such other information pertaining to the workspace to distinguish between contexts of a single heavy item being present at the pick table/source conveyor and multiple items being present at the pick table/source conveyor (e.g., several items densely disposed on the source conveyor).

In some embodiments, the system tracks the information from the conveyor signals (e.g., the current utilization) with successive conveyor motions or picks by a robot. For example, the system performs tracking of objects (e.g., using image data) and tracking current utilization through successive conveyor motions (e.g., in real-time during operation of the conveyor) in connection with estimating weights of the items. As the robot performs a pick operation with respect to an item on the conveyor, the system may use the tracked information from the conveyor signals and tracking of objects using image data to determine (e.g., estimate) a weight of the item picked or a weight(s) of one or more other items remaining on the source conveyor. The system may also use a force sensor in the robotic arm to accurately detect a weight of the picked item, which can be used to update the weight of item(s) remaining on the pick table/source conveyor. The system monitors the current utilization of the motor(s) driving the source conveyor over successive pick operations performed by a robot with respect to items on the source conveyor to monitor the weight (or change in weight) of item(s) disposed on the source conveyor.

Figure 13A:
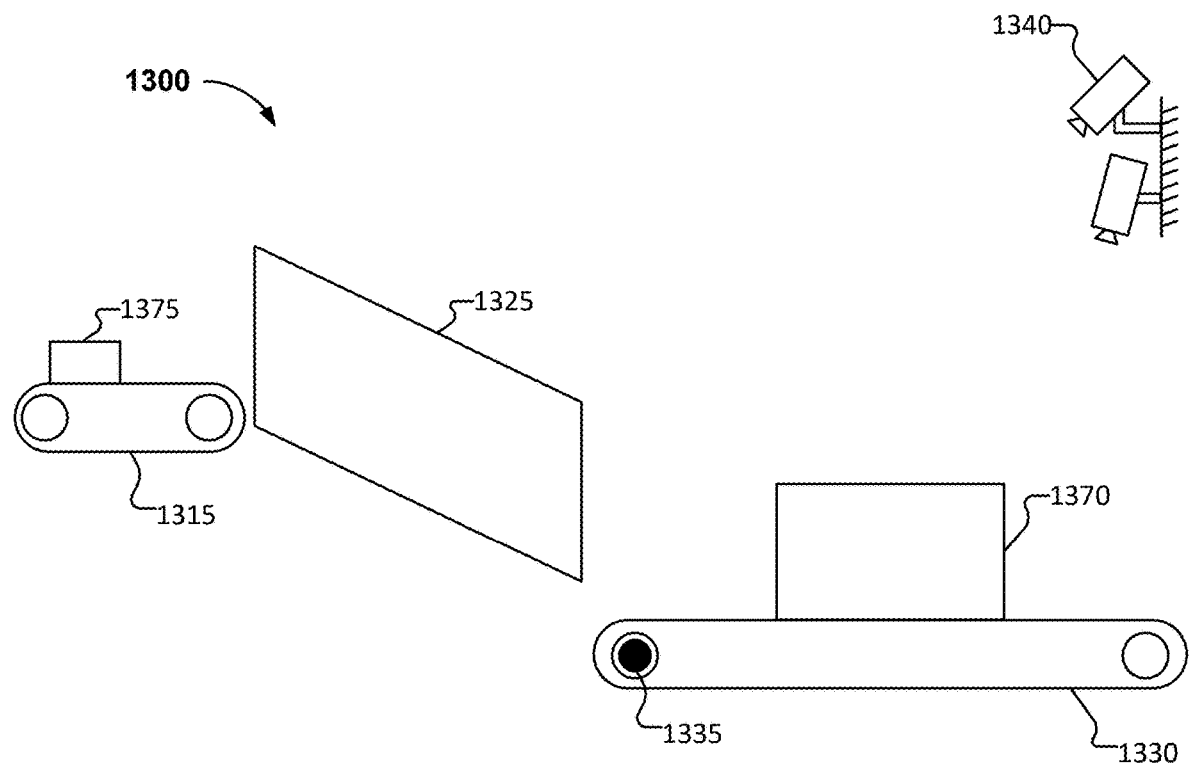
FIG. 13A is a diagram illustrating a singulation system according to various embodiments.
Figure 13B:
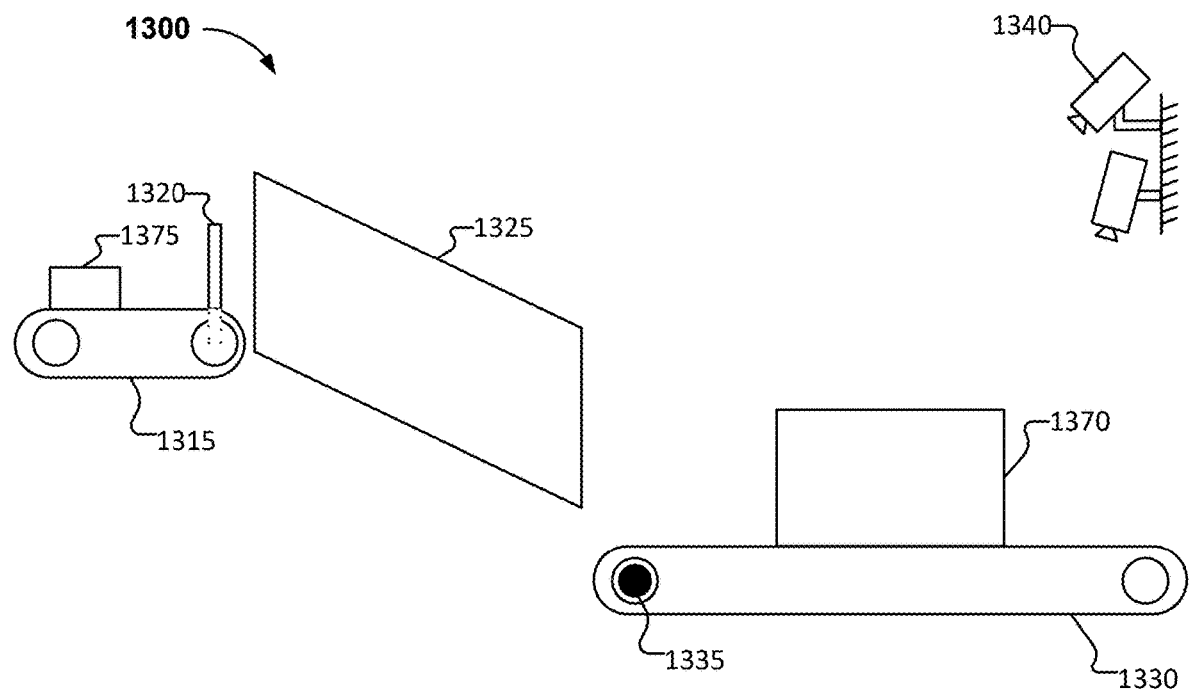
FIG. 13B is a diagram illustrating a singulation system according to various embodiments.

FIGS. 13A-13B are diagrams illustrating a singulation system according to various embodiments. In some embodiments, system 1300 comprises, or is similar to, the singulation systems described herein.

In the example shown, system 1300 comprises infeed conveyor 1315, chute 1325, source conveyor 1330. System 1300 may further comprise a robotic arm (not shown). System 1300 further comprises one or more sensors, such as current utilization sensor 1335 (e.g., that measures a current utilization of a motor driving source conveyor 1330, or vision system 1340 (e.g., one or more cameras, etc.). Chute 1325 may be a chute or other funnel that feeds items from infeed conveyor 1315 to source conveyor 1330, from which a robotic arm picks and/or moves the items to a corresponding destination location. As an item moves throughout the workspace (e.g., through infeed conveyor 1315, chute 1325, or across source conveyor 1330), system 1300 may detect whether the item is heavy or otherwise non-inductable. For example, system 1300 determines that item 1370 is heavy or otherwise non-inductable, such as in the case that system 1300 determines that the weight of item 1370 exceeds the weight that a robotic arm is able to safely, securely, and/or efficiently move item 1370 to the corresponding destination location (e.g., a segment in a segmented conveyor). In response to determining that item 1370 is a heavy or otherwise non-inductable item, system 1300 performs an active measure, such as determining a plan for moving item 1370 to the corresponding destination location.

In some embodiments, system 1300 determines that item 1370 is a heavy item based on information obtained from current utilization sensor 1335. For example, system 1300 detects that item 1370 is a heavy item in response to determining that a current utilization exceeds a current utilization threshold. System 1300 may combine detection of heavy items using information obtained from current utilization sensor 1335 with detection mechanisms using information obtained from other sensors. For example, system 1300 uses image data captured by vision system 1340 in connection with verifying determination (e.g., the determination made based on current utilization) that item 1370 is a heavy item.

In some embodiments, upon detecting that item 1370 is a heavy item (or otherwise non-inductable), system 1300 determines a plan for handling item 1370. The plan for handling item 1370 may include stopping or slowing (e.g., restricting) the flow of items from chute 1325 to source conveyor 1330. The plan for handling item 1370 may include one or more of (i) a plan to push item 1370 along a path to a destination location on the segmented conveyor, (ii) a plan to move item 1370 using multiple robots operating in coordination (e.g., multiple robots pushing the item, a subset of robots pushing the item and a subset of robots grasping the item, etc.), (iii) a plan to restrict (e.g., stop, slow, etc.) items from flowing to source conveyor 1330 while item 1370 is handled, (iv) a plan to move item 1370 to an alternate location (e.g., to a rejected item routing), (v) a plan to drive source conveyor 1330 to provide momentum to item 1370 in connection with assisting the robot in pushing/moving item 1370.

In some embodiments, in connection with restricting (e.g., stop, slow, etc.) items from flowing to source conveyor 1330 while item 1370 is handled, system 1300 controls infeed conveyor 1315 to stop feeding items to chute 1325. For example, system 1300 controls to stop or slow a driving of infeed conveyor 1315. As another example, system 1300 controls to actuate a gating mechanism 1320 to prevent items from entering chute 1325 from infeed conveyor 1315. As another example, system 1300 controls a gating mechanism that gates the flow of items from chute 1325 to source conveyor 1330 (e.g., a gating mechanism comprised in chute 1325).

In the example illustrated in FIGS. 13A and 13B, in response to system 1300 detecting that item 1370 is a heavy item or otherwise non-inductable, system 1300 controls gating mechanism 1320 to restrict item flow from infeed conveyor 1315 to chute 1325. For example, system 1300 actuates gating mechanism 1320 to stop or slow the infeed of item 1375 to chute 1325. An extent to which gating mechanism 1320 restricts the flow of items to chute 1325 may be modulated based on an extent to which gating mechanism 1320 is deployed (e.g., is extended from a recessed position). As the gating mechanism 1320 is actuated and/or controlled to restrict the flow of item 1375 to chute 1325 (and thus source conveyor 1330), system 1300 implements a plan for handling item 1370, such as controlling a robotic arm to push item 1370.

Figure 14A:
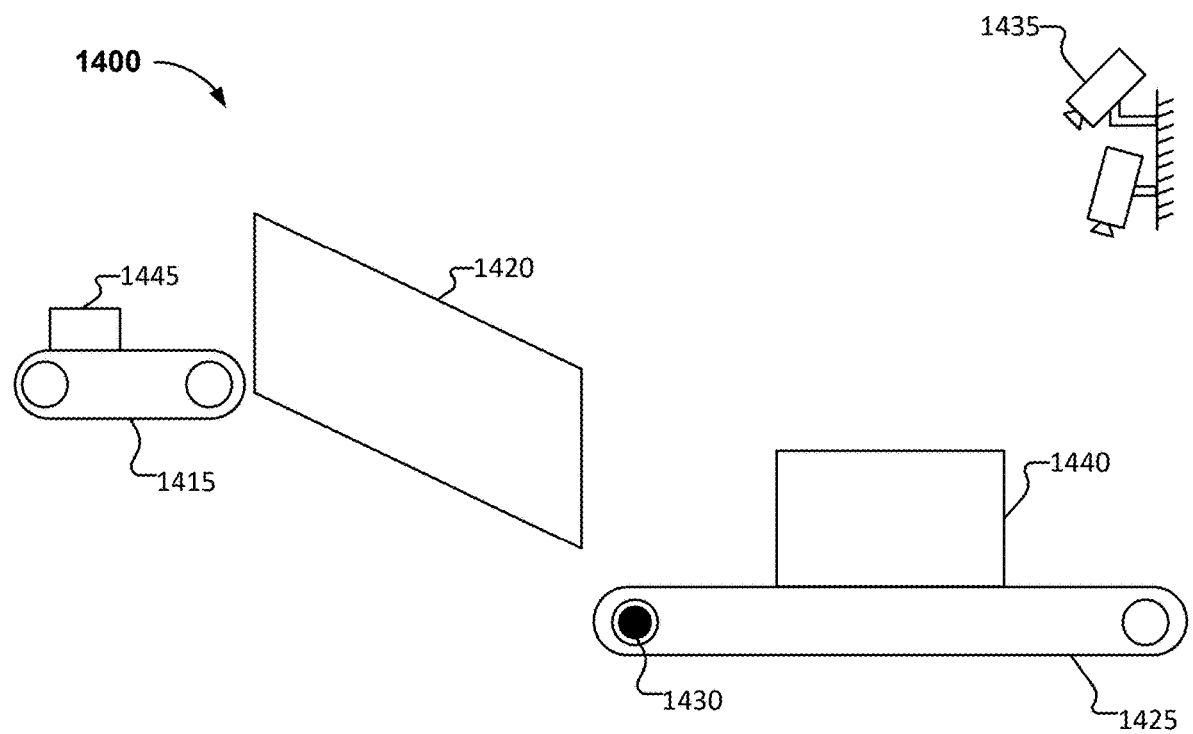
FIG. 14A is a diagram illustrating a singulation system according to various embodiments.
Figure 14B:
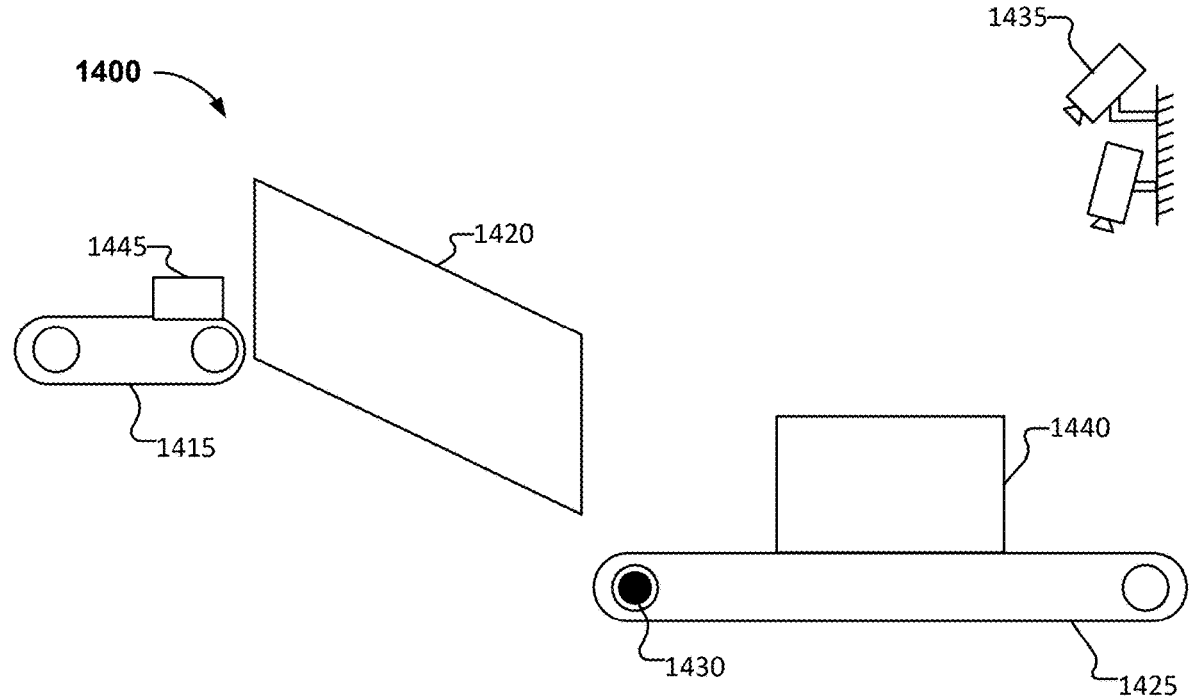
FIG. 14B is a diagram illustrating a singulation system according to various embodiments.

FIGS. 14A-14B are diagrams illustrating a singulation system according to various embodiments. In some embodiments, system 1400 comprises, or is similar to, the singulation systems described herein.

In the example shown, system 1400 comprises infeed conveyor 1315, chute 1420, source conveyor 1425. System 1400 may further comprise a robotic arm (not shown). System 1400 further comprises one or more sensors, such as current utilization sensor 1430 (e.g., that measures a current utilization of a motor driving source conveyor 1425, or vision system 1435 (e.g., one or more cameras, etc.). Chute 1420 may be a chute or other funnel that feeds items from infeed conveyor 1415 to source conveyor 1425, from which a robotic arm picks and/or moves the items to a corresponding destination location. As an item moves throughout the workspace (e.g., through infeed conveyor 1415, chute 1420, or across source conveyor 1425), system 1400 may detect whether the item is heavy or otherwise non-inductable. For example, system 1400 determines that item 1440 is heavy or otherwise non-inductable, such as in the case that system 1400 determines that the weight of item 1440 exceeds the weight that a robotic arm is able to safely, securely, and/or efficiently move item 1440 to the corresponding destination location (e.g., a segment in a segmented conveyor). In response to determining that item 1440 is a heavy or otherwise non-inductable item, system 1400 performs an active measure, such as determining a plan for moving item 1440 to the corresponding destination location.

In some embodiments, system 1400 determines that item 1440 is a heavy item based on information obtained from current utilization sensor 1430. For example, system 1400 detects that item 1440 is a heavy item in response to determining that a current utilization exceeds a current utilization threshold. System 1400 may combine detection of heavy items using information obtained from current utilization sensor 1430 with detection mechanisms using information obtained from other sensors. For example, system 1400 uses image data captured by vision system 1435 in connection with verifying determination (e.g., the determination made based on current utilization) that item 1440 is a heavy item.

In some embodiments, upon detecting that item 1440 is a heavy item (or otherwise non-inductable), system 1400 determines a plan for handling item 1440. The plan for handling item 1440 may include stopping or slowing (e.g., restricting) the flow of items from chute 1420 to source conveyor 1425. The plan for handling item 1440 may include one or more of (i) a plan to push item 1440 along a path to a destination location on the segmented conveyor, (ii) a plan to move item 1440 using multiple robots operating in coordination (e.g., multiple robots pushing the item, a subset of robots pushing the item and a subset of robots grasping the item, etc.), (iii) a plan to restrict (e.g., stop, slow, etc.) items from flowing to source conveyor 1425 while item 1440 is handled, (iv) a plan to move item 1440 to an alternate location (e.g., to a rejected item routing), (v) a plan to drive source conveyor 1425 to provide momentum to item 1440 in connection with assisting the robot in pushing/moving item 1440.

In some embodiments, in connection with restricting (e.g., stop, slow, etc.) items from flowing to source conveyor 1425 while item 1440 is handled, system 1400 controls infeed conveyor 1415 to stop feeding items to chute 1420. For example, system 1400 controls to stop or slow a driving of infeed conveyor 1415. In the example illustrated in FIGS. 14A and 14B, in response to system 1400 detecting that item 1440 is a heavy item or otherwise non-inductable, system 1400 controls infeed conveyor 1415 to restrict item flow from infeed conveyor 1415 to chute 1420. For example, system 1400 controls infeed conveyor 1415 to stop or slow the infeed of item 1475 to chute 1420. In the example shown in FIG. 14B, system 1400 can stop driving infeed conveyor 1415 when item 1445 reaches the end of infeed conveyor 1415 to prevent item 1445 from being fed to chute 1420. As the infeed conveyor 1415 is controlled to restrict the flow of item 1445 to chute 1420 (and thus source conveyor 1425), system 1400 implements a plan for handling item 1440, such as controlling a robotic arm to push item 1440 or moving item 1440 to an alternate location corresponding to a routing for rejected items (e.g., a routing for special handling of such items).

In some embodiments, conveyor systems report current utilization at the motor(s) driving the conveyor. For example, the current utilization is used as a proxy for torque of the motor(s). As a conveyor encounters resistance in moving the conveyor (e.g., driving the conveyor belt), the current utilization at the motor(s) increases. For example, as more weight is added to the conveyor, the current utilization at the motor(s) for driving the conveyor to move the weight (e.g., the one or more items) increases. Thus, more weight on the conveyor belt results in an increase in current utilization.

In some embodiments, current utilization scales with resistance the motors encounter when moving a conveyor (e.g., a conveyor belt). If the sensors measuring current utilization are properly calibrated, the system can use the current utilization to provide an estimate of the item weight (or aggregate weight of items on the conveyor).

Figure 15:
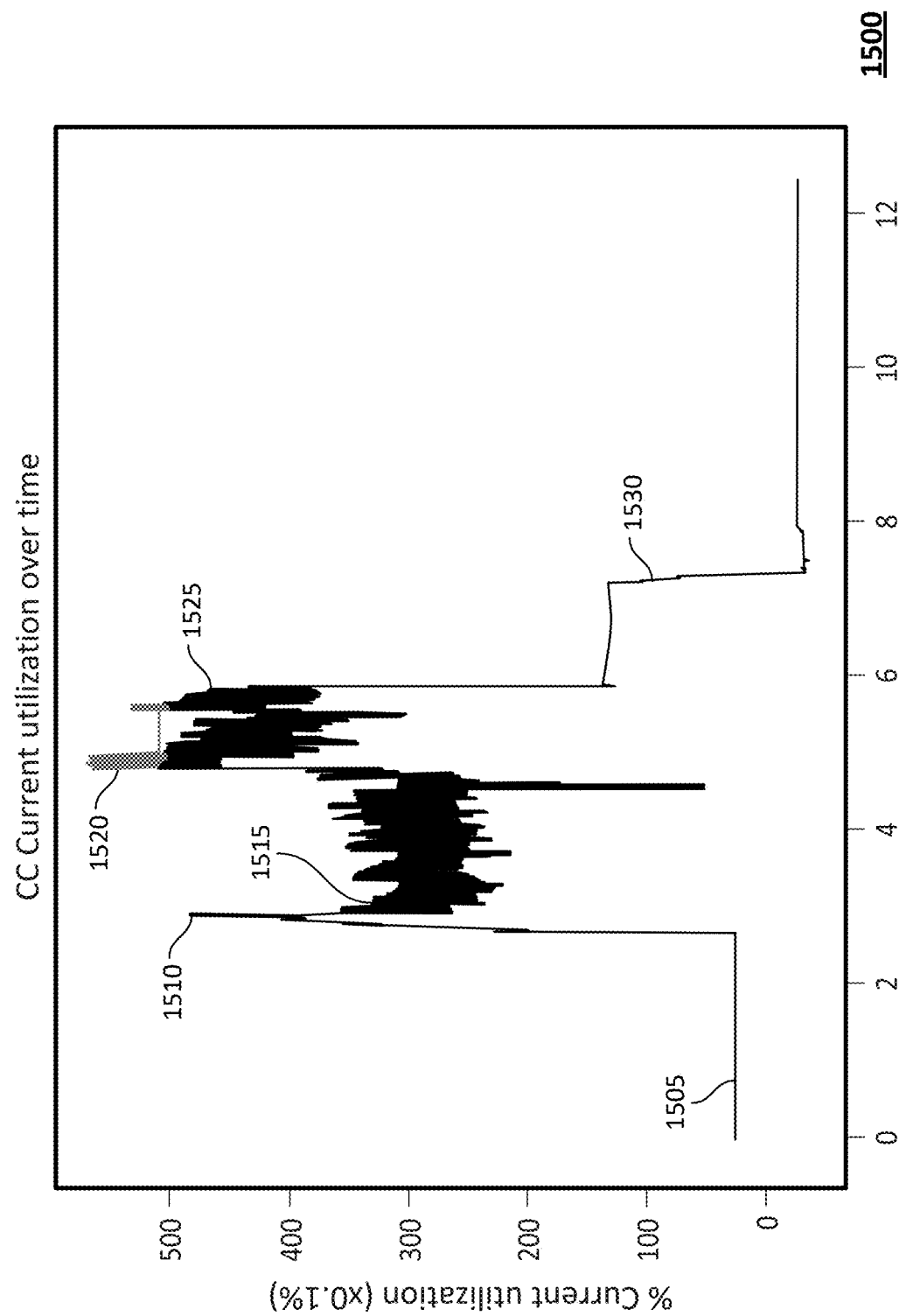
FIG. 15 is a diagram or a graph of conveyor current utilization over time according to various embodiments.

FIG. 15 is a diagram or a graph of conveyor current utilization over time according to various embodiments. In the example shown, the conveyor current utilization is obtained from a sensor that captures the current being used by a motor(s) to drive a conveyor, such as a source conveyor from which items are picked and singly placed to a segmented conveyor. Current utilization 1505 is illustrated in chart 1500 as a function of time. The shape of the curve for current utilization 1505 is indicative of a change in weight of one or more items on the conveyor the system may infer based on current utilization 1505 when an item is picked from the conveyor and/or when another item is fed to the conveyor. More weight on the belt results in an increase in current utilization.

At 1510, the increase from relatively low current utilization to a relatively high current utilization is indicative of one or more items being input to the conveyor. As another example, at 1515, the decrease from a relatively high current utilization to a relatively moderate current utilization is indicative of an item having been picked from the conveyor and that an additional item(s) remain on the conveyor. As another example, at 1520, the increase from a relatively low current utilization to a relatively very high current utilization is indicative of a relatively large amount of weight being input to conveyor. The relatively large amount of weight may be from a single heavy item, or from several lesser weight items. The decrease in current utilization at 1525 is indicative of a pick operation that removed an item (e.g., a relatively lightweight item). However, because current utilization at 1525 is still moderate, the conveyor is deemed to still have one or more items thereon. The further decrease in current utilization at 1530 is indicative of an item being picked from the conveyor. Because the current utilization at 1530 returns to a value close to 0, the system may deem the singulation operation to have been completed (e.g., the conveyor is turned off) or no further items are input to the conveyor.

In some embodiments, if the current utilization increases beyond a current utilization threshold, the probability of a heavy item on the pick table or source table is increased.

In some embodiments, the system is trained to determine a current utilization threshold to be used to detect heavy items (or to detect that a weight on the conveyor exceeds a weight threshold). For example, the system may be trained using a machine learning model. The machine learning model is trained using historical information pertaining to historical classifications of items on conveyors with associated current utilization information. In some embodiments, the system may be trained to provide a prediction of a likelihood that an item is a heavy item based at least in part on a current utilization or an extent to which the current utilization exceeds the current utilization threshold.

Figure 16:
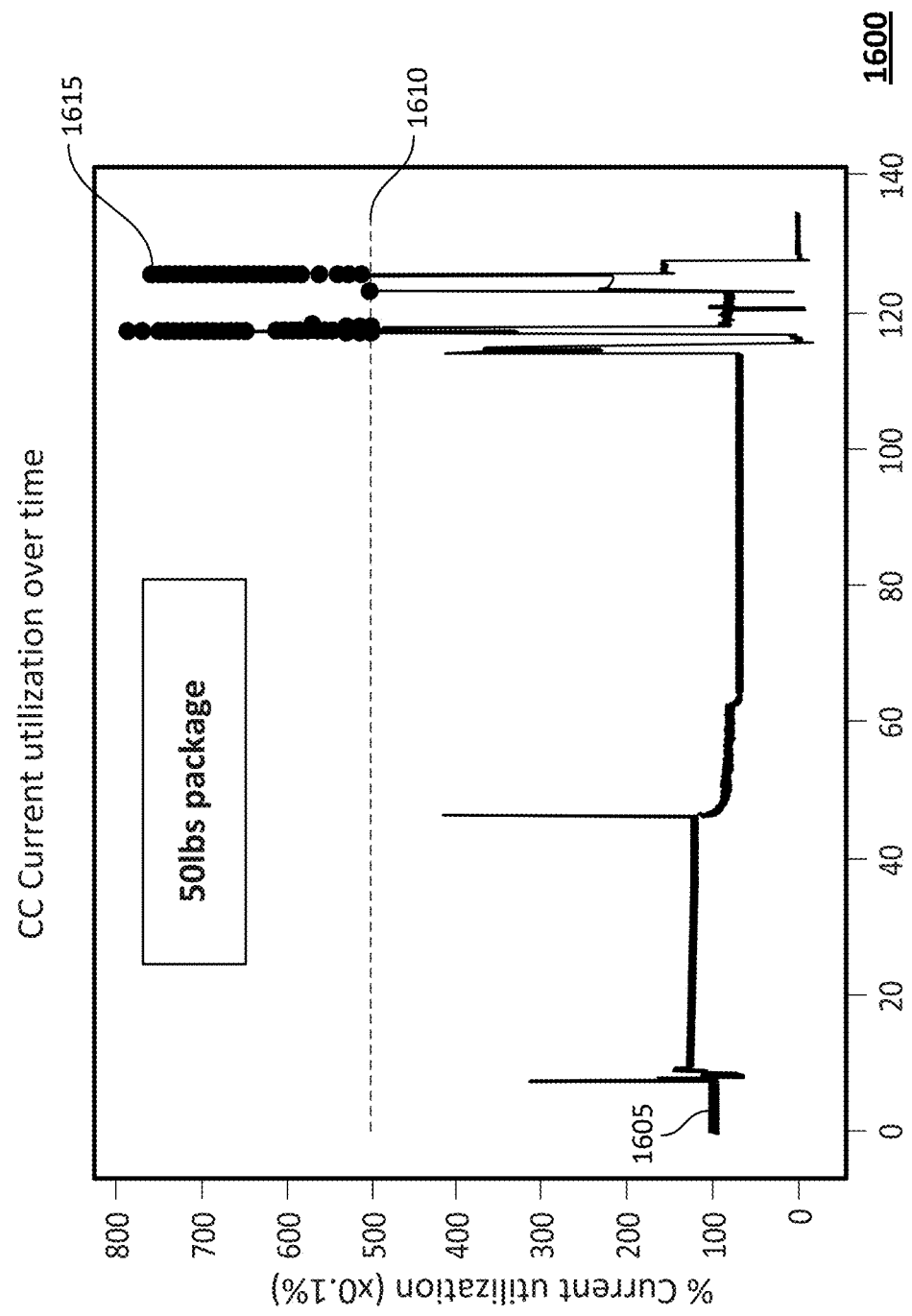
FIG. 16 is a diagram or a graph of conveyor current utilization over time according to various embodiments.

FIG. 16 is a diagram or a graph of conveyor current utilization over time according to various embodiments. In the example shown, the system has been trained to determine a current utilization threshold that is used to detect heavy items or whether a weight on the source conveyor exceeds a weight threshold (e.g., a heavy item is on the conveyor or several smaller items). Current utilization 1605 is illustrated in chart 1600 as a function of time. Current utilization threshold 1610 is set (e.g., by training the system or by an administrator, etc.) to be the threshold used to detect heavy items. As illustrated in chart 1600, the current utilization at 1615 may be indicative of a heavy item. In response to detecting current utilization 1605 exceeding current utilization threshold 1610, the system may implement an active measure, such as a subroutine to handle the heavy item and/or stopping/slowing the flow of items to the conveyor while the heavy item is handled. In some embodiments, in response to detecting current utilization 1605 exceeding current utilization threshold 1610, the system implements a verification that the conveyor comprises a heavy item. For example, the system uses sensor data from other sensors, such as image data from a vision system, to verify whether the conveyor comprises a heavy item or several smaller items (e.g., a set of items having an aggregate weight exceeding a weight threshold corresponding to current utilization threshold 1610).

In various embodiments, computer vision and/or artificial intelligence techniques are used to detect items that require special handling, such as manual induction, induction by pushing, etc. The computer vision and/or artificial intelligence techniques may be used to detect items that require special handling in addition to, or as an alternative to, the use of information pertaining to the conveyor (e.g., the use of current utilization to detect heavy items). Items may be deemed to require special handling based at least in part on a determination of one or more of (i) the item is heavy (e.g., exceeds a weight threshold that may be associated with a capacity of a robotic arm to perform pick and place operations), (ii) the item has an irregular shape (e.g., the shape of the item does not match a predefined set of shape templates, the item has an irregular geometry, etc.), (iii) the item has one or more dimensions that exceed a predefined dimension threshold (e.g., the item is irregularly large), (iv) information on the label or printed on the side of the item is indicative of special handling (e.g., the system detects one or more of a service class for delivery of the item, an indication that the item is fragile such as a predefined fragile symbol, an indication that the item is to be handled according to a particular orientation, etc.).

In various embodiments, the system uses computer vision to determine one or more item attributes. Examples of item attributes include size, shape, dimension, weight, center of gravity, label information, symbols printed on the item, orientation, etc. Various other attributes may be obtained based on computer vision techniques.

In various embodiments, computer vision is used to identify items that are out of specification with respect to parameters, such as out of specification with respect to weight, size, shape, rigidity, weight, distribution, etc. The system may determine, based on the computer vision techniques, that an item (e.g., an item on a source conveyor) is out of specification with respect to the parameters in a manner that the items cannot be inducted autonomously by using a robotic arm and associated end effector to pick (e.g., grasp the item) and place the item at a destination location. For example, the system may store a predefined set of parameters or constraints for items that are inductable by pick and place operations (e.g., by a single robotic arm) or that otherwise require special handling.

In some embodiments, the system recognizes a barcode or Radio Frequency Identification (RFID) data based at least in part on the computer vision. As an example, the system obtains the barcode or RFID data from a label on the item. The system may obtain the barcode or RFID data based at least in part on computer vision techniques. In some embodiments, the barcode or RFID data comprises information indicating an item attribute such as weight, fragility, service class, or other special handling requirements. The system uses the barcode or RFID data (or other label information) to determine a weight for the item, which the system may then use to plan a singulation operation (e.g., a pick and place operation) or a plan for another manner for handling the item. For example, for certain overweight or fragile items with distinguishable visual patterns (e.g., symbols or other markings), the system may use a computer vision technique (e.g., a computer vision model) to detect the special visual patterns.

In some embodiments, the system uses the computer vision techniques to identify the presence and/or location of a label affixed to (or printed on) the item.

In some embodiments, the system uses the orientation of the item (e.g., an item surface) to remove perspective distortion to make it easier for the system to read information on the item (e.g., an indication of an item attribute, such as item weight). The system may use Optical Character Recognition (OCR) techniques to read the information on the item (e.g., on the item label). For example, the system decodes the weight of the item label using OCR. The system can read identifying information pertaining to the item (e.g., an item identifier or indication of a type of item), which can be used to perform a lookup for an item attribute such as item weight, size, service class, etc. The lookup may be performed with respect to a dataset comprising a mapping of item identifiers (or item types) to item attributes.

In some embodiments, if the label is not visible or not detected by the system, the system may use other techniques for estimating the weight of the item or predicting whether the item weight exceeds a weight threshold (e.g., a threshold for determining to push the item rather than perform a pick and place operation). The system can use the item movement through the workspace (e.g., through the chute or funnel or through the source conveyor) and/or conveyor information (e.g., current utilization of a motor(s) driving the source conveyor) to predict the weight of the item or to predict whether the item is a heavy or non-inductable item.

In connection with determining a manner to handle the item and/or a plan for handling the item, the system performs image segmentation on image data obtained by the vision system or comprised in a model of the workspace. The system uses image segmentations to identify items (e.g., items on the conveyor) and/or to determine item attributes for items in the workspace. The system may use the image segmentation in connection with fitting cuboid boxes to items. In addition, the system can attempt to match a detected items/objects to generated template shapes based on the segmentation information. The system may determine a likelihood that an item/object corresponds to a particular shape (e.g., a predefined shape in a set of shape templates). In some embodiments, the system determines a manner for handling an item based at least in part on the matched shape. For example, in response to determining that an object/item in the image data matches a template shape(s) with high confidence, the system determines a plan for handling the item, such as a plan to push the item rather than to perform a pick and place operation. As another example, in response to determining that an object/item in the image data matches a template shape(s) with high confidence, the system determines to reject the item or to route the item for special handling.

Certain items comprise unique labels or symbols printed thereon such as to identify special item attributes (e.g., the item being fragile, heavy, or subject to handling in certain orientations). The system implements a computer vision technique (e.g., a computer vision model) to recognize the labels or symbols. For example, the system may store a set of predefined symbols that are mapped to particular item attributes or manners for handling the items. In various embodiments, the system implements machine learning and/or artificial intelligence techniques to create and update (e.g., learn) a model over time to detect and classify items according to one or more classifications. For example, the system uses machine learning or artificial intelligence techniques to create/update a model to detect/classify items that are heavy (e.g., that are expected to have a weight that exceeds a weight threshold) or detect/classify items that otherwise require special handling based on item attributes (e.g., size, shape, and markings) that may be determined based on the computer vision techniques.

In various embodiments, in response to detecting a heavy item or other non-inductable item such as an item requiring special handling, the system determines and executes a strategy to move the item to a destination location (e.g., a specific tilt tray or segment on a segmented conveyor) at least in part by pushing the item with a robotic arm, rather than grasping and lifting the item (e.g., without grasping and lifting the item using a single robotic arm).

In various embodiments, the system comprises one or more robotically controlled or actuated mechanisms. The system may control/actuate the one or more robotically controlled or actuated mechanisms to divert an item to be subject to special handling, such as a heavy item (e.g., an item that exceeds a weight threshold) or other non-inductable item. The item is diverted to an alternate location for special handling, such as manual induction.

In various embodiments, a robotic singulation system as disclosed herein comprises an induction system having one or more passively and/or actively actuated and/or robotically controlled structures, subsystems, mechanisms, and/or other instrumentalities to move (e.g., to divert) an item deemed to require special handling to an alternate location associated with such special handing, such as manual induction. Examples of such passively and/or actively actuated and/or robotically controlled structures, subsystems, mechanisms, and/or other instrumentalities include: structures that open, tilt, operate in reverse, or otherwise change geometry or operation under robotic control. The structures may include a conveyor (e.g., the source conveyor), a chute, a funnel, a wall or side of a conveyor, chute, or funnel, etc. In response to determining that an item is to require special handling (e.g., determining that the item is heavy or otherwise non-inductable), the system determines a strategy for controlling such robotically controlled structures, subsystems, mechanisms, and/or other instrumentalities and implements the strategy to control such robotically controlled structures, subsystems, mechanisms, and/or other instrumentalities to divert the item to an alternate location for special handling (e.g., the item is routed to an alternate location that is different from a tray or segment on the segmented conveyor).

In some embodiments, the system determines that an item requires special handling and determines to control a robotically controlled structures, subsystems, mechanisms, and/or other instrumentalities to divert the item based at least in part on one or more of (i) a determination that the item is heavy (e.g., the item is too heavy for a robot to pick the item and place the item on a tray or segment), (ii) the workspace (e.g., the source conveyor) is too crowded for a robot to safely and/or effectively push the item to a destination location or to an alternate location according to which the item is rejected and routed for special handling, (iii) the induction system (e.g., tilt trays, segments, belts) are unable to support the item. Many induction systems (e.g., tilt trays, segments, belts) may be unable to support certain item types, such as items that are too wide for a tray, etc. Induction by pushing such items may not be feasible and the system may thus determine to route the item for special handling.

Examples of actuating/controlling a robotically controlled structures, subsystems, mechanisms, and/or other instrumentalities to move (e.g., to divert) an item deemed to require special handling to an alternate location include (i) actuating a source conveyor (e.g., pick table) to move the item in a determined direction, such as in reverse, (ii) actuating a mechanism to move a sidewall of a source conveyor to enable an item to be pushed from the source conveyor to the alternate location (e.g., a location for routing for special handling), (iii) actuating a mechanism to change a position of a chute and/or source conveyor (e.g., raising or lowering the source conveyor and/or chute), etc.

In some embodiments, a system as disclosed herein determines whether to divert an item for special handling based at least in part on one or more of the following (i) the system selects an item to divert based on a vision system (e.g., the system detects that an item is non-inductable or otherwise requires special handling based on image data captured by a vision system), (ii) the system determines that previous interactions with the item are indicative that the item is too heavy or difficult to grasp (e.g., the system uses sensor data pertaining to force contact, suction, etc. to determine that previous interactions were unsuccessful in autonomously inducting the item), (iii) an item weight determined/estimated using a force sensor mounted on a robotic arm which is configured to measure the force while the robotic arm is grasping the item, (iv) signals (e.g., sensor data) from other system components such as a vision system, sensors on or around the conveyor (e.g., a sensor that detects current utilization of a motor driving the conveyor), etc. As an example, if the system determines that the robotic arm has implemented a number of unsuccessful attempts to grasp/pick an item, and that the number of unsuccessful attempts exceeds an attempt threshold, then the system deems the item to be too heavy or otherwise non-inductable.

In various embodiments, a system as disclosed herein comprises one or more of (i) an actuated side wall that can be controlled to move (e.g., drop down) and allow rejection/diversion of items such as by a robotic arm being used to push the item off the source conveyor (e.g., the pick table), (ii) an actuated mechanism to tilt the source conveyor (e.g., the pick table) such as in a downward (e.g., back) direction, (iii) a source conveyor that can be controlled to operate in reverse to divert a package to the back of the source conveyor/workspace (e.g., to dump the item to an alternate location at the back of the source conveyor), (iv) an actuated mechanism to tilt the chute/funnel, such as in an upward direction (e.g., the system tilts the chute/funnel and then runs the source conveyor in reverse to dump the item out the back), (iv) an actuated mechanism to move the chute/funnel up or down (e.g., to enable the system to raise the chute/funnel to provide sufficient clearance for the source conveyor to operate in reverse to dump an item out the back), (v) an actuated wall at the chute or source conveyor, such as a wall at the rear of the chute) to redirect selected items (e.g., items deemed to require special handling) off of the side wall (e.g., when the source conveyor is run in reverse and the wall at the rear of the chute is actuated/lowered, the item is directed/routed to an alternate location), (vi) passive actuated sensors or other structures such as a reflected for an IR break beam sensor (e.g., to enable items to flow over the sensors or other structures without damaging the same).

Figure 17:
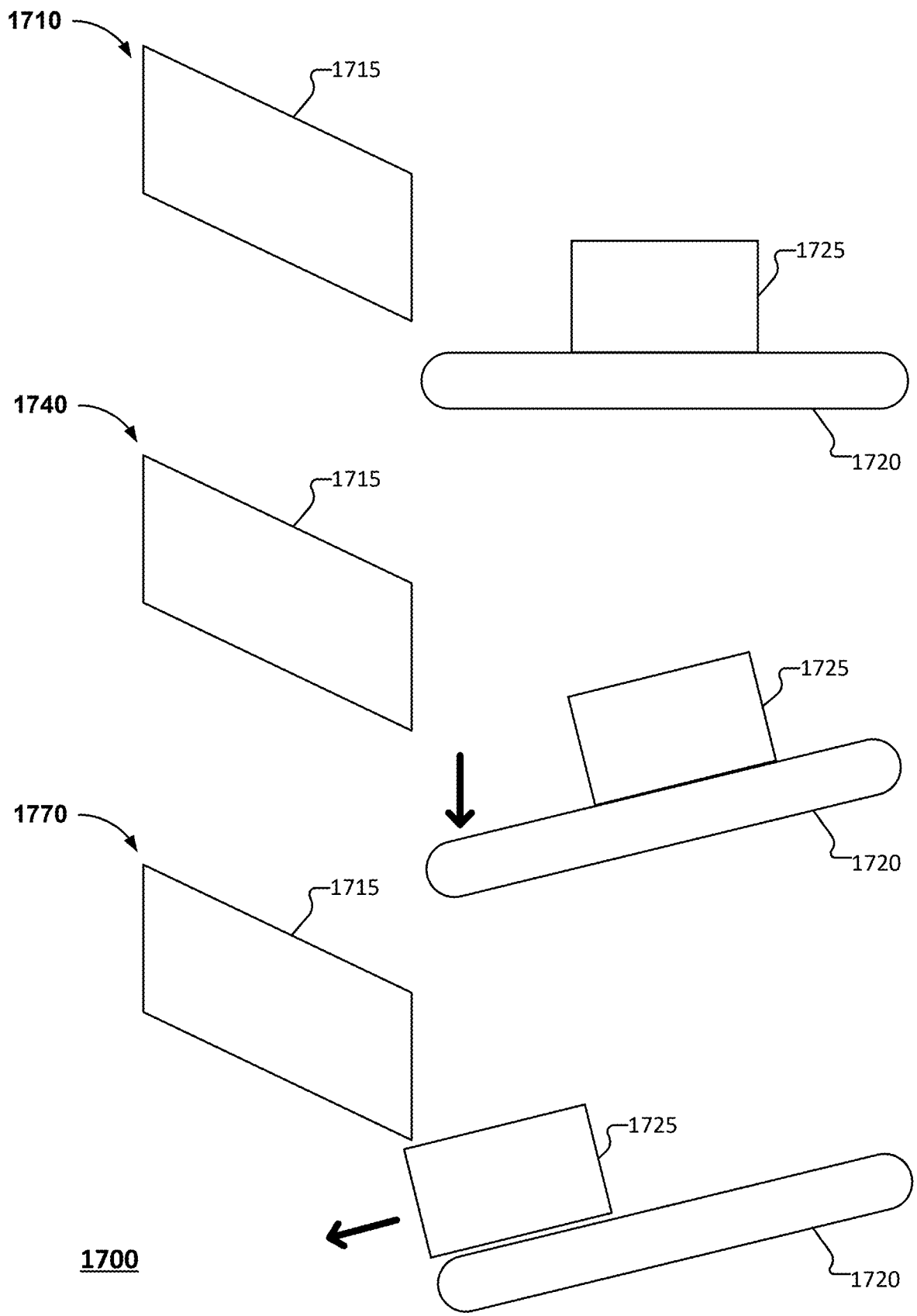
FIG. 17 is a diagram illustrating a singulation system according to various embodiments.

FIG. 17 is a diagram illustrating a singulation system according to various embodiments. In some embodiments, system 1700 comprises, or is similar to, the singulation systems described herein.

System 1700 is an example of a system that is configured to enable a source conveyor to be actuated to change its orientation to enable the controller to operate the source conveyor in reverse to move an item to be diverted (e.g., a heavy item, an item requiring special handling, an item that is otherwise non-inductable) out the back of the source conveyor. As an example, the changing the orientation of the source conveyor may include tilting the conveyor down at the rear of the source conveyor. As an example, the changing the orientation of the source conveyor may include lowering the source conveyor (e.g., at least relative to the chute/funnel). In some embodiments, the orientation of the source conveyor is changed to provide sufficient clearance for the system to control the source conveyor to move the item out the back (e.g., to an alternate location, such as for routing for special handling).

In the example shown, system 1700 comprises chute 1715 and source conveyor 1720. At 1710, the system is configured to operate normally for a robotic arm to induct items from source conveyor 1720 to a destination location (not shown) such as to a tray or segment on a segmented conveyor. System 1700 monitors items flowing to or across source conveyor 1720. For example, system 1700 monitors (e.g., using techniques described herein) the items to detect items that require special handling, such as heavy items, bulky items, fragile items, etc. At 1740, system 1700 controls to change the orientation of source conveyor 1720. For example, as illustrated, source conveyor 1720 is controlled to be tilted downwards at the rear. System 1700 controls to change the orientation of source conveyor 1720 in response to determining that item 1725 requires special handling, such as in response to determining that item 1725 is a heavy item. At 1770, item 1725 moves out the back of source conveyor 1720. For example, system 1700 controls to operate source conveyor 1720 in reverse to move the item out the back to an alternate location (e.g., a reject area or routing mechanism to a location for special handling). In some embodiments, system 1700 controls to drive source conveyor 1720 in reverse in response to determining that the path of item 1725 is clear (e.g., not subject to a collision with another object in the workspace). For example, source conveyor 1720 is driven in reverse in response to determining that the orientation of source conveyor 1720 is sufficiently changed to provide sufficient clearance between source conveyor 1720 (e.g., item 1725) and chute 1715.

Figure 18:
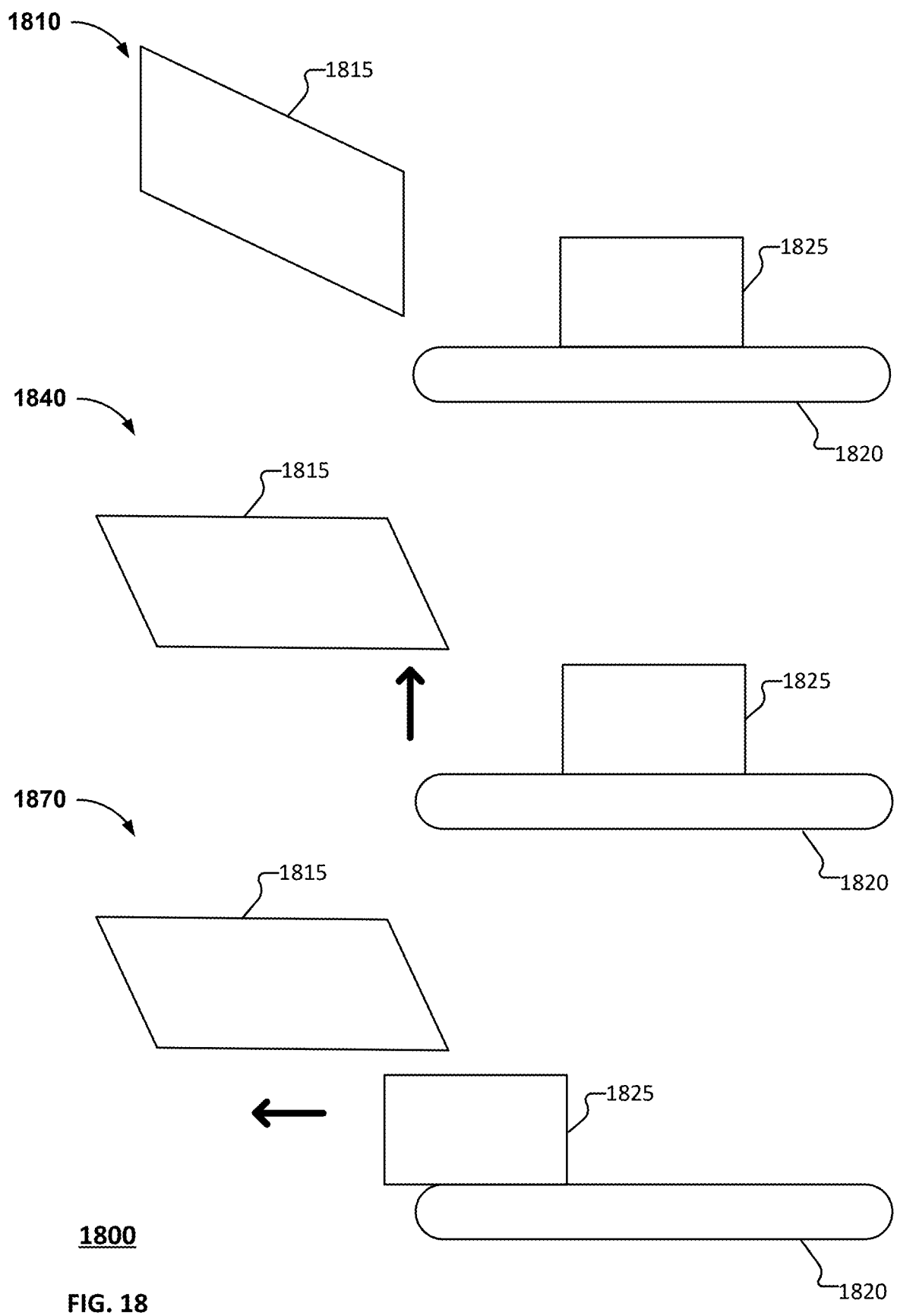
FIG. 18 is a diagram illustrating a singulation system according to various embodiments.

FIG. 18 is a diagram illustrating a singulation system according to various embodiments. In some embodiments, system 1800 comprises, or is similar to, the singulation systems described herein.

System 1800 is an example of a system that is configured to enable a chute/funnel to be actuated to change its orientation to enable the controller to operate the source conveyor in reverse to move an item to be diverted (e.g., a heavy item, an item requiring special handling, an item that is otherwise non-inductable) out the back of the source conveyor. As an example, the changing the orientation of the chute/funnel may include tilting (e.g., rotating) the chute/funnel up at the distal end of the chute/funnel closest to the source conveyor. As anther example, the changing the orientation of the chute/funnel may include raising/lowering the chute/funnel (e.g., at least relative to the source conveyor). In some embodiments, the orientation of the chute/funnel is changed to provide sufficient clearance for the system to control the source conveyor to move the item out the back (e.g., to an alternate location, such as for routing for special handling).

In the example shown, system 1800 comprises chute 1815 and source conveyor 1820. At 1810, the system is configured to operate normally for a robotic arm to induct items from source conveyor 1820 to a destination location (not shown) such as to a tray or segment on a segmented conveyor. System 1800 monitors (e.g., using techniques described herein, such as current utilization of a motor driving source conveyor 1820) items flowing to or across source conveyor 1820. For example, system 1800 monitors the items to detect items that require special handling, such as heavy items, bulky items, fragile items, etc. At 1840, system 1800 controls to change the orientation of chute 1815. For example, as illustrated, chute 1815 is controlled to be tilted upwards at the end adjacent to source conveyor 1820. System 1800 controls to change the orientation of chute 1815 in response to determining that item 1825 requires special handling, such as in response to determining that item 1825 is a heavy item. At 1870, item 1825 is moved (e.g., via driving source conveyor 1820 in reverse or by using a robotic arm to push item 1825) out the back of source conveyor 1820. For example, system 1800 controls to operate source conveyor 1820 in reverse to move the item out the back to an alternate location (e.g., a reject area or routing mechanism to a location for special handling). In some embodiments, system 1800 controls to drive source conveyor 1820 in reverse in response to determining that the path of item 1825 is clear (e.g., not subject to a collision with another object in the workspace). For example, source conveyor 1820 is driven in reverse in response to determining that the orientation of chute 1870 is sufficiently changed to provide sufficient clearance between source conveyor 1820 (e.g., item 1825) and chute 1815.

Although the examples shown in FIGS. 17 and 18 describe individually controlling the orientation of either the chute or the source conveyor to configure a path to reject an item deemed to require special handling, in some embodiments, the system may implement a combination of changing an orientation of the chute and an orientation of the source conveyor. For example, the system controls an actuating mechanism that causes an orientation of the chute to be changed in coordination with controlling an actuating mechanism that causes an orientation of the source conveyor chute to be changed.

In some embodiments, the system comprises a side wall to a pick table/source conveyor that is configured to be actuated. For example, the side wall may be actuated to be raised or lowered. The actuating the side wall allows items to be pushed over the wall into a reject area for special handling. In a raised position, the side wall may serve to prevent items from falling from the pick table/source conveyor. In a lowered position, the side wall permits an item to be pushed from the side table, such as to an alternate location for routing for special handling. In some embodiments, the side wall is actuated using a solenoid or piston. For example, a piston is used to raise/lower the sidewall such that the side wall is configured to prevent items from being pushed from the source conveyor when the piston is engaged, and to permit items to be pushed from the source conveyor when the piston is released.

Figure 19:
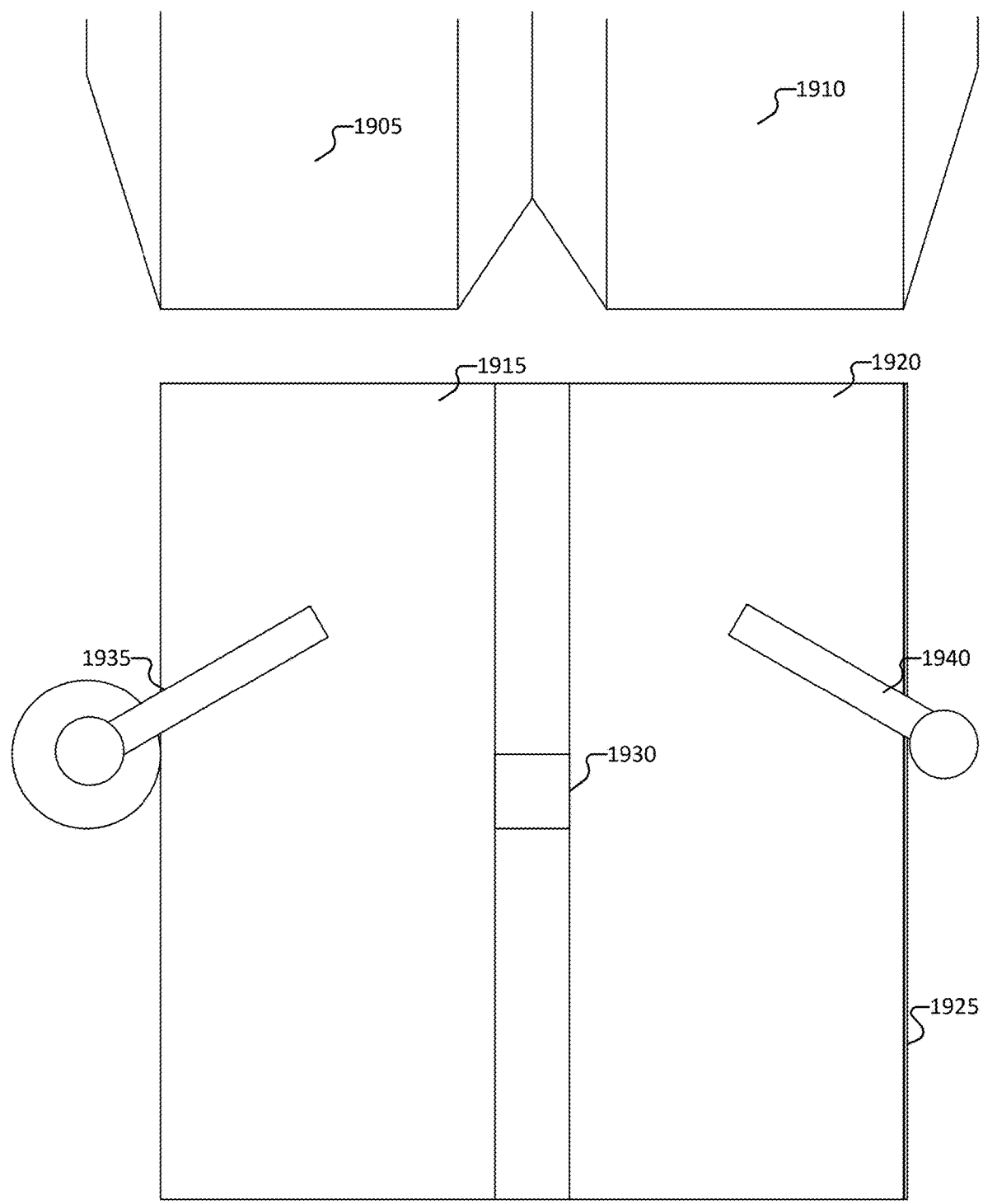
FIG. 19 is a diagram illustrating a singulation system according to various embodiments.

FIG. 19 is a diagram illustrating a singulation system according to various embodiments. In some embodiments, system 1900 comprises, or is similar to, the singulation systems described herein.

As illustrated in FIG. 19, system 1900 is an example of an induction/singulation system comprising multiple robots. Different subsets of the multiple robots may have different operating workspaces (e.g., different sides of a source conveyor/pick table, or different source conveyors/pick tables).

In the example shown, system 1900 comprises chutes (or funnels) 1905 and 1910. The chutes 1905, 1910 direct items to flow onto the source conveyor (or pick table), such as to source conveyor segment 1915 and source conveyor segment 1920. For example, chute 1905 is configured to direct items to flow to source conveyor segment 1915, and chute 1910 is configured to direct items to flow to source conveyor segment 1920. Although the example illustrates two different chutes, in some embodiments, the system comprises a single chute that directs the flow of items to both source conveyor segment 1915 and source conveyor segment 1920.

System 1900 further comprises source conveyor segment 1915 and source conveyor segment 1920. Source conveyor segment 1915 and source conveyor segment 1920 may correspond to a single source conveyor or pick table, or to distinct source conveyors/pick tables that are disposed adjacent to each other. In some embodiments, source conveyor segments 1915, 1920 are driven (e.g., caused to move items) in coordination (e.g., the source conveyor segments are driven by a shared motor). In some embodiments, source conveyor segments 1915, 1920 are driven individually (e.g., by separate motors).

As items flow across source conveyor segment 1915, robotic arm 1935 may perform pick and place operations with respect to items, or for items requiring special handling (e.g., heavy items, etc.) robotic arm 1935 may push the items to the destination location (not shown). Similarly, as items flow across source conveyor segment 1920, robotic arm 1940 may perform pick and place operations with respect to items, or for items requiring special handling (e.g., heavy items, etc.) robotic arm 1940 may push the items to the destination location (not shown).

In the example shown, system 1900 comprises a reflector or other sensor 1930 disposed between (e.g., at an interface of) source conveyor segment 1915 and source conveyor segment 1920. The reflector or other sensor 1930 is used in connection with monitoring a workspace, such as monitoring/detecting items on the source conveyor(s), detecting item attributes of items flowing across the source conveyor(s), and/or a characteristics of a flow of items (e.g., a density, a speed, etc.).

System 1900 may further comprise side wall 1925 disposed at source conveyor segment 1920. Side wall 1925 may be configured to prevent/restrict items from falling from source conveyor 1920 (e.g., to prevent items from being inadvertently pushed from source conveyor segment 1920). Although the example shown does not include a side wall for source conveyor segment 1915, in some embodiments one or both of the source conveyor segments comprise a side wall. As described further in connection with FIG. 22, an orientation of side wall 1925 may be controlled (e.g., by an actuating mechanism that may be controlled by a controller), such as to permit items to be pushed over the side of the corresponding source conveyor segment.

In various embodiments, a system as disclosed herein uses infrared (IR) sensors (e.g., break-beam sensors) to monitor items. Examples of implementations of such break beam sensors include determining if items have reached limits of a pick table/source conveyor, determining a height or other dimension of an item on the source conveyor, etc. Such sensors direct an IR beam at a reflector and detect whether the beam is reflected back to a sensor. Reflectors are generally configured to be static. However, in certain contexts, a static configuration for a reflector or other sensor at the source conveyor may be subject to damage as items flow across the source conveyor. For example, in dual robot systems, static reflector plates can disrupt the flow of items or become damaged as items flow against/over the static reflector plates. A fixed reflector positioned between the respective areas of multiple robots may prevent one robot from pushing an item to over to (or through) the pick area of the other, or from pushing an overside item from the source conveyor to a destination tray/segment on the segmented conveyor. For heavy items, the fixed reflector or other sensor can prevent a robot from properly pushing an item (e.g., because the reflector or other sensor serves as an immovable collision risk).

In various embodiments, a movable (e.g., retractable) reflector or other sensor is provided to allow items to safely/effectively pass over the reflector (e.g., reflector plate) or other sensor. The reflector plate may be configured to be passively actuated, such as by a spring or counterweight. In response to an item having passed over the retracted reflector or other sensor, the reflector or other sensor is actuated to return to its normal operating condition (e.g., an extended state). As an example, the system may use a biasing force on the reflector or other sensor in a manner that the reflector or other sensor is biased to be configured in a normal operating condition.

In some embodiments, the reflector or other sensor is configured to be deflected in one or more directions. The reflector or other sensor may be configured to be deflected in a direction the same as item flow from the chute to the segmented conveyor. Alternatively, or additionally, the reflector or other sensor may be configured to be deflected in a direction across the source conveyor from one side to the other (e.g., a direction substantially perpendicular with the direction of travel of the source conveyor).

In some embodiments, the reflector is a passive element that reflects light (e.g., IR beams) back to an active sensor that is used to detect the presence of an object in the light path.

Figure 20:
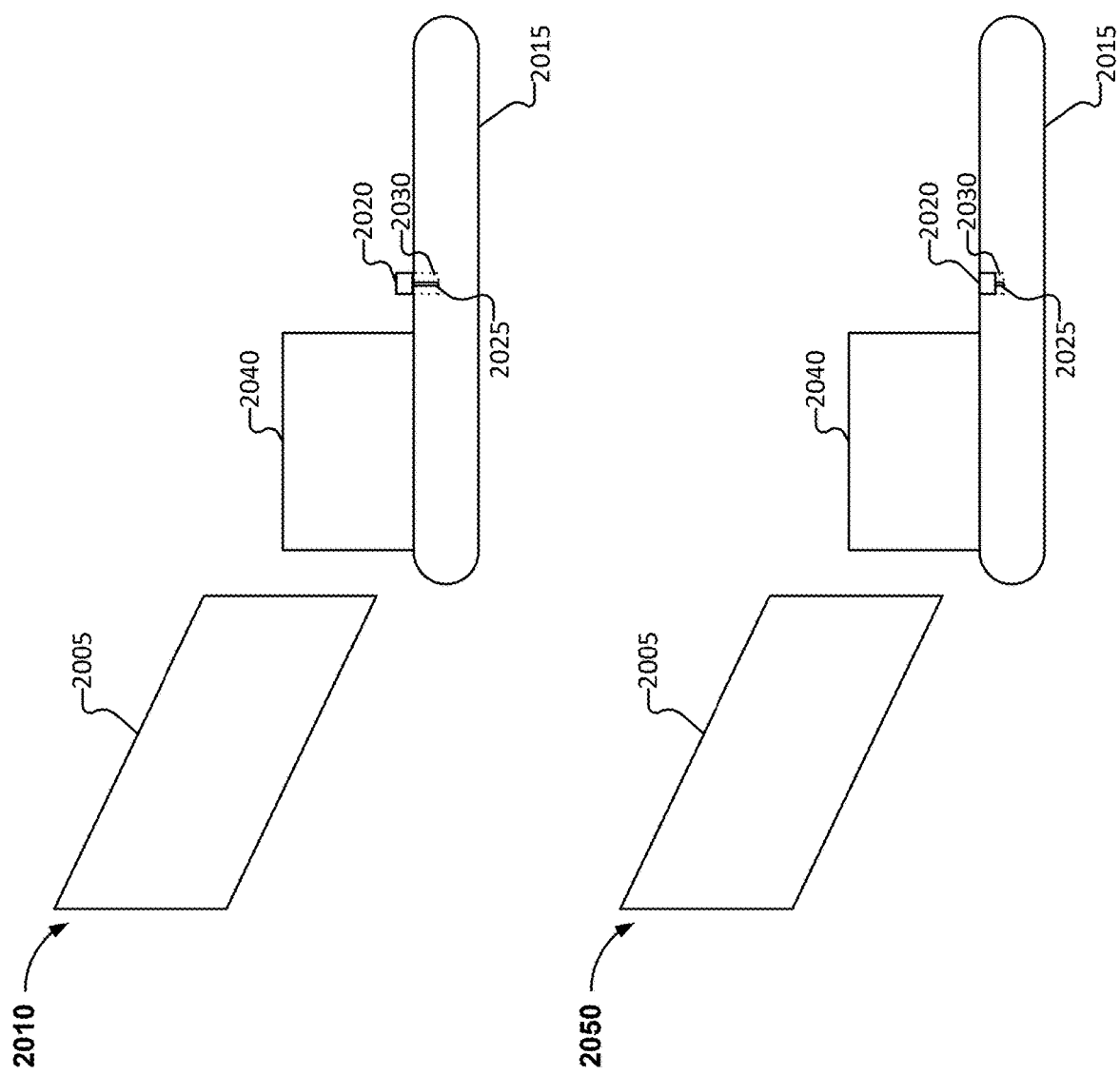
FIG. 20 is a diagram illustrating a singulation system according to various embodiments.

FIG. 20 is a diagram illustrating a singulation system according to various embodiments. In some embodiments, system 2000 comprises, or is similar to, the singulation systems described herein.

System 2000 corresponds to an example according to which a reflector (e.g., reflector plate) or other sensor, such as reflector or other sensor 1930 of system 1900, is retractable or may be passively actuated.

System 2000 comprise chute 2005 that directs items to flow to source conveyor 2015. System 2000 further comprises reflector or other sensor 2020 disposed at or on source conveyor 2015. In the example shown, system 2000 comprises biasing element (e.g., a spring) 2025 that biases reflector or other sensor 2020 to be in a normal/extended state. Biasing element 2025 enables reflector or other sensor 2020 to be configured in a retracted state, such as retracted to cavity 2030. In some embodiments, reflector or other sensor 2020 is passively actuated to be retracted (e.g., in cavity 2030) based on the flow of item 2040. For example, as item 2040 flows against/over reflector or other sensor 2020, reflector or other sensor 2020 retracts (e.g., to prevent damage or to otherwise provide clearance for item 2040). Item 2040 may cause the retraction of reflector or other sensor 2020 because item 2040 is large and extends past the corresponding source conveyor (e.g., extends past the source conveyor boundaries/edges) or in response to a robotic arm pushing item 2040 across/over the location of reflector or other sensor 2020, such as to divert the item to an alternate location for special handling.

Figure 21:
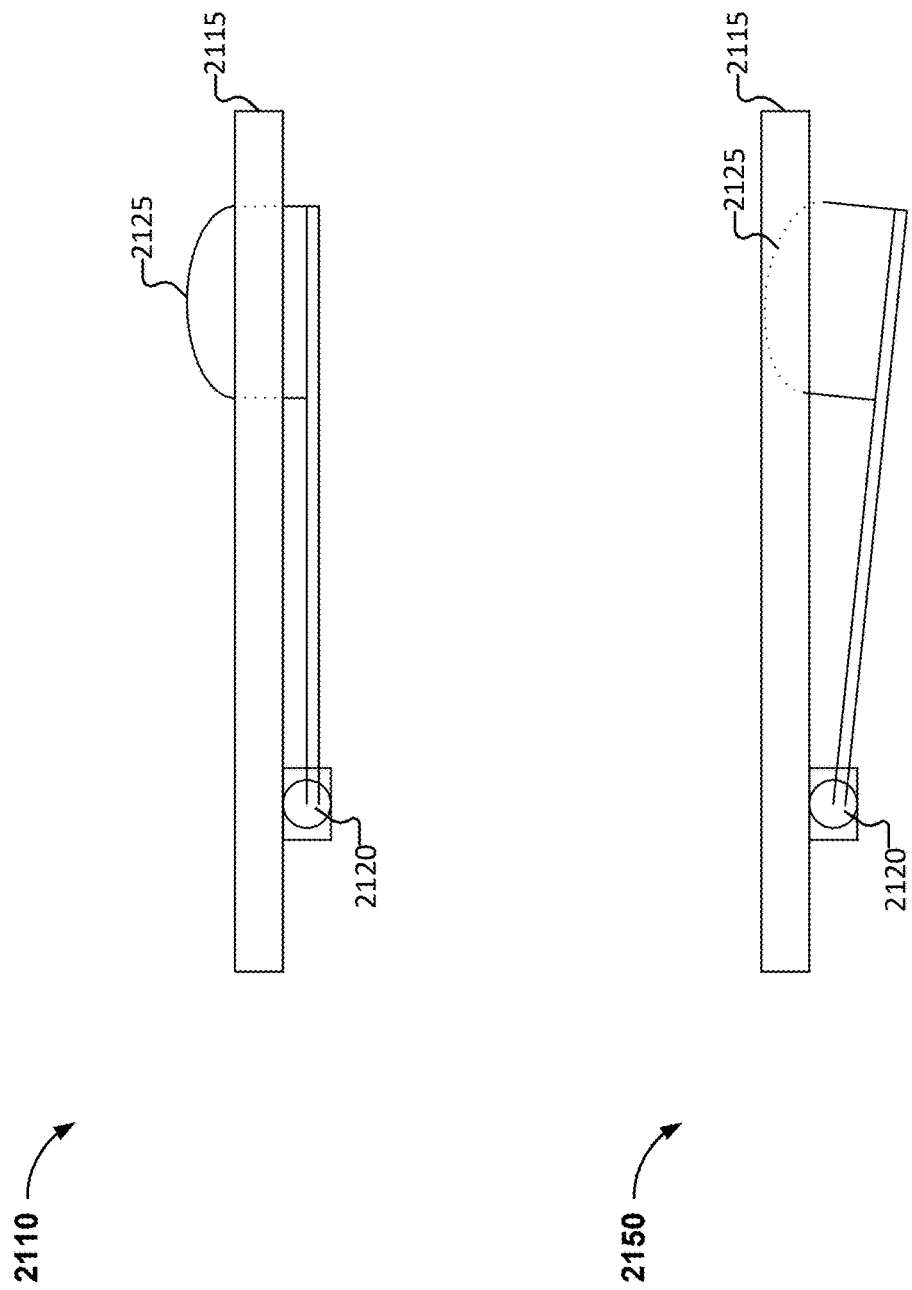
FIG. 21 is a diagram illustrating a singulation system according to various embodiments.

FIG. 21 is a diagram illustrating a singulation system according to various embodiments. In the example shown, reflector/sensor actuation mechanism 2100 enables reflector/sensor 2125 to be retracted relative to pick surface 2115 (e.g., a surface of the pick table/source conveyor from which items are picked by robotic arms), such as in response to an item flowing against/over reflector/sensor 2125. Reflector/sensor 2125 may rotate around axel 2120. In some embodiments, reflector/sensor actuation mechanism 2100 comprises a biasing force that biases reflector/sensor 2125 to be oriented in an extended state, such as at 2125. The biasing force may be a counterweight (not shown), a biasing spring (not shown), etc. In some embodiments, in response to an item flowing against/over reflector/sensor 2125, reflector/sensor 2125 is retracted from pick surface 2115 by rotating/pivoting around axel 2120, such as at 2210. As an example, reflector/sensor 2125 is passively actuated to be oriented in an extended or retracted state based on the flow of items across the source conveyor.

Figure 22:
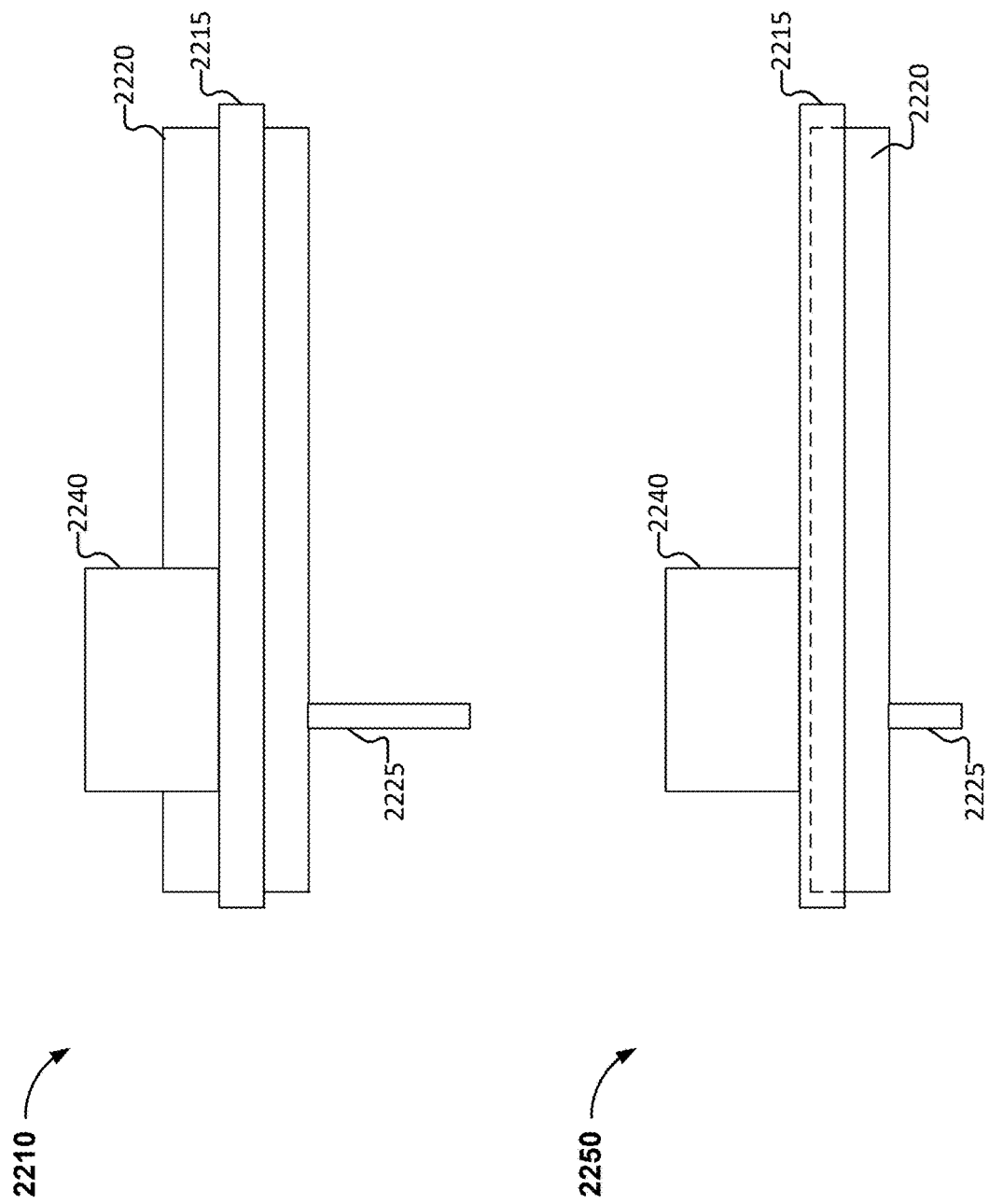
FIG. 22 is a diagram illustrating a singulation system according to various embodiments.

FIG. 22 is a diagram illustrating a singulation system according to various embodiments. Source conveyor 2200 in the example shown corresponds to a pick table/source conveyor in a robotic system disclosed herein (e.g., a system for singulating/inducting items).

As illustrated, source conveyor 2200 comprises pick surface 2215 and side wall 2220. Pick surface 2215 is a surface from which items are picked are pushed. Side wall 2220 is configured to prevent/restrict items from falling or being pushed from source conveyor 2200. In the example shown, side wall 2220 may be configured to allow for an orientation of side wall 2220 to be changed. For example, side wall 2220 may be raised or lowered, such as by autonomous robotic control.

In some embodiments, the system performs singulation operations with respect to items flowing to/across pick surface 2215. As items are input to, or flow across, pick surface 2215, the system may monitor the workspace, such as the flow of items, item attributes, etc. As described herein, in connection with monitoring the workspace, the system may determine that an item requires special handling, such as in response to determining that the item is heavy, bulky, fragile, otherwise non-inductable, etc. In response to determining that the item requires special handling, the system may determine to move the item to an alternative location, such as a location from which the items are routed for special handling.

At 2210, item 2240 is introduced to and/or flows across pick surface 2215. The system may monitor the workspace and determine a manner by which item 2240 is to be handled, such as whether the item is to be picked and placed to a segmented conveyor, whether the item is to be pushed across pick surface 2215 to the segmented conveyor, or whether the item is to be pushed/moved to an alternate location. At 2210, side wall 2220 is in an extended state according to which side wall 2220 prevents/restricts items from falling, or being pushed from, the edge of pick surface 2215. In the example shown, piston 2225 is configured to support side wall 2220, and piston 2225 is in an extended state to configure side wall 2220 to be in a normal/extended state.

In response to determining that item 2240 is to be moved (e.g., pushed) to an alternate location for special handling, the system configures side wall 2220 to move to a retracted state. For example, the system controls a mechanism to actuate piston 2225 to retract to lower side wall 2220.

Figure 23:
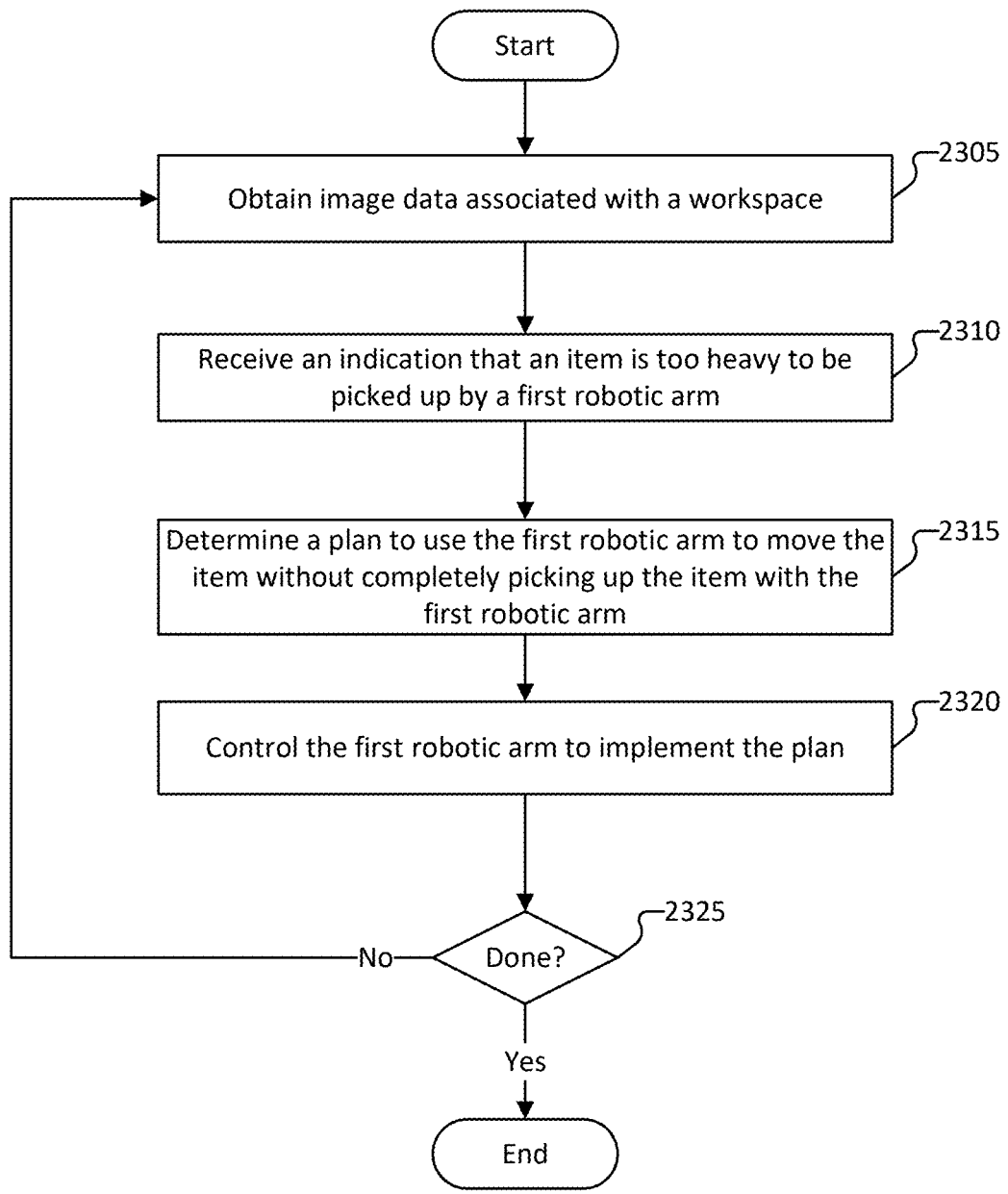
FIG. 23 is a flow diagram of a method for handling an item deemed to be heavy according to various embodiments.

FIG. 23 is a flow diagram of a method for handling an item deemed to be heavy according to various embodiments. Process 2300 is implemented by a system as disclosed herein.

At 2305, image data associated with a workspace is obtained.

At 2310, the system obtains an indication that an item is too heavy to be picked up by a first robotic arm.

At 2315, the system determines a plan to use the first robotic arm to move the item without completing picking up the item with the first robotic arm.

At 2320, the first robotic arm is controlled to implement the plan.

At 2325, a determination is made as to whether process 2300 is complete. In some embodiments, process 2300 is determined to be complete in response to a determination that no further items are to be sorted, no further items are to be singulated, the handling or singulation of the desired items is complete or successful, the process has terminated, an administrator indicates that process 2300 is to be paused or stopped, etc. In response to a determination that process 2300 is complete, process 2300 ends. In response to a determination that process 2300 is not complete, process 2300 returns to 2305.

Figure 24:
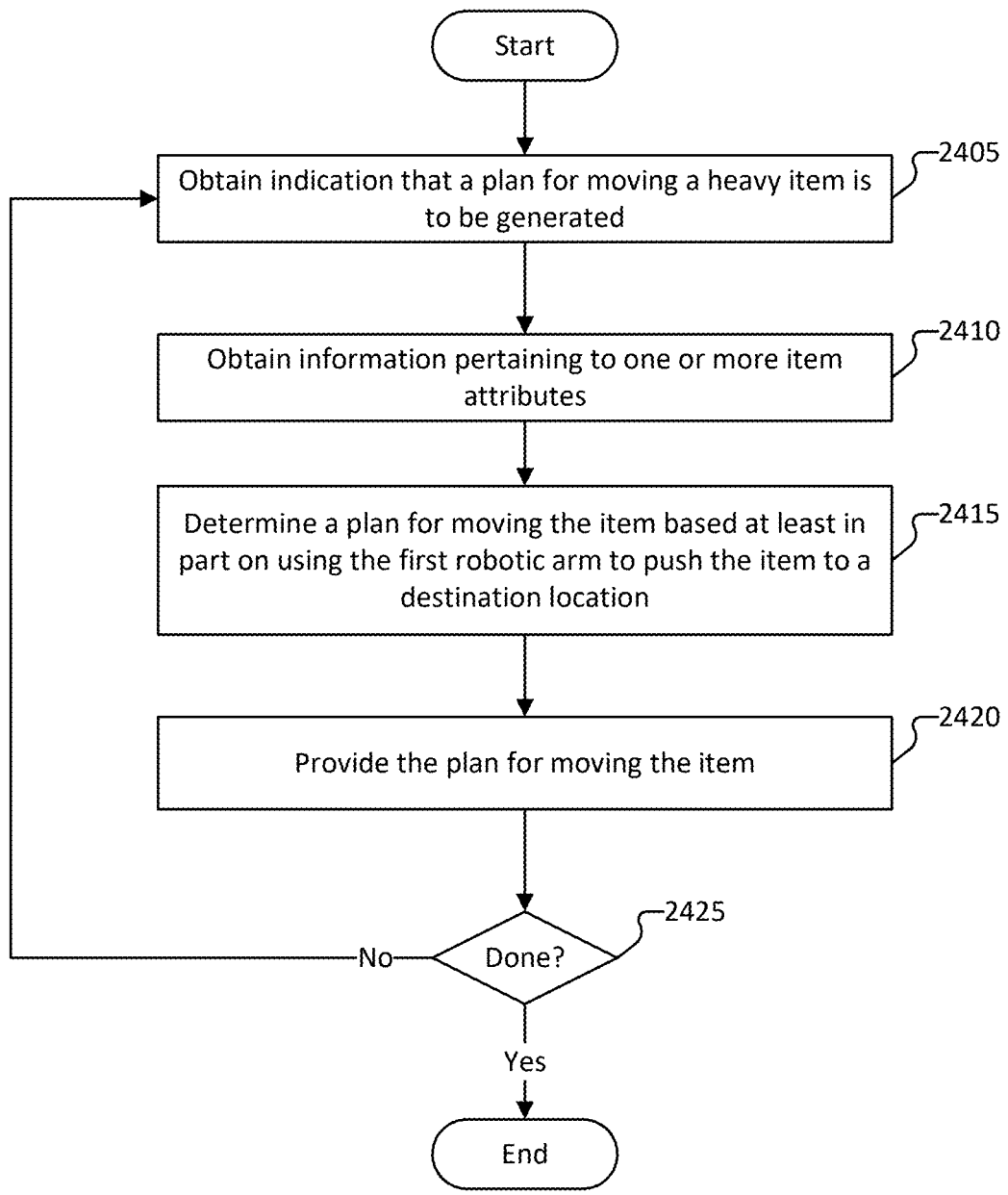
FIG. 24 is a flow diagram of a method for determine a plan for handling an item deemed to be heavy according to various embodiments.

FIG. 24 is a flow diagram of a method for determine a plan for handling an item deemed to be heavy according to various embodiments. Process 2400 may be implemented by a robotic system according to the various embodiments described herein.

At 2405, the system obtains an indication that a plan for moving a heavy item is to be generated. The system may obtain the indication (e.g., determine that a plan is to be generated) in response to detecting an item on a source conveyor or receiving an instruction to begin singulation a set of items.

At 2410, information pertaining to one or more item attributes is obtained. In some embodiments, the system obtains the information pertaining to one or more item attributes based on sensor data collected/captured by one or more sensors in the workspace. Examples of sensors include a vision system (e.g., one or more cameras), a weight sensor, a force sensor, a sensor collecting information pertaining to a motor driving a source conveyor (e.g., a sensor that collects current utilization information), etc. Various other types of sensors may be implemented.

In some embodiments, the system uses sensor data to generate a model of the workspace. The system may determine item attributes based on the model of the workspace. For example, the system performs image segmentation to identify item attributes such as size, label information, symbols or other markings, dimensions, etc.

At 2415, the system determines a plan for moving the item based at least in part on using the first robotic arm to push the item to a destination location. In response to obtaining item attributes, the system determines the plan to move the item to a destination location such as a tray or segment. In some embodiments, the system determines, based at least in part on an item attribute, whether the item is a heavy or non-inductable item or an item that otherwise requires special handling. In response to determining that the item is a heavy or non-inductable item or an item that otherwise requires special handling, the system determines a plan for handling the item. For example, the system determines a plan to push the item from a source conveyor (e.g., the pick table) to a selected tray/segment on a segmented conveyor. As another example, the system determines a plan to move (e.g., push) the item from the source conveyor to an alternate location at which the item is routed for special handling (e.g., the item is pushed to a reject area).

At 2420, the plan for moving the item is provided. In some embodiments, the system provides the plan for moving the item to a subsystem, module, or other system for implementation. As an example, the system uses the plan to control a robotic arm and/or other robotically controlled instrumentality or mechanism (e.g., drive the source conveyor in reverse, tilt the source conveyor or chute, etc.).

At 2425, a determination is made as to whether process 2400 is complete. In some embodiments, process 2400 is determined to be complete in response to a determination that no further items are to be sorted, no further items are to be singulated, the handling or singulation of the desired items is complete or successful, the process has terminated, an administrator indicates that process 2400 is to be paused or stopped, etc. In response to a determination that process 2400 is complete, process 2400 ends. In response to a determination that process 2400 is not complete, process 2400 returns to 2405.

Figure 25:
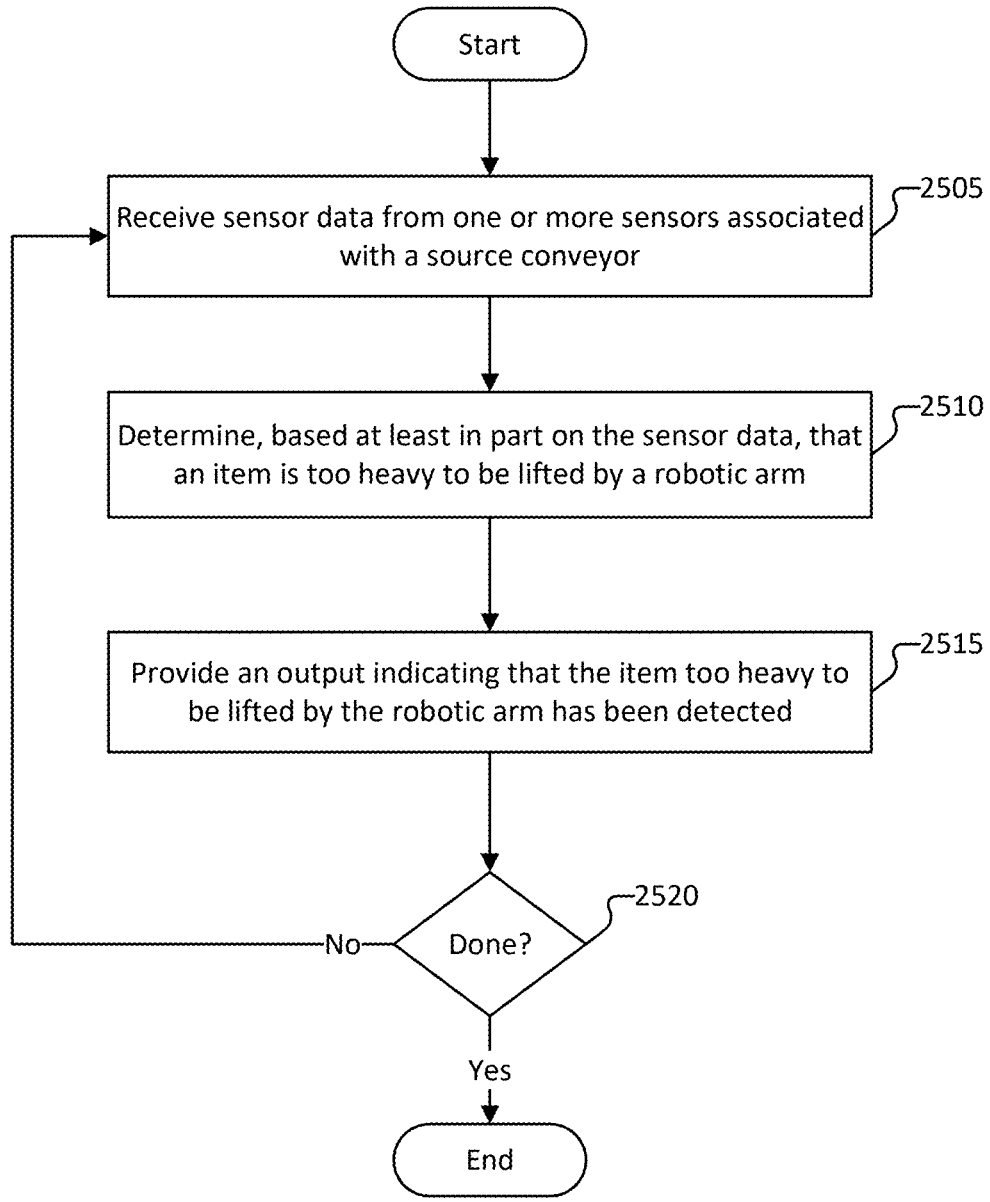
FIG. 25 is a flow diagram of a method for detecting an item deemed to be heavy according to various embodiments.

FIG. 25 is a flow diagram of a method for detecting an item deemed to be heavy according to various embodiments. Process 2500 may be implemented by a robotic system according to the various embodiments described herein.

At 2505, sensor data from one or more sensors associated with a source conveyor is received. At 2510, the system determines that an item is too heavy to be lifted by a robotic arm based at least in part on the sensor data. For example, the system determines that the item is too heavy based on a determination that the item weight exceeds a weight threshold. As another example, the system determines that the item is too heavy based on a determination that a current utilization by a motor(s) driving a source conveyor (or other proxy for the amount of work performed by a motor driving a source conveyor) exceeds a current utilization threshold. In some embodiments, the system verifies the determination that the item is heavy based on computer vision techniques (e.g., performing image segmentation and determining/predicting item attributes). At 2515, the system provides an output indicating that the item too heavy to be lifted by the robotic arm has been detected. For example, the system provides the output to another system or service that invoked process 2500. As another example, the output corresponds to the indication received at 2405 of process 2400. At 2520, a determination is made as to whether process 2500 is complete. In some embodiments, process 2500 is determined to be complete in response to a determination that no further items are to be sorted, no further items are to be singulated, the handling or singulation of the desired items is complete or successful, the process has terminated, an administrator indicates that process 2500 is to be paused or stopped, etc. In response to a determination that process 2500 is complete, process 2500 ends. In response to a determination that process 2500 is not complete, process 2500 returns to 2505.

Figure 26:
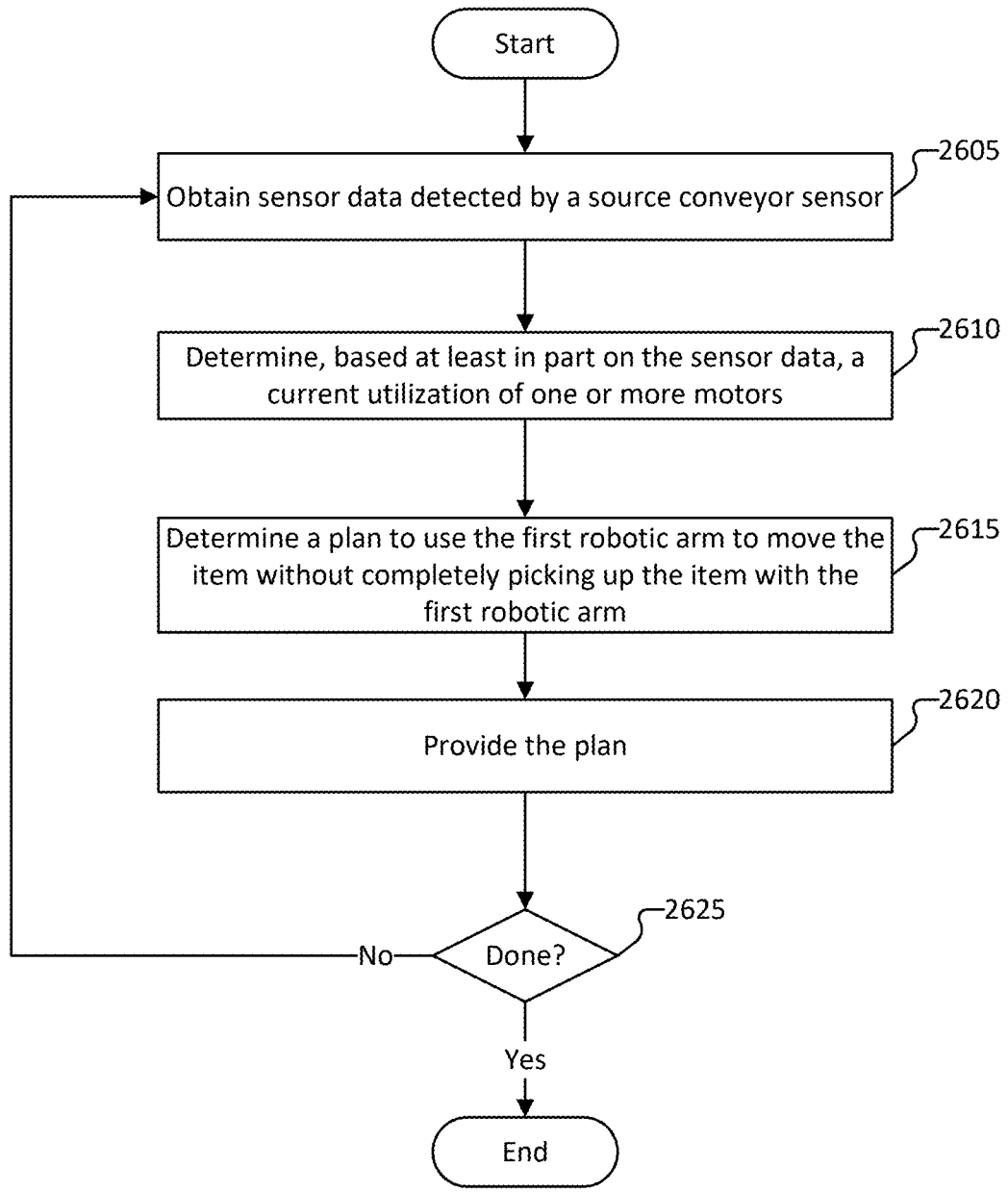
FIG. 26 is a flow diagram of a method for handling an item according to various embodiments.

FIG. 26 is a flow diagram of a method for handling an item according to various embodiments. Process 2600 may be implemented by a robotic system according to the various embodiments described herein.

At 2605, sensor data detected by a source conveyor sensor is obtained. In some embodiments, the system obtains a measure of current utilization for one or more motors driving the source conveyor. At 2610, the system determines a current utilization of one or more motors based at least in part on the sensor data. At 2615, the system determines a plan to use a first robotic arm to move the item without completing picking up the item with the first robotic arm. In some embodiments, the system determines the plan to move the item based at least in part on the current utilization. For example, if the current utilization for a motor driving the source conveyor which carries an item exceeds a current utilization threshold, the system deems the item to be heavy (e.g., too heavy to completely lift up using only a single robotic arm). In response to determining that the item is heavy, the system determines a plan accordingly. For example, the system determines a plan for pushing the item to a destination location (e.g., a selected tray or segment on a segmented conveyor). The system may determine a strategy for engaging the item with the first robotic arm and a path for pushing the item to the destination location. The system may further determine a strategy to assist the first robotic arm to move the item, such as a strategy for using one or more other robotic arms, controlling the source conveyor to move the item towards the segmented conveyor, etc. At 2620, the plan is provided. The system provides the plan to a process or service that invoked process 2600, or to another system or mechanism to implement the plan. For example, the first robotic arm is controlled to move the item in accordance with the plan. At 2625, a determination is made as to whether process 2600 is complete. In some embodiments, process 2600 is determined to be complete in response to a determination that no further items are to be sorted, no further items are to be singulated, the handling or singulation of the desired items is complete or successful, the process has terminated, an administrator indicates that process 2600 is to be paused or stopped, etc. In response to a determination that process 2600 is complete, process 2600 ends. In response to a determination that process 2600 is not complete, process 2600 returns to 2605.

Figure 27:
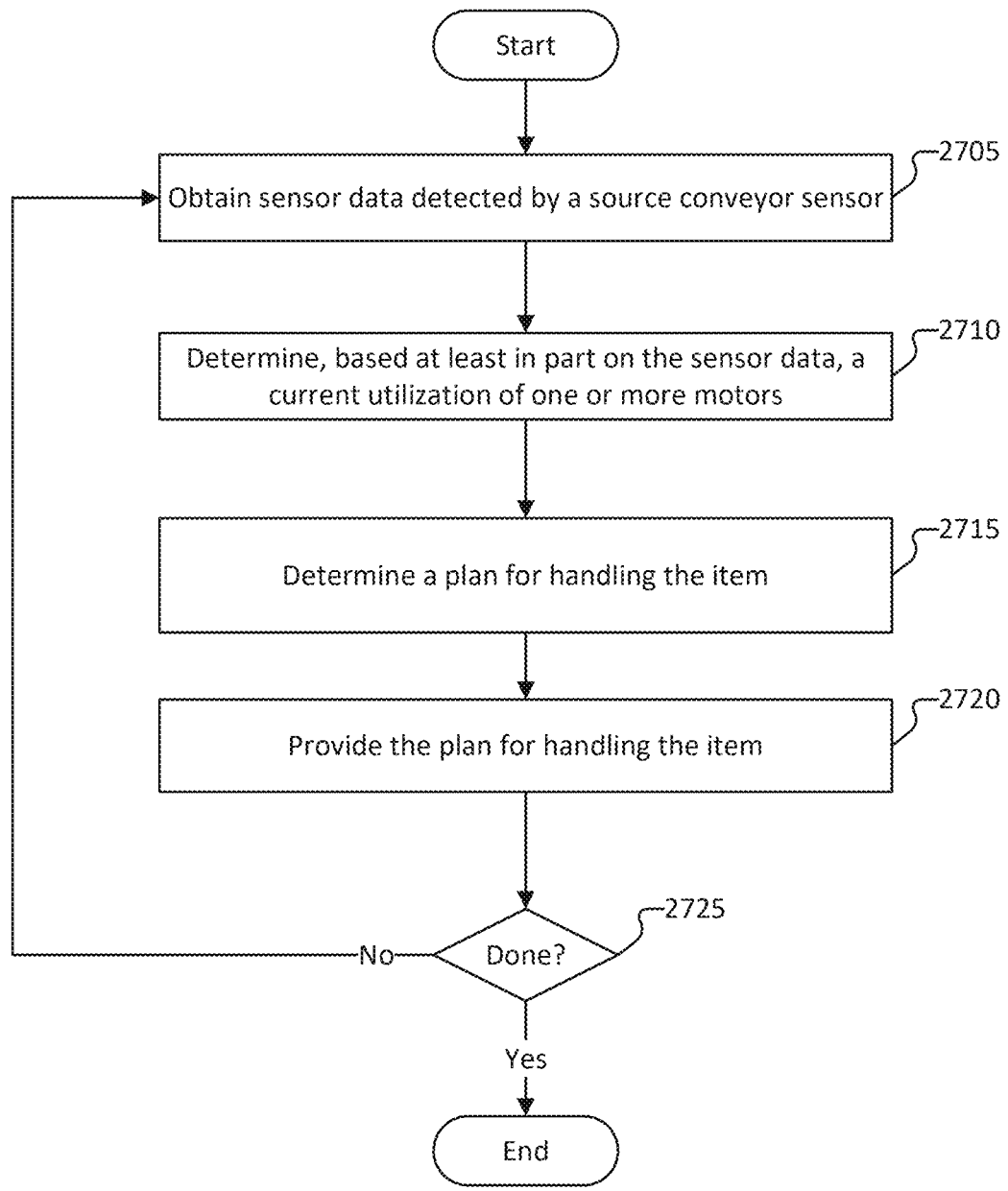
FIG. 27 is a flow diagram of a method for determining a plan for handling an item according to various embodiments.

FIG. 27 is a flow diagram of a method for determining a plan for handling an item according to various embodiments. Process 2700 may be implemented by a robotic system according to the various embodiments described herein.

At 2705, sensor data detected by a source conveyor sensor is obtained. In some embodiments, the system obtains a measure indicating an amount of work performed by one or motors driving the source conveyor. The measure may be an amount of energy expended by a motor, an amount of torque, a current utilization, or another proxy for the torque or work expended. Additionally, or alternatively, the system obtains weight data from a weight sensor comprised in the source conveyor. At 2710, the system determines a current utilization of one or more motors based at least in part on the sensor data. At 2715, a plan for handling the item is determined. The system determines the plan for handling the item based at least in part on the current utilization, such as based on a determination of whether the current utilization exceeds a current utilization threshold (e.g., a threshold which may be set based on a capacity/ability of a robotic arm to lift/grasp an item). For example, in response to determining that the item is not heavy based at least in part on the current utilization, the system determines a plan for picking and placing the item to a destination location. As another example, in response to determining that the item is heavy or otherwise requires special handling, the system determines a plan to handle the item. For a heavy item, the system may determine a plan to push the item (e.g., at least with one robotic arm) from the source conveyor to the destination location. At 2720, a plan for handling the item is provided. The system provides the plan to a process or service that invoked process 2700, or to another system or mechanism to implement the plan. For example, the first robotic arm is controlled to move the item in accordance with the plan. At 2725, a determination is made as to whether process 2700 is complete. In some embodiments, process 2700 is determined to be complete in response to a determination that no further items are to be sorted, no further items are to be singulated, the handling or singulation of the desired items is complete or successful, the process has terminated, an administrator indicates that process 2700 is to be paused or stopped, etc. In response to a determination that process 2700 is complete, process 2700 ends. In response to a determination that process 2700 is not complete, process 2700 returns to 2705.

Figure 28:
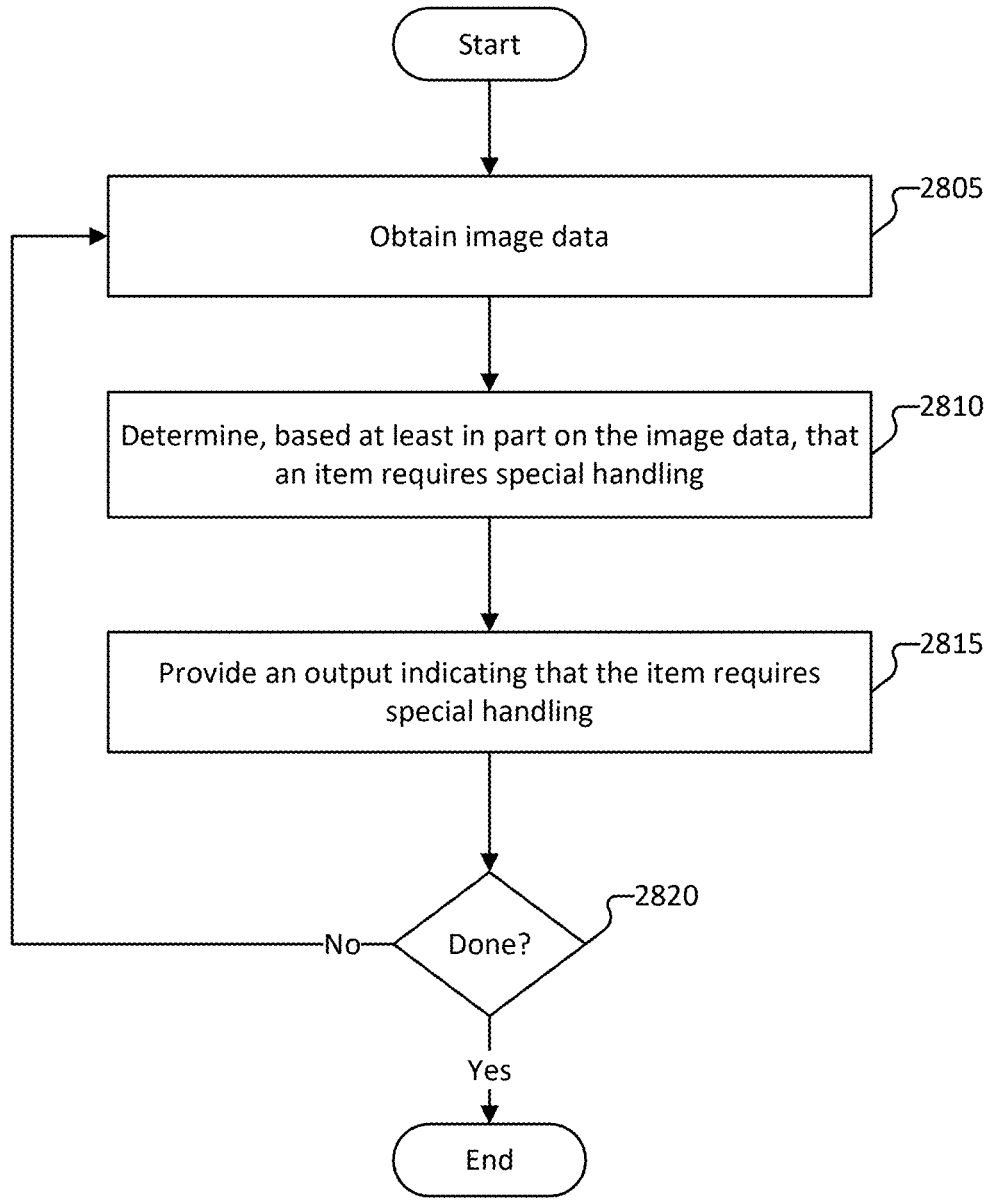
FIG. 28 is a flow diagram of a method for detecting an item that requires special handling according to various embodiments.

FIG. 28 is a flow diagram of a method for detecting an item that requires special handling according to various embodiments. Process 2800 may be implemented by a robotic system according to the various embodiments described herein. In some embodiments, process 2800 is implemented in line with performing singulation of items on a source conveyor.

At 2805, image data is obtained. As an example, the system obtains image data captured by a vision system. At 2810, the system determines that an item requires special handling based at least in part on the image data. The system uses the image data to determine whether the item is heavy, non-inductable or otherwise requires special handling. As an example, the system may determine that an item requires special handling based on estimating that the item weight exceeds a weight threshold based on dimensions or other information captured in image data such as a marking on the side or label indicating that the item is heavy or specifies the item weight. As another example, the system may determine that the item requires special handling based on the detection of an indication that the item is fragile. As another example, the system may determine that the item requires special handling based on a service class level read from label information in the image data. As another example, the system may determine that the item requires special handling based on determining that the item is bulky or irregularly shaped, or otherwise indicates that the item is to be handled in a certain orientation. At 2815, the system provides an output indicating that the item requires special handling. The system provides the plan to a process or service that invoked process 2800, or to another system or mechanism to implement the plan. For example, the first robotic arm is controlled to move the item in accordance with the plan. At 2820, a determination is made as to whether process 2800 is complete. In some embodiments, process 2800 is determined to be complete in response to a determination that no further items are to be sorted, no further items are to be singulated, the handling or singulation of the desired items is complete or successful, the process has terminated, an administrator indicates that process 2800 is to be paused or stopped, etc. In response to a determination that process 2800 is complete, process 2800 ends. In response to a determination that process 2800 is not complete, process 2800 returns to 2805.

Figure 29:
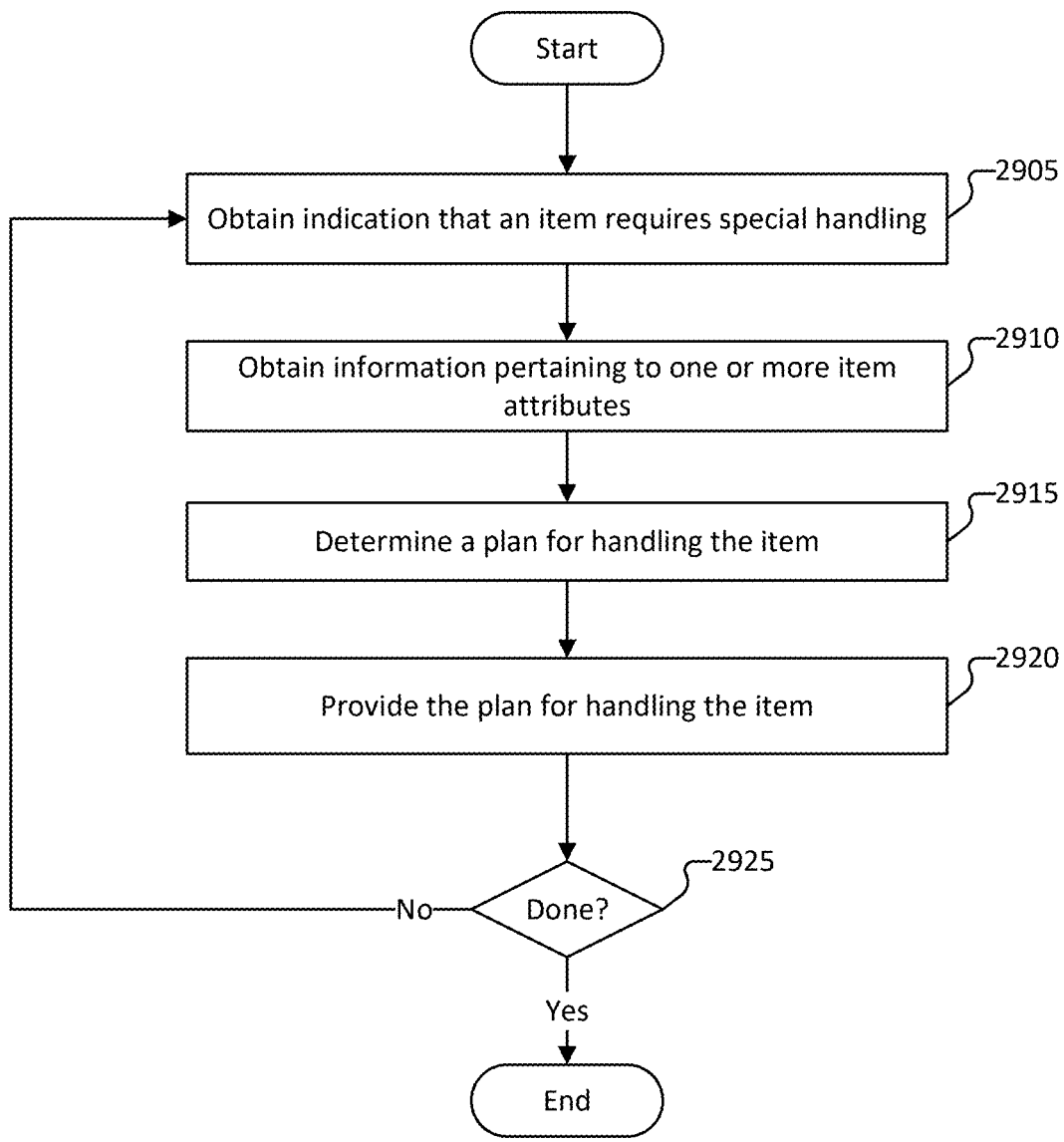
FIG. 29 is a flow diagram of a method for determining a plan for handling an item that is deemed to required special handling according to various embodiments.

FIG. 29 is a flow diagram of a method for determining a plan for handling an item that is deemed to required special handling according to various embodiments. Process 2900 may be implemented by a robotic system according to the various embodiments described herein. In some embodiments, process 2900 is implemented in line with performing singulation of items on a source conveyor.

At 2905, an indication that an item requires special handling is obtained. For example, the system may obtain the indication from 2815 of process 2800. At 2910, information pertaining to one or more item attributes is obtained. The system may obtain one or more item attributes based on sensor data collected from one or more sensors in the workspace, or based on performing a lookup in a dataset/mapping of item identifiers (or item types) to item attributes. At 2915, a plan for handling the item is determined. In the case that the item is heavy, the system may determine the plan for handling the item comprises controlling a robotic arm to push the item to a destination location. The plan for handling the item may include moving the item to an alternate location, such as for routing the item for special handling. At 2920, the plan for handling the item is provided. At 2925, a determination is made as to whether process 2900 is complete. In some embodiments, process 2900 is determined to be complete in response to a determination that no further items are to be sorted, no further items are to be singulated, the handling or singulation of the desired items is complete or successful, the process has terminated, an administrator indicates that process 2900 is to be paused or stopped, etc. In response to a determination that process 2900 is complete, process 2900 ends. In response to a determination that process 2900 is not complete, process 2900 returns to 2905.

Figure 30:
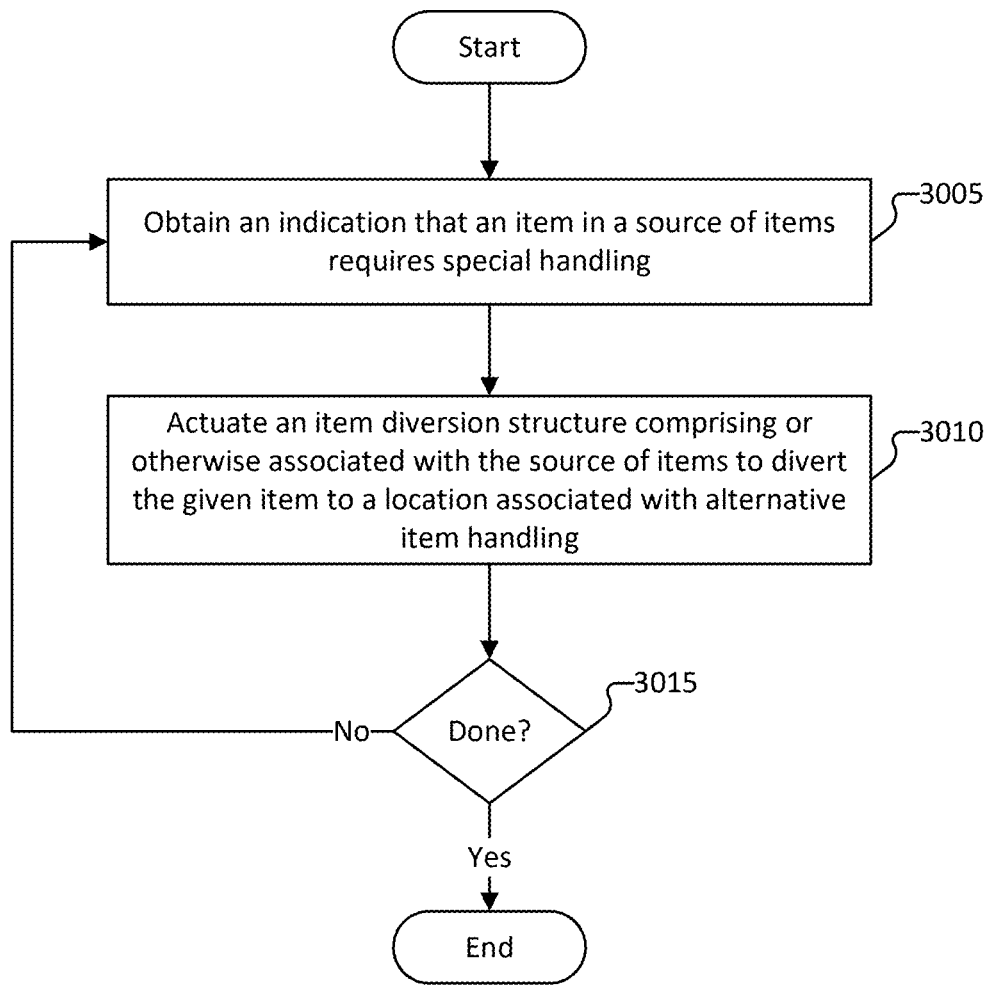
FIG. 30 is a flow diagram of a method for handling an item deemed to require alternative handling according to various embodiments.

FIG. 30 is a flow diagram of a method for handling an item deemed to require alternative handling according to various embodiments. Process 2900 may be implemented by a robotic system according to the various embodiments described herein. In some embodiments, process 2900 is implemented in line with performing singulation of items on a source conveyor.

At 3005, an indication that in item in a source of items requires special handling is obtained. At 3010, the system actuates an item diversion structure comprising or otherwise associated with the source of items to divert the given item to a location associated with alternative item handling. For example, the system actuates the item diversion structure in response to determining that the item requires special handling. The item diversion structure may be a mechanism that tilts or raises/lowers the source conveyor and controls the source conveyor to drive in reverse to move the item out the back. As another example, the item diversion structure may be a mechanism to move (e.g., raise/lower) a chute or funnel that feeds items to the source conveyor/pick table, and the item may be moved (e.g., removed from the workspace to a reject area) out the back of the source conveyor/pick table, such as by driving the source conveyor in reverse. Various other item diversion structures may be implemented (e.g., panels, baffles, side walls, etc.). At 3015, a determination is made as to whether process 3000 is complete. In some embodiments, process 3000 is determined to be complete in response to a determination that no further items are to be sorted, no further items are to be singulated, the handling or singulation of the desired items is complete or successful, the process has terminated, an administrator indicates that process 3000 is to be paused or stopped, etc. In response to a determination that process 3000 is complete, process 3000 ends. In response to a determination that process 3000 is not complete, process 3000 returns to 3005.

Figure 31:
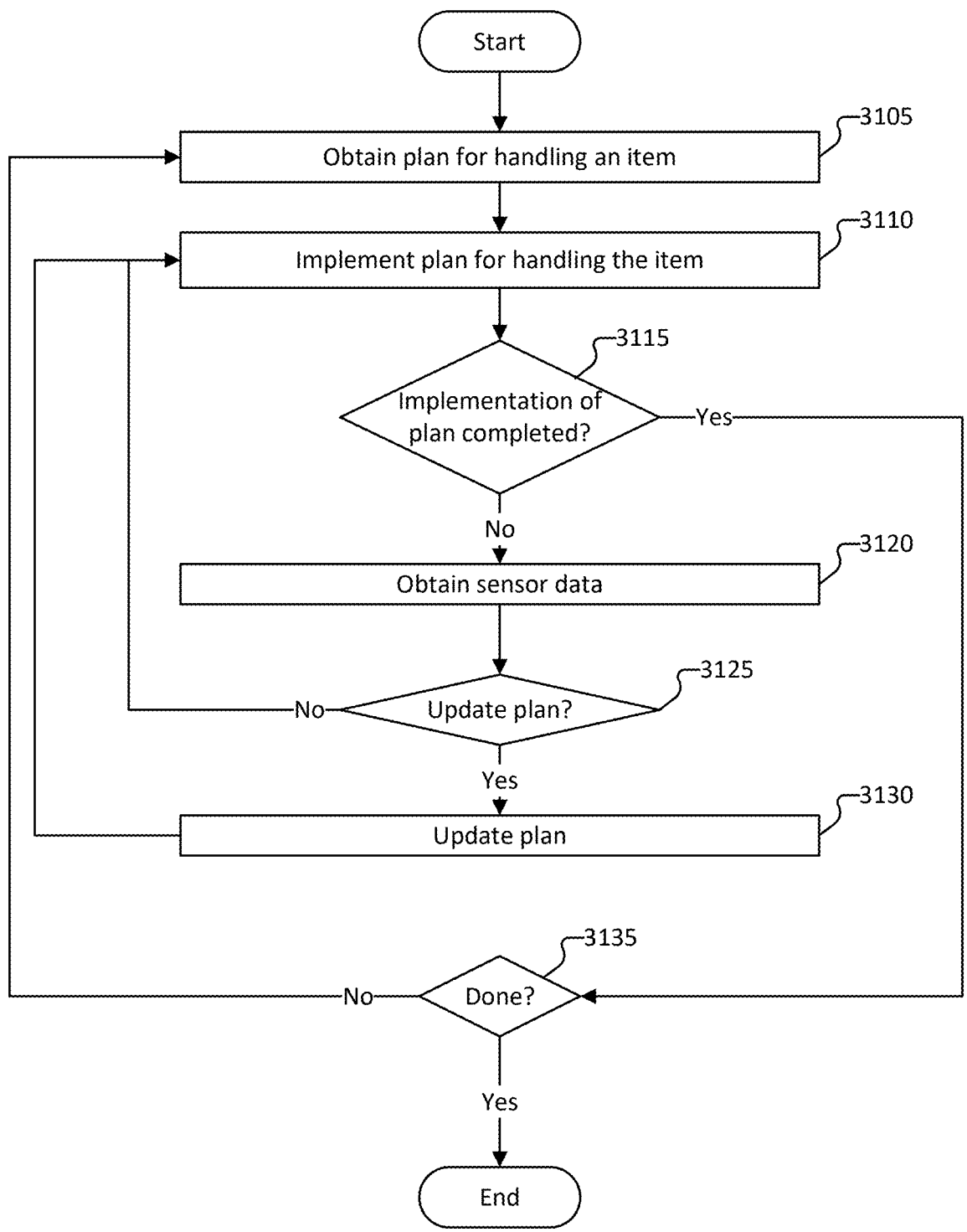
FIG. 31 is a flow diagram of a method for implementing a plan to handle an item according to various embodiments.

FIG. 31 is a flow diagram of a method for implementing a plan to handle an item according to various embodiments. Process 3100 may be implemented by a robotic system according to the various embodiments described herein. In some embodiments, process 3100 is implemented in line with performing singulation of items on a source conveyor.

At 3105, a plan for handling the item is obtained. As an example, the system obtains the plan for handling the item from a service that determines the plan, such as based on whether the item requires special handling, etc.

At 3110, the plan for handling the item is implemented. Implementing the plan includes robotically controlling a robotic arm or other instrumentality to move the item according to the plan.

At 3115, the system determines whether the implementation of the plan is completed. In response to determining that the plan has been successfully completed at 3115, process 3100 proceeds to 3130. Conversely, in response to determining that the plan has not been successfully implemented at 3115, process 3100 proceeds to 3135.

At 3120, sensor data is obtained. The sensor data may include data collected from a vision system, a conveyor/circuit utilization, a robotic arm sensor, a weight sensor, etc. The sensor data may be used to generate a model of the workspace. The sensor data may indicate a flow of items, a location of the item being handled, an orientation of the item being handled, etc.

At 3125, the system determines whether to update the plan. For example, the system determines a likelihood of successful implementation of the plan (or otherwise whether the system expects the item to be successfully handled according to the current plan) based on the sensor data or a model generated using the sensor data. Various circumstances may lead to a change in an expectation that the item will be successfully handled, such as another object currently obstructing the path for handling the item, the center of gravity of the item being different than what was predicted when generating the plan, the item unexpectedly deviating from the planned path, etc. In response to determining that plan is to be updated 3125, process 3100 returns to 3110 and the implementation of the plan is continued. Process 3100 iterates over 3110-3125 until the item has been successfully completed or the system determines that the plan is to be updated. In response to determining that the plan is to be updated at 3125, process 3100 proceeds to 3130.

At 3130, the system determines an update to the plan. The system may determine an updated plan and cause the updated plan to be implemented. As an example, the system may generate and/or update a plan based on a simulation of moving the item or querying a physics engine for an expected result of engaging the item with the robotic arm. In some embodiments, the system determines whether to update based on expectation of likelihood that the item will be successfully moved to a destination location according to a new plan. The system may determine a set of possible new/updated plans, and select a new/updated plan from among the set of new/updated plans, such as based on a cost determined according to a predetermined cost function (e.g., the cost function may account for the work to move the item, the time required to complete the moving the item, the likelihood of success, etc.), a time expected to be required to implement such new/updated plan, a likelihood of success of such new/updated plan, etc. For example, the system selects the optimal or best plan from the set of new/updated plans.

At 3135, a determination is made as to whether process 3100 is complete. In some embodiments, process 3100 is determined to be complete in response to a determination that no further items are to be sorted, no further items are to be singulated, the singulation of the desired items is complete or successful, the process has terminated, an administrator indicates that process 3100 is to be paused or stopped, etc. In response to a determination that process 3100 is complete, process 3100 ends. In response to a determination that process 3100 is not complete, process 3100 returns to 3105.

Figure 32:
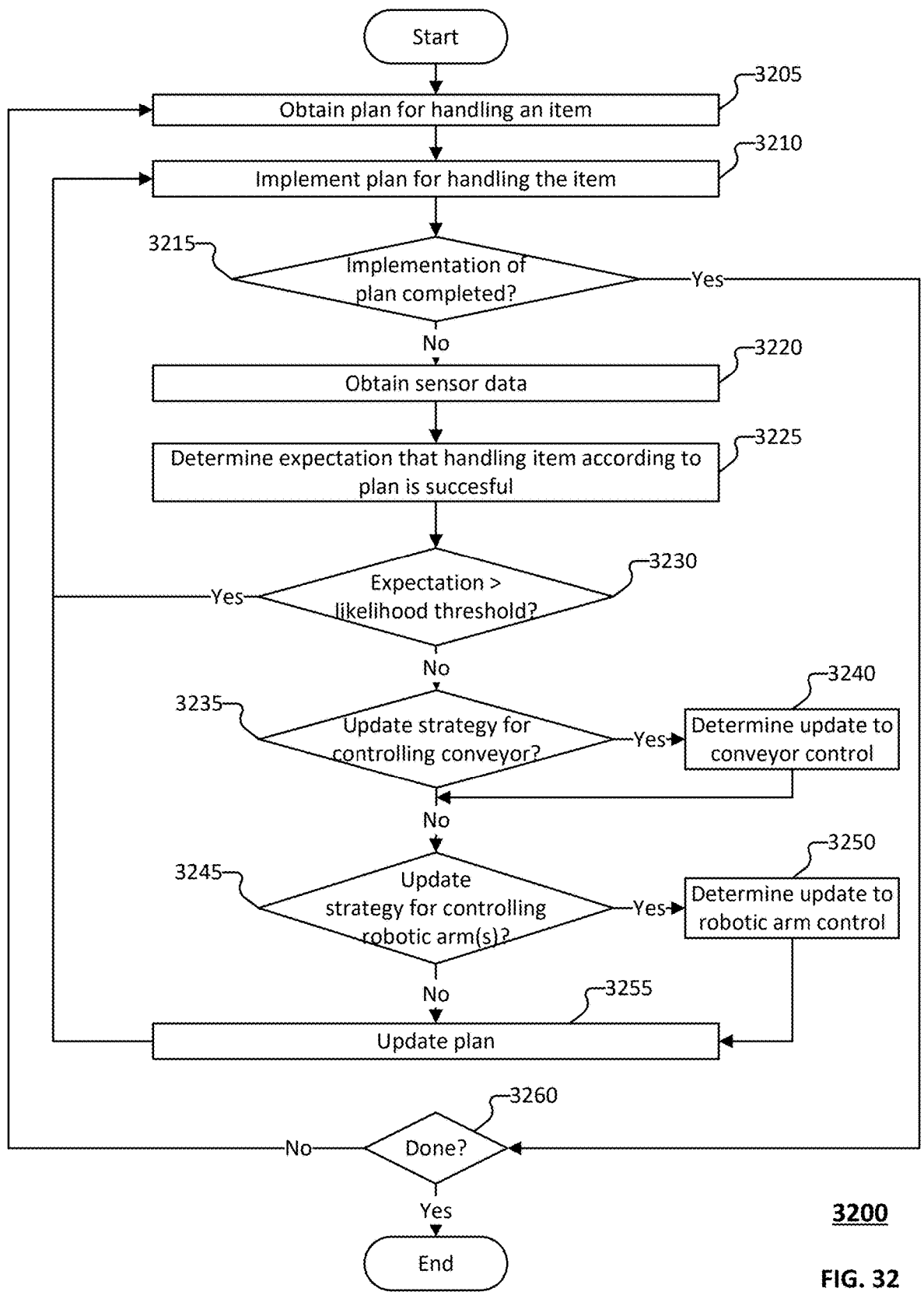
FIG. 32 is a flow diagram of a method for implementing a plan to handle an item according to various embodiments.

FIG. 32 is a flow diagram of a method for implementing a plan to handle an item according to various embodiments. Process 3200 may be implemented by a robotic system according to the various embodiments described herein. In some embodiments, process 3200 is implemented in line with performing singulation of items on a source conveyor.

At 3205, a plan for handling the item is obtained. At 3210, the plan for handling the item is implemented. At 3215, the system determines whether the implementation of the plan is completed. In response to determining that the plan has been successfully completed at 3215, process 3200 proceeds to 3260. Conversely, in response to determining that the plan has not been successfully implemented at 3215, process 3200 proceeds to 3220.

At 3220, sensor data is obtained. The sensor data may include data collected from a vision system, a conveyor/circuit utilization, a robotic arm sensor, a weight sensor, etc. The sensor data may be used to generate a model of the workspace. The sensor data may indicate a flow of items, a location of the item being handled, an orientation of the item being handled, etc.

At 3225, the system determines an expectation that the handling the item according to the plan is successful. The expectation that the handling the item according to the plan may be based on a model of the workspace, a simulation of the plan (e.g., the remainder of the plan), the use of one or more heuristics (e.g., set by an administrator or trained by a machine learning process), etc.

At 3230, the system determines whether the expectation that the handling the item according to the plan is successful is greater than a likelihood threshold. In response to determining that the item is expected to be successfully handled at 3230, process 3200 returns to 3210 and the implementation of the plan is continued. Process 3200 iterates over 3210-3230 until the item has been successfully completed or the system determines that the item is no longer expected to be successfully handled according to the plan. In response to determining that the expectation that the handling the item according to the plan is successful is not greater than a likelihood threshold at 3230, process 3200 proceeds to 3235.

At 3235, the system determines whether to update a strategy for controlling a conveyor(s). The system determines whether to update the strategy based on expectation of a likelihood of success for handling the item based on further control of the conveyor(s) or based on a determination that the current plan is not deemed to be very likely to succeed and that the item should be handled in a different manner, such as diverting the item to an alternate location to route the item for special handling.

In some embodiments, the system determines to speed up the conveyor of source conveyor, such as in response to determining that the selected tray or segment is expected to arrive before the item at the current pace (e.g., based on the current control of the robotic arm and current speed of the source conveyor). The system may control increase the speed of the source conveyor to assist with the movement of the item to the destination location in order to enable the item to be pushed on the segmented conveyor (e.g., at the selected tray/segment) at the correct time (e.g., the time of arrival of the item matches the time of arrival of the selected tray/segment, the item is expected to be delivered to the tray/segment as it passes the source conveyor/pick up zone, etc.). Similarly, the system may control to slow the speed of the source conveyor to delay arrival of the item such as to match the timing of arrival of the selected tray/segment with the arrival of the item. The system may determine to slow the speed of the source conveyor based on a determination that the selected tray/segment is expected to arrive later than planned (e.g., the segmented conveyor may have slowed or stopped in connection with the induction of items from stations upstream) or the item is expected to arrive earlier than planned (e.g., the item is lighter than expected and the force applied by the robotic arm causes the item to travel faster than expected under the current plan).

In some embodiments, the system modulates the speed of the conveyor to control the timing at which the item will arrive at the selected tray/segment. For example, the speed at which the item is pushed across the source conveyor by the robotic arm(s) may be faster or slower than expected, such as based on the predicted weight or other item attribute (e.g., packaging, shape, etc.) being different than expected (e.g., modeled) when the plan was initially determined or previously updated.

In response to determining to update the strategy for controlling the conveyor(s) at 3235, process 3200 proceeds to 3240 at which an update to conveyor(s) control is determined. The update to the conveyor control may be a control to change a speed (e.g., increase or decrease) or to pause/stop/start the conveyor. In some embodiments, the system determines the update to conveyor control based on a model of the workspace (e.g., an attribute of the item) or a monitoring of the implementation of the current plan. In response to determining an update to conveyor(s) control, process 3200 proceeds to 3245.

In response to determining that the strategy for controlling the conveyor(s) is not to be updated at 3235, process 3200 proceeds to 3245.

At 3245, the system determines whether to update a strategy for controlling a robotic arm(s). The system determines whether to control the robotic arm based at least in part on a determination of whether the item is expected to be successfully handled according to the current plan. For example, the system determines whether the arrival time of the item as it is being moved by the system will match the arrival time of the selected tray/segment.

In response to determining to update the strategy for controlling the robotic arm(s) at 3245, process 3200 proceeds to 3250 at which an update to robotic arm(s) control is determined. The system may determine whether to update control of the robotic arm to apply more force to the item (e.g., push harder), apply less force to the item, use an additional robot(s) or other instrumentality to assist with pushing (e.g., if the item is travelling slower than expected, the system may determine that use of additional robot is beneficial or required to deliver the item to the selected tray/segment), etc. Thereafter, process 3200 proceeds to 3255.

Conversely, in response to determining that the strategy for controlling the robotic arm(s) is not to be updated at 3245, process 3200 proceeds to 3255.

At 3255, the plan is updated. The system determines the update to the plan based at least in part on the sensor data. For example, the system determines the update based on the update to conveyor(s) control and/or update to robotic arm(s) control (e.g., determined at 3240 and/or 3250).

In response to the plan being updated, process 3200 returns to 3210 and the implementation of the plan is continued. Process 3200 iterates over 3210-3255 until the item has been successfully completed or the system determines that the item is no longer expected to be successfully handled according to the plan.

At 3260, a determination is made as to whether process 3200 is complete. In some embodiments, process 3200 is determined to be complete in response to a determination that no further items are to be sorted, no further items are to be singulated, the singulation of the desired items is complete or successful, the process has terminated, an administrator indicates that process 3200 is to be paused or stopped, etc. In response to a determination that process 3200 is complete, process 3200 ends. In response to a determination that process 3200 is not complete, process 3200 returns to 3205.

Figure 33A:
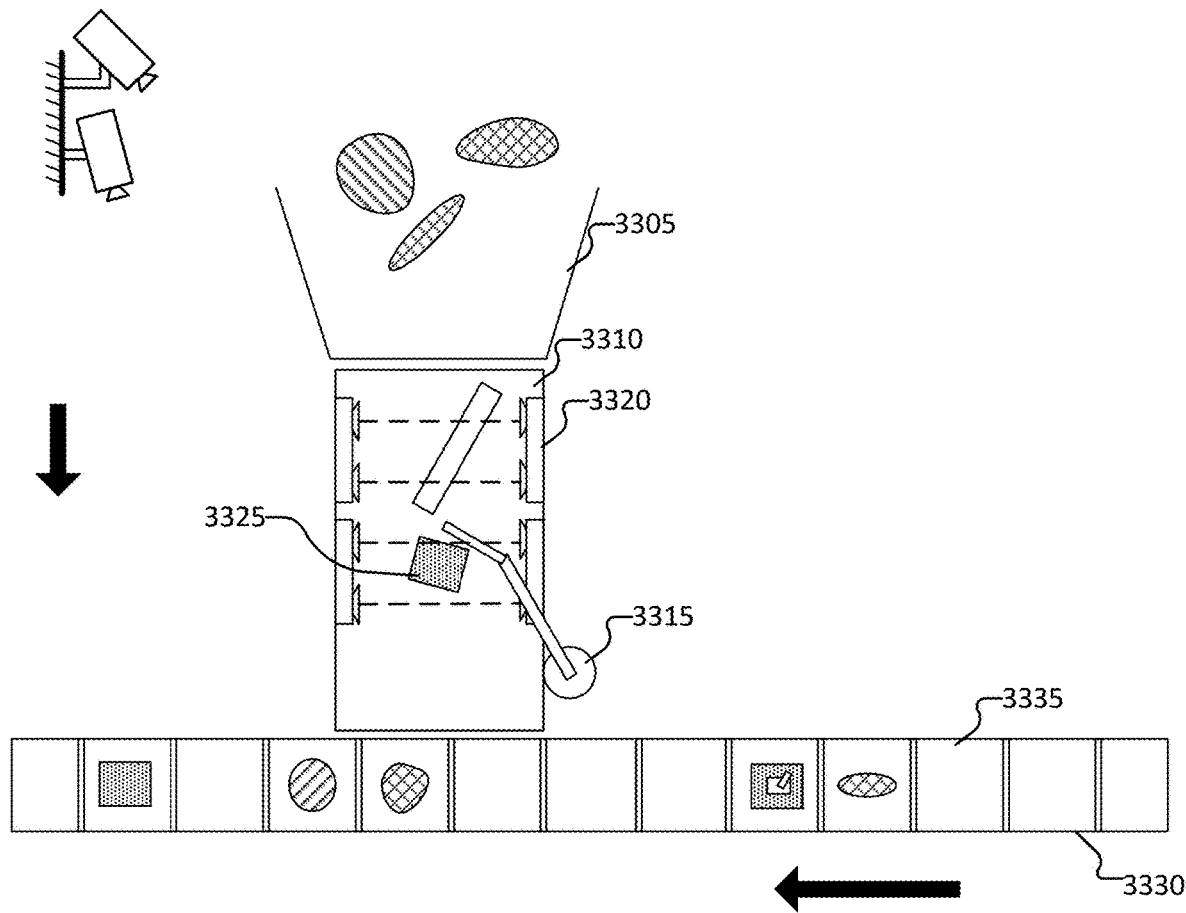
FIG. 33A is a diagram illustrating a singulation system according to various embodiments.
Figure 33B:
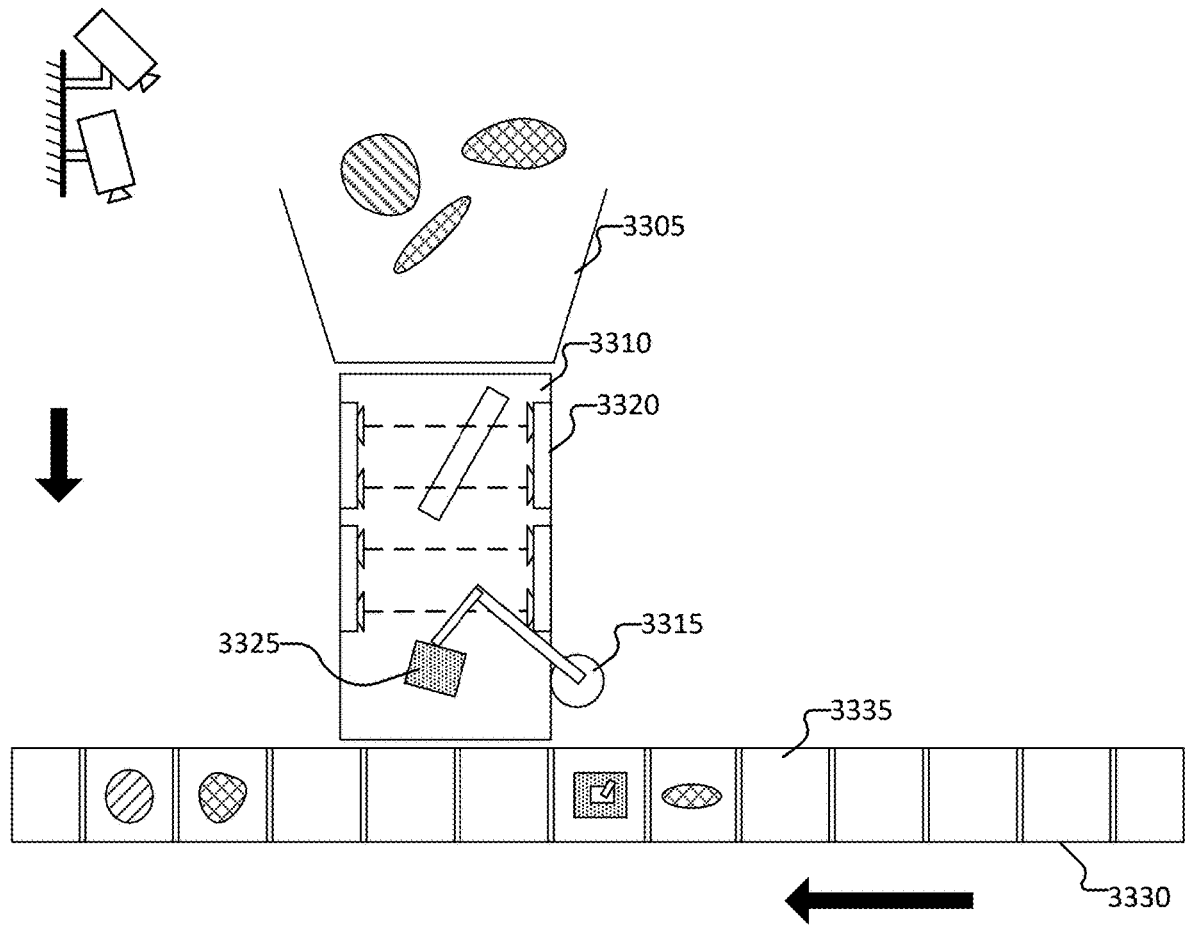
FIG. 33B is a diagram illustrating a singulation system according to various embodiments.
Figure 33C:
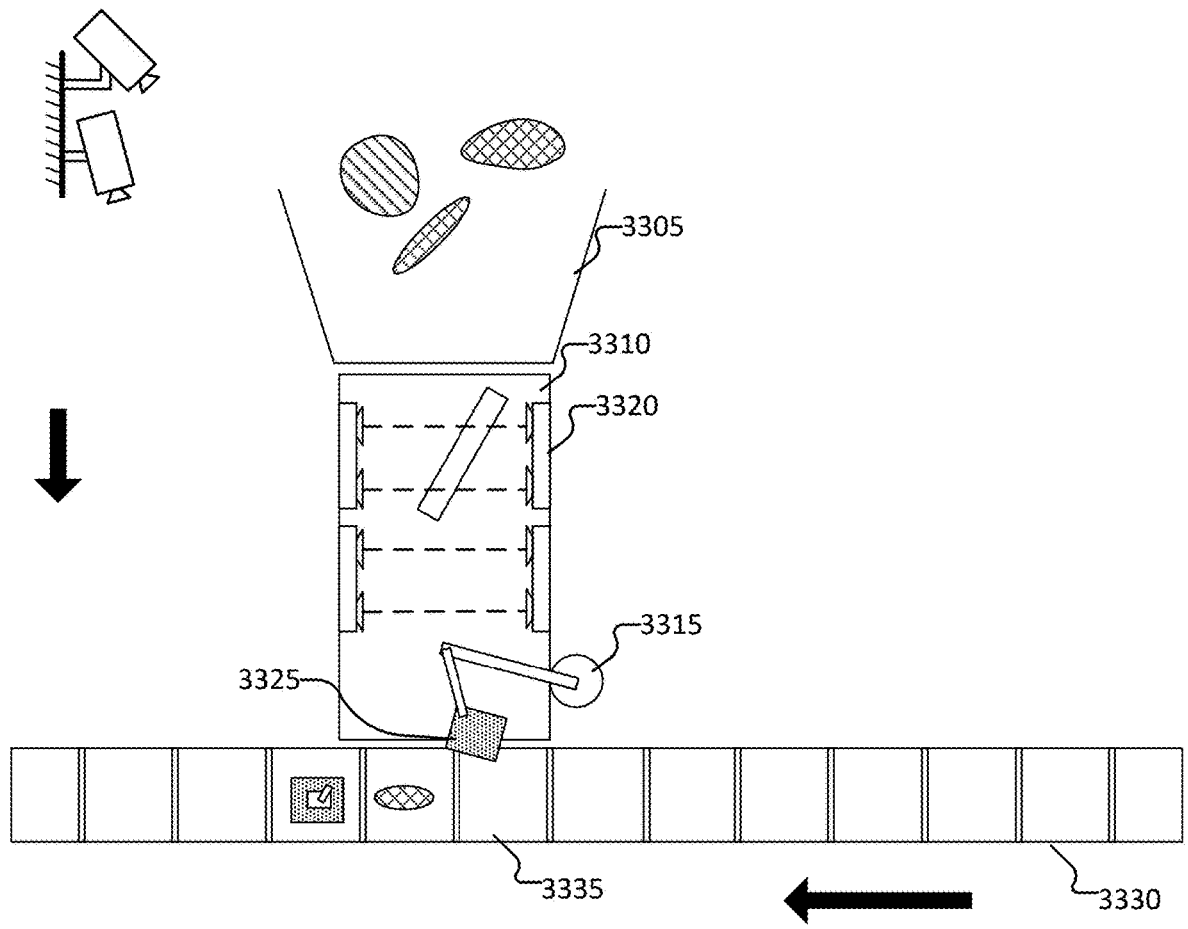
FIG. 33C is a diagram illustrating a singulation system according to various embodiments.

FIGS. 33A-33C are diagrams illustrating a singulation system according to various embodiments. In some embodiments, system 3300 comprises, or is similar to, the singulation systems described herein.

As illustrated, FIGS. 33A-33C illustrate a sequence of operations by system 3300 during singulation of an item (e.g., item 3325). System 3300 comprises chute 3305, source conveyor 3310, robotic arm 3315, and segmented conveyor 3330. Chute 3305 receives items from an infeed conveyor (not shown) and directs the items to source conveyor 3310. System 3300 monitors the workspace (e.g., source conveyor 3310) in connection with determining to singulate items, determining plans to singulate items, and determining whether to update plans or perform another active measure during singulation of an item. In some embodiments, system 3300 further comprises one or more sensors disposed at source conveyor 3310, such as sensor 3320. System 3300 may further comprise a vision system comprising one or more cameras. Various other types of sensors may be implemented in the workspace.

System 3300 determines to singulate item 3325. Using techniques described herein (e.g., monitoring current utilization, computer vision techniques such as use of image segmentation, etc.), system 3300 determines a manner by which item 3325 is to be moved to segmented conveyor 3330. For example, system 3300 determines whether item 3325 is inductable by a pick and place operation (e.g., whether robotic arm 3315 is able to pick up item 3325 from source conveyor 3310 and place in a tray/segment of segmented conveyor 3330). System 3300 may determine whether item 3325 requires special handling, such as in the case that item 3325 is heavy, bulky, too large for segmented conveyor 3330 to handle, fragile, etc. In response to determining that item 3325 requires special handling, system 3300 may determine a manner by which item 3325 is moved from source conveyor 3310. For example, system 3300 may determine that item 3325 is to be diverted from source conveyor 3310 to an alternate location (e.g., not on segmented conveyor 3330) for rejected items. As another example, system 3300 may determine that the system can robotically control robotic arm 3315 and/or other robotically controlled instrumentalities (e.g., another robotic arm, a panel, a baffle, etc.) to move item 3325 to segmented conveyor 3330 (e.g., without picking item 3325 up solely using robotic arm 3315).

In the example shown, system 3300 determines to use robotic arm 3315 to push item 3325 from source conveyor 3310 to segmented conveyor 3330. In response to determining to push item 3325 to segmented conveyor 3330, system 3300 determines a plan for pushing item 3325, including selecting a tray/segment on segmented conveyor 3330 to which item 3325 is to be placed. In some embodiments, system 3300 updates a data structure comprising a mapping of segments/trays to item identifiers.

As illustrated in FIG. 33A, robotic arm 3315 engages item 3325 to push item 3325 along a path to segmented conveyor 3300. System 3300 may determine a timing for pushing item 3325, a force to apply to item 3325, and whether to use additional instrumentalities or mechanisms to assist robotic arm 3315 to push item 3325. In some embodiments, system 3300 determines a plan to push item 3325 based on matching a timing of arrival of the selected tray/segment (e.g., segment 3335) to the location at which the item is to be delivered. For example, system 3300 determines a plan for controlling the push of item 3325 and/or the speed of segmented conveyor 3300 to ensure that the location of item 3325 intersects with the selected tray/segment 3335.

As illustrated in FIG. 33B, item 3325 is pushed further along source conveyor 3310 towards segmented conveyor 3330. Further, segmented conveyor 3330 has been driven leftwards and selected tray/segment 3335 has moved closer to the location at which robotic arm 3315 is to deliver item 3325. System 3300 dynamically monitors the progress of implementing the plan to push item 3325 to ensure that item 3325 is securely delivered to selected tray/segment 3335. In some instances, the movement of item 3325 may deviate according to the determined plan, such as based on the introduction of other objects to the workspace, item 3325 being heavier than expected when the plan was initially determined or last updated, or another item attribute is different than expected thereby causing movement of item 3325 to deviate from the expected movement, etc. In response to determining that item 3325 is not expected to be securely delivered to selected tray/segment 3335, system 3300 may determine and implement an active measure to ensure secure placement of item 3325 to segmented conveyor 3330. System 3300 may implement one or more active measures to securely place of item 3325 to segmented conveyor 3330. Examples of active measures include (i) selecting a new tray/segment according to an expected time of arrival or new plan for pushing item 3325, (ii) controlling robotic arm 3315 to change an amount of force applied to item 3325 or otherwise change a manner by which robotic arm 3315 is engaging item 3325, (iii) controlling segmented conveyor 3330 to increase or decrease the speed to modify the expected arrival time of selected tray/segment 3335, or (iv) controlling another instrumentality to assist with moving item 3325 (e.g., controlling another robotic arm, panel, or baffle to assist with pushing item 3325, controlling source conveyor 3310 to increase/decrease the speed at which it is driven, etc.). Various other active measures may be implemented.

As illustrated in FIG. 33C, item 3325 is delivered to segmented conveyor when selected tray/segment 3335 is positioned to receive item 3325. System 3300 may determine the plan to move item 3325 and/or control segmented conveyor 3330 so that item 3325 is delivered in a manner that it is positioned to move to selected tray/segment 3335 as segmented conveyor 3330 is driven. For example, the plan may include delivering item 3325 at a time to ensure item 3325 is pushed onto the intersection between selected tray/segment 3335 and an adjacent tray/segment and the movement of segmented conveyor 3330 causes item 3325 to securely fall/move to selected tray/segment 3335.

Although various embodiments are described herein in the context of singulating a set of items, various embodiments may similarly be implemented in palletization/depalletization systems, kitting systems, and/or systems that load the set of items among one or more transport containers.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:
   a communication interface configured to receive sensor data from one or more sensors associated with a source conveyor configured to convey items to a pick location; and
   one or more processors coupled to the communication interface and configured to:
      determine, based at least in part on the sensor data, that an item that is too heavy to be lifted by a robotic arm controlled by the one or more processors has entered the source conveyor; and
   in response to determining that the item is too heavy to be lifted by the robotic arm, cause an active measure to be implemented, wherein causing the active measure to be implemented comprises:
      determining a plan for using at least the robotic arm to move the item to a destination location without the robotic arm completely lifting the item; and
      causing the robotic arm to implement the plan.

2. The robotic system of claim 1, wherein at least one sensor of the one or more sensors is configured to obtain data pertaining to a utilization of one or more motors driving the source conveyor.

3. The robotic system of claim 1, wherein the sensor data includes data pertaining to a current utilization of one or more motors driving the source conveyor.

4. The robotic system of claim 3, wherein the one or more processors are further configured to:
   determine whether the current utilization exceeds a current utilization threshold; and
   in response to determining that the current utilization exceeds the threshold current utilization, deeming the item to be too heavy to be lifted by the robotic arm.

5. The robotic system of claim 3, wherein the one or more processors are further configured to:
   store the data pertaining to the current utilization in a historical current utilization dataset.

6. The robotic system of claim 5, wherein the one or more processors are further configured to:
   determine a likelihood that an item is too heavy based at least in part on an analysis of the historical current utilization dataset.

7. The robotic system of claim 5, wherein the one or more processors are further configured to:
   analyze the historical current utilization dataset in connection with learning current utilization levels associated with items too heavy to be lifted by the robotic arm.

8. The robotic system of claim 7, wherein the one or more processors are further configured to:
   update the current utilization threshold based at least in part on the learned current utilization levels.

9. The robotic system of claim 5, wherein the one or more processors are further configured to:
   determine an association between current utilizations and item weights.

10. The robotic system of claim 9, wherein the one or more processors are further configured to:
    store the association between the current utilizations and the item weights in a mapping of the current utilizations to the item weights.

11. The robotic system of claim 10, wherein the mapping of the current utilizations to the item weights is used to determine a manner by which the robotic arm is to be controlled to move the item.

12. The robotic system of claim 10, wherein a force with which to grasp or push the item is determined based at least in part on the mapping of current utilizations to item weights.

13. The robotic system of claim 12, wherein the one or more processors is further configured to:
    in response to determining that the item is not too heavy to be lifted by the robotic arm, determining a plan to control the robotic arm to move the item to a destination location.

14. The robotic system of claim 13, wherein the plan is determined based at least in part on the force with which to grasp or push the item.

15. The robotic system of claim 5, wherein the one or more processors are further configured to:
    determine patterns in the current utilization associated with items being too heavy to be lifted by the robotic arm.

16. The robotic system of claim 1, wherein:
    the sensor data further comprises image data and data pertaining to a current utilization of one or more motors driving the source conveyor; and
    the one or more processors are further configured to correlate the image data and the image pertaining to the current utilization of one or more motors driving the source conveyor.

17. The robotic system of claim 16, wherein determining that the item that is too heavy to be lifted by the robotic arm has entered the source conveyor comprises:

determining that that the item is expected to be too heavy to be lifted by the robotic arm based at least in part on a determination that the current utilization exceeds a current utilization threshold; and verifying that the item is too heavy to be lifted based at least in part on the image data.

18. The robotic system of claim 17, wherein verifying that the item is too heavy to be lifted based at least in part on the image data comprises:

distinguishing, based on the image data, between (i) a first context pertaining to arrival of a single heavy item and (ii) a second context pertaining to arrival of a plurality of smaller items.

19. The robotic system of claim 1, wherein:

the active measure includes stopping a slow of items delivered to a workspace of the robotic arm.

20. The robotic system of claim 19, wherein:

the active measure further includes causing the robotic arm to push the item off the source conveyor for manual induction.

21. The robotic system of claim 1, wherein:

the active measure includes blocking or slowing the flow of items on the source conveyor and determining a plan for handling the item that is too heavy to be lifted by the robotic arm.

22. The robotic system of claim 1, wherein:

the plan comprises using the robotic arm and at least one other robotic arm to lift the item in coordination and to place the item at the destination location.

23. The robotic system of claim 1, wherein:

the plan comprises (a) using the robotic arm to partially lift the item, and (b) using at least one other robotic arm to push or pull the item place the item at the destination location.

24. A method, comprising:

receiving, by one or more processors, sensor data from one or more sensors associated with a source conveyor configured to convey items to a pick location;

determining, based at least in part on the sensor data, that an item that is too heavy to be lifted by a robotic arm controlled by the one or more processors has entered the source conveyor;

in response to determining that the item is too heavy to be lifted by the robotic arm, causing an active measure to be implemented, wherein causing the active measure to be implemented comprises:

determining a plan for using at least the robotic arm to move the item to a destination location without the robotic arm completely lifting the item; and causing the robotic arm to implement the plan.

25. A non-transitory computer readable medium storing thereon a computer program product comprising computer instructions, executed by a processor for:

receiving, by one or more processors, sensor data from one or more sensors associated with a source conveyor configured to convey items to a pick location;

determining, based at least in part on the sensor data, that an item that is too heavy to be lifted by a robotic arm controlled by the one or more processors has entered the source conveyor;

in response to determining that the item is too heavy to be lifted by the robotic arm, causing an active measure to be implemented, wherein causing the active measure to be implemented comprises:

determining a plan for using at least the robotic arm to move the item to a destination location without the robotic arm completely lifting the item; and causing the robotic arm to implement the plan.

* * * * *